United States Patent
Rickey

(10) Patent No.: US 10,242,122 B2
(45) Date of Patent: *Mar. 26, 2019

(54) AUTOMATED WORKFLOW MANAGEMENT SYSTEM FOR APPLICATION AND DATA RETIREMENT

(71) Applicant: DGD Systems, Inc., Redmond, WA (US)

(72) Inventor: Bryon E. Rickey, Redmond, WA (US)

(73) Assignee: DGD Systems, Inc., Redmond, WA (US)

( * ) Notice: Subject to any disclaimer, the term of this patent is extended or adjusted under 35 U.S.C. 154(b) by 395 days.

This patent is subject to a terminal disclaimer.

(21) Appl. No.: 14/967,920

(22) Filed: Dec. 14, 2015

(65) Prior Publication Data

US 2016/0330132 A1    Nov. 10, 2016

Related U.S. Application Data

(63) Continuation-in-part of application No. 14/704,628, filed on May 5, 2015, now Pat. No. 9,213,540.

(51) Int. Cl.
| | |
|---|---|
| *G06F 9/44* | (2018.01) |
| *G06F 17/30* | (2006.01) |
| *G06F 8/60* | (2018.01) |
| *G06Q 10/06* | (2012.01) |

(52) U.S. Cl.
CPC .......... *G06F 17/30917* (2013.01); *G06F 8/60* (2013.01); *G06Q 10/06* (2013.01)

(58) Field of Classification Search
CPC ........................................................ G06F 8/70
USPC ........................................................ 717/120
See application file for complete search history.

(56) References Cited

U.S. PATENT DOCUMENTS

| | | | |
|---|---|---|---|
| 6,445,774 B1 | 9/2002 | Kidder et al. | |
| 7,590,599 B2 | 9/2009 | Xia et al. | |
| 7,630,877 B2 * | 12/2009 | Brown | G06F 8/20 |
| | | | 700/100 |

(Continued)

FOREIGN PATENT DOCUMENTS

| | | | |
|---|---|---|---|
| EP | 2184904 A1 | 5/2010 | |
| EP | 2184904 B1 * | 9/2017 | |

OTHER PUBLICATIONS

Aug. 26, 2016—(WO) International Search Report and Written Opinion—App. PCT/US2016/030532.

(Continued)

*Primary Examiner* — Francisco J Aponte
(74) *Attorney, Agent, or Firm* — Banner & Witcoff, Ltd.

(57) ABSTRACT

Systems and methods are provided for retiring an application and any associated data, hardware assets, and software assets. A workflow management system creates and tracks the life cycle of a project for application retirement, data retirement, purge, or performance archiving. The workflow management system evaluates the cost of the project, the availability of resources for the project, and captures information about the application and associated assets. Upon deciding to initiate the project based on the evaluations, the workflow management system captures and tracks implementation of project requirements. The workflow management system further manages retirement of hardware and software assets by cancelling, repurposing, decommissioning, or bypassing the assets.

17 Claims, 57 Drawing Sheets

(56) References Cited

U.S. PATENT DOCUMENTS

| | | | |
|---|---|---|---|
| 7,925,527 B1 | 4/2011 | Flam | |
| 8,161,479 B2 | 4/2012 | Sedukhin et al. | |
| 8,200,636 B2 | 6/2012 | Hicks et al. | |
| 8,312,419 B2 * | 11/2012 | Wilcock | G06F 8/70 717/104 |
| 8,386,288 B2 * | 2/2013 | Ananian | G06F 9/5038 705/7.13 |
| 8,489,556 B2 | 7/2013 | Hicks et al. | |
| 8,514,082 B2 | 8/2013 | Cova et al. | |
| 8,880,679 B2 | 11/2014 | Sharma et al. | |
| 8,997,051 B2 * | 3/2015 | Robertson | G06F 8/62 717/120 |
| 2002/0091560 A1 | 7/2002 | Suzuki et al. | |
| 2003/0023622 A1 | 1/2003 | Obermeyer et al. | |
| 2003/0033191 A1 | 2/2003 | Davies et al. | |
| 2006/0206528 A1 | 9/2006 | Hicks et al. | |
| 2007/0208606 A1 | 9/2007 | MacKay et al. | |
| 2010/0115490 A1 | 5/2010 | Wilcock et al. | |
| 2010/0141445 A1 | 6/2010 | Venkatasubramaniyam et al. | |
| 2010/0305997 A1 | 12/2010 | Ananian et al. | |
| 2010/0306382 A1 | 12/2010 | Cardosa et al. | |
| 2012/0191803 A1 | 7/2012 | Ray et al. | |
| 2012/0227044 A1 | 9/2012 | Arumugham et al. | |
| 2012/0254823 A1 | 10/2012 | Coren et al. | |
| 2013/0054492 A1 | 2/2013 | Boudreau et al. | |
| 2013/0091257 A1 * | 4/2013 | Venugopal | H04L 41/0826 709/221 |
| 2013/0198362 A1 | 8/2013 | Abuelsaad et al. | |
| 2014/0019429 A1 | 1/2014 | Driesen et al. | |
| 2014/0081652 A1 | 3/2014 | Klindworth | |
| 2014/0108630 A1 | 4/2014 | Barnes et al. | |
| 2014/0115371 A1 | 4/2014 | Abuelsaad et al. | |
| 2014/0165050 A1 | 6/2014 | Robertson et al. | |
| 2014/0237442 A1 | 8/2014 | Meda et al. | |
| 2014/0304234 A1 * | 10/2014 | Hegde | G06F 17/30073 707/661 |
| 2015/0026337 A1 | 1/2015 | Sharma et al. | |
| 2015/0039130 A1 | 2/2015 | Banerjee et al. | |
| 2015/0180949 A1 | 6/2015 | Maes et al. | |

OTHER PUBLICATIONS

An Ontology for the Management of Software Maintenance Projects, Francisco Ruiz, et al., Universidad de Castilla-La Mancha, Paseo de la Universidad 4, 13071 Ciudad Real, Spain, Accepted Sep. 3, 2003, International Journal of Software Engineering, OVl. 14, No. 3 (2004), 27 pages.

Dec. 21, 2018—(EP) Extended Search Report and Opinion—App. 16789926.9.

* cited by examiner

| | Planning | Initiation | Snapshot | Decision | Requirements Capture | Archive | Retrieval | Retention | Data Security | Close Out | Retirement |
|---|---|---|---|---|---|---|---|---|---|---|---|
| App Retirement-Archive | Required | Required | Required | Required | Required | Required | Required | Required | Required | Required | Required |
| App Retirement-No Archive | Required | Required | Required | Required | Required | SKIP | SKIP | SKIP | SKIP | Required | Required |
| Data Retirement | Required | Required | Required | SKIP | Required | Required | Required | Required | Required | Required | SKIP |
| Purge | Required | Required | Required | SKIP | Required | Required | SKIP | SKIP | SKIP | Required | SKIP |
| Performance Archive | Required | Required | Required | SKIP | Required | Required | Required | Required | Required | Required | SKIP |

FIG. 1C

Hardware Asset Info Database 130

| Asset ID | 1000 | 1001 | 1002 | 1003 | 1004 |
|---|---|---|---|---|---|
| App ID | 1492 | 1492 | 1492 | 1492 | 1492 |
| App Name | Billing Systems | Billing Systems | Billing Systems | Billing Systems | Billing Systems |
| Asset Type | Server | Server | Server | Server | Server |
| Asset Name | ASP801 | ASP802 | ASP803 | ASP804 | ASP805 |
| Asset Status | Active | Active | Active | Active | Active |
| End State Designation | N/A | N/A | N/A | N/A | N/A |
| Server Type | Virtual | Virtual | Physical | Physical | Physical |
| Environment | Production | Reporting | Performance Test System Test | Production |
| Data Center | DC1 | DC1 | DC2 | DC1 | DC1 |
| Hostname | hostname1.asp.co | hostname2.asp.com | hostname3.asp.co | hostname4.asp.co | hostname5.asp.com |
| IP Address | 111.111.11.11 | 222.222.22.22 | 333.333.33.33 | 444.444.44.44 | 555.555.55.55 |
| Platform | Client/Server | Client/Server | Client/Server | Client/Server | Mainframe |
| OS Type | Unix | Unix | Unix | Unix | z/OS |
| OS Version | 10 | 10 | 10 | 10 | |
| Primary Failover | No | N/A | N/A | N/A | |
| Is Shared | Yes | Yes | No | No | |
| Is Clustered | No | No | No | No | |
| Local Storage (GB) | 250 | 250 | 250 | 250 | |
| Network Storage (GB) | 600 | 400 | 800 | 200 | |

Project Status Database 132

| Project ID | Status | Service | Project Phase | Correct Reason Captions | Notes |
|---|---|---|---|---|---|
| 245 | Active | Application Retirement - Archive | | null | null |

| Project ID | Status | Service | Project Phase | Correct Reason Code | Notes | Timestamp |
|---|---|---|---|---|---|---|
| 245 | | Application Retirement - Archive | Complete | null | null | 12/19/2015 8:08 |
| | | | | | | 5/22/2015 8:30 |

AUTOMATED WORKFLOW MANAGEMENT SYSTEM FOR APPLICATION AND DATA RETIREMENT

CROSS-REFERENCE TO RELATED APPLICATIONS

This application is a continuation-in-part of and claims priority to U.S. application Ser. No. 14/704,628, now U.S. Pat. No. 9,213,540, filed May 5, 2015 and entitled "Automated Workflow Management System for Application and Data Retirement," which is incorporated herein by reference in its entirety.

BACKGROUND

As enterprises evolve, computing resources may need to be updated. For example, where an enterprise no longer has use for a particular application, it may choose to retire the application. However, given the large volume of software and hardware computing resources often associated with an application, enterprises do not currently know which resources are currently being used by the application, and consequently, they do not know whether they can be safely removed from the network or reused for a different application.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In accordance with one illustrative example, an automated workflow management system may comprise, inter alia, a planning module, an initiation module, a snapshot module, a decision module, a requirements capture module, a status tracker module, and/or a retirement module. The illustrative system may perform a method of managing a project of retiring an application comprising: providing an estimation of costs associated with the project; determining an availability of one or more resources for the project; capturing one or more attributes associated with the project; capturing information describing one or more hardware and software assets; receiving an input representing a decision to initiate the project; determining a plurality of requirements for the project; initiating an implementation of the plurality of requirements; auditing the implementation of the plurality of requirements; and/or retiring one or more software and hardware assets associated with the application.

Additional aspects of the present disclosure will be apparent in view of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

FIG. 1C is a block diagram of an example implementation of an automated workflow management system.

FIGS. 8F-I illustrate respective examples of implementations of a retirement module of an automated workflow management system.

FIGS. 10E-L are example user interfaces associated with a planning module of an automated workflow management system in accordance with one or more aspects described herein.

DETAILED DESCRIPTION

Aspects of the present disclosure are directed toward an automated workflow management system of an enterprise-wide computing system where the automated workflow management system provides distinct services including application retirement (archive and no archive), data retirement, purging, and performance archiving. For these services, the automated workflow management system may implement a process for determining which assets must be retired to enable retirement of an application, and executing the necessary steps for retirement.

The system may determine whether an application is associated with any assets (e.g., hardware components, software components, data components, etc.) and whether or not these assets may be retired (e.g., decommissioned or repurposed for another application). For example, an asset may be decommissioned where the asset will not or cannot be associated with other applications in the future. Alternatively, an asset may be repurposed and employed by another application for a similar or different purpose.

As used in this specification, a manager refers to a computing device configured to, in operation perform the role of a manager (e.g., a project manager, an archive manager, etc.). Alternatively, a manager may refer to a person operating a computing device while performing managerial functions.

In some embodiments, the automated workflow management system may be useful for application project managers (APMs) to access information regarding assets for different applications and to obtain status updates regarding application retirement. The system may utilize various modules, components, and sub-modules to facilitate application retirement (archive or no archive), data retirement, purging, and/or performance archiving services for automated workflow management. These various modules may include a planning module, an initiation module, a snapshot module, a decision module, a requirements capture module, a status tracker module, a close out module, and/or a retirement module. The modules may represent a life cycle corresponding to services offered by the system. Additionally, the modules may allow the system to capture data needed prior to determining whether an application is ready for retirement.

Although many different approaches may be employed to manage technology infrastructure and computing services of an enterprise-wide computing system, the automated workflow management system described herein provides a mechanism to maintain an ROI trail for retired applications by tracking associated assets. Furthermore, the automated workflow management system described herein leverages the modules to achieve several technical advantages. For example, the automated workflow management system provides a standard mechanism for tracking and retiring physical and virtual assets. Virtual assets may include assets housed in external networks (e.g., at a third-party), such as a cloud computing resource.

Figure 1A:
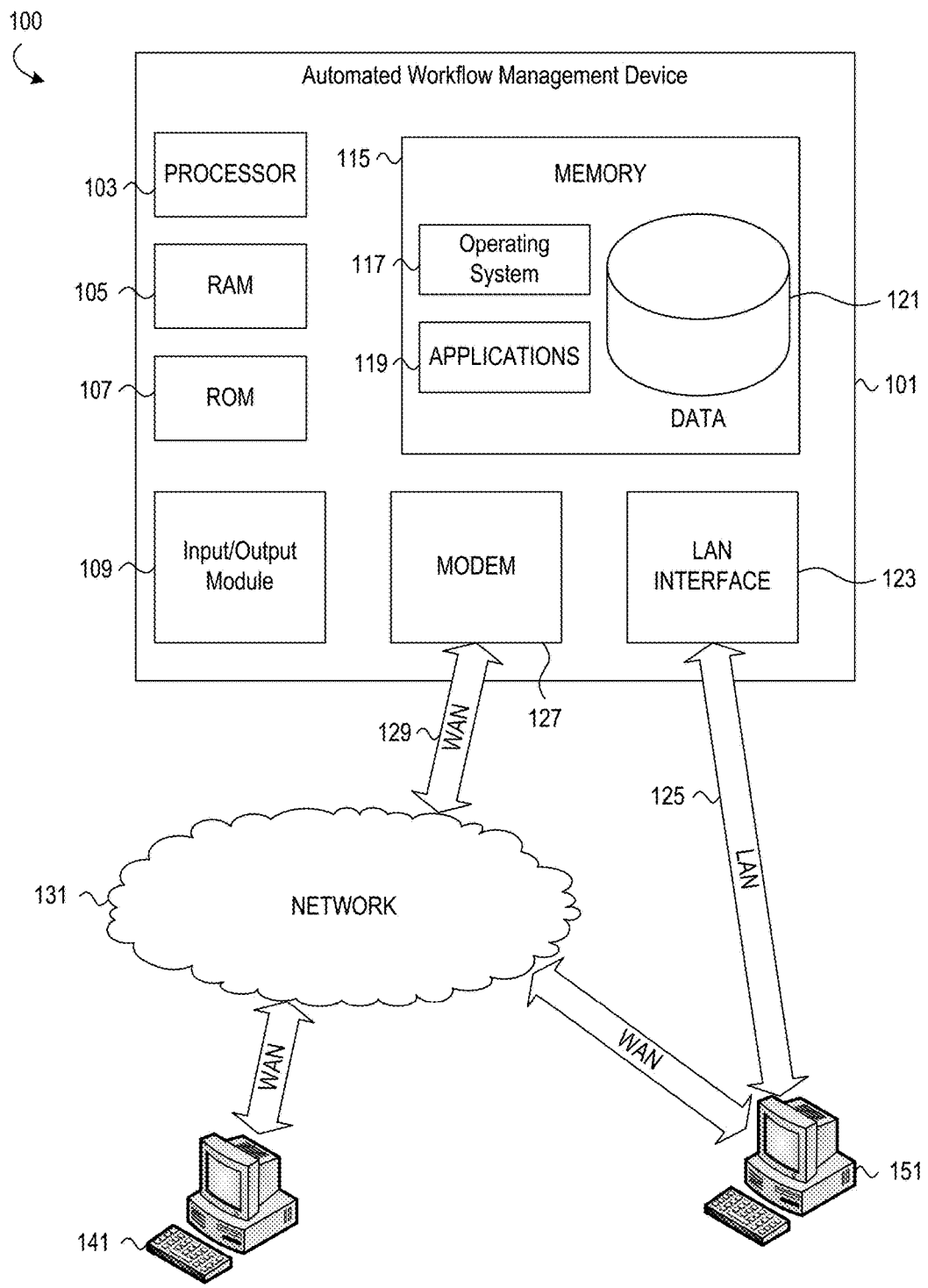
FIG. 1A is a block diagram of an example operating environment in which various aspects of the disclosure may be implemented.

FIG. 1A illustrates a block diagram of at least a portion of a distributed computing system 100 that may be used according to an illustrative embodiment of the disclosure. The distributed computing system 100, in this example, includes an automated workflow management system 101 configured to provide services relating to application retirement (archive or no archive), data retirement, purging, and performance archiving. The automated workflow management system 101 may have a processor 103 for controlling overall operation of the device and its associated components, including RAM 105, ROM 107, input/output (I/O) module 109, and memory 115.

I/O module 109 may include a microphone, keypad, touch screen, and/or stylus through which a user of the automated workflow management system 101 may provide input, and may also include one or more of a speaker for providing audio output and a video display device for providing textual, audiovisual and/or graphical output. Software may be stored within memory 115 and/or storage to provide instructions to processor 103 for enabling the automated workflow management system 101 to perform various functions associated with iterating through a computing platform template and initiating launch of the computing services identified therein at host devices of the distributed computing system. For example, memory 115 may store software used by the system 101, such as an operating system 117, application programs 119, and an associated database 121. Processor 103 and its associated components may allow the system 101 to run a series of computer-readable instructions the implement this functionality. In this regard, the automated workflow management system 101 is a special-purpose computing device programmed with instructions that, when executed, cause the automated workflow management system to perform the steps described in further detail below.

The automated workflow management system 101 may operate in a networked environment supporting connections to one or more remote computers, such as terminals 141 and 151. The terminals 141 and 151 may also be referred to as client computing devices. The terminals 141 and 151 may be in signal communication with various components of the distributed computing system 100 and may include many or all of the elements described above relative to the automated workflow management system 101. The network connections depicted in FIG. 1A include a local area network (LAN) 125 and a wide area network (WAN) 129, but may also include other networks. When used in a LAN networking environment, the automated workflow management system 101 may be connected to the LAN 125 through a network interface or adapter 123. When used in a WAN networking environment, the automated workflow management system 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

The terminals 141 or 151 may include desktop computing devices, laptop computing devices, tablet computing device, palmtop computing devices, cellular telephones, network-enabled gaming machines, network-enabled televisions, and television set-top boxes. In addition, the terminals 141 and 151 may include various other components, such as a battery, speaker, and antennas (not shown).

The disclosure is operational with numerous special purpose computer system environments or configurations. Examples of computer systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 1B:
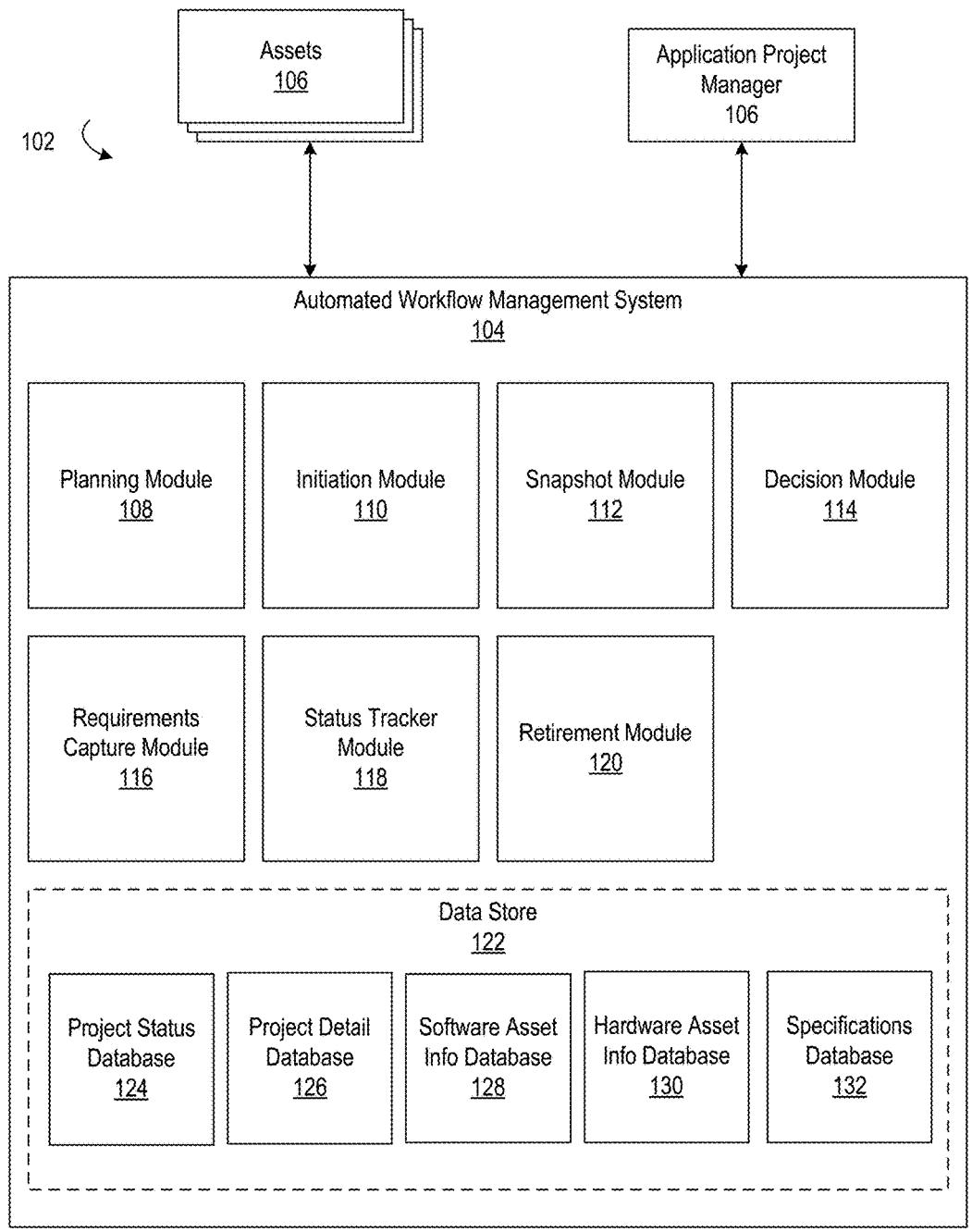
FIG. 1B is an example of an implementation of a distributed computing system in accordance with aspects of the disclosure.

In FIG. 1B, an example of an implementation of a distributed computing system 102 in accordance with aspects of the disclosure is shown. In this example, the distributed computing system 102 may include an automated workflow management system 104, one or more assets 106, and an application project manager 106. Each component shown in FIG. 1B may be implemented in hardware, software, or a combination of the two. Additionally, each component of the distributed computing system 102 may include a computer device (or system) having some or all of the structural components described above for the computing device 101.

As used in this specification, an asset refers to enterprise-owned data, systems, or software. An asset may be associated with one or more enterprise-owned applications. As such, the one or more assets may be hardware assets (e.g., computer servers, network switches, and network firewalls, and other electronic equipment), software assets, or data assets. The automated workflow management system 104 may be used to manage the one or more assets 106 upon determining that an associated application can be retired. The application project manager 106 may communicate with the automated workflow management system 104 to direct or monitor the management of the one or more assets 106 by the automated workflow management system 104.

FIG. 1B further includes an example implementation of an automated workflow management system 104. The automated workflow management system 104 may include various components, modules, and sub-systems which facilitate retiring application, retiring data, purging application/data, and performance archiving. For example, the automated workflow management system 104 may provide an application retirement service, with an archive or no archive option. The application retirement—archive service may include a process for fully retiring an application and archiving associated data (e.g., reference data, transactional data, etc.) in compliance with corporate data retention requirements. The application retirement—no archive service may include a process for retiring an application, but may not provide a process for archiving associated data. The no archive option may be selected where there is no data associated with the application, or where the data associated with the application is not subject to corporate data retention policies. In another example, the automated workflow management system 104 may provide a data retirement service that may include a process for archiving data (e.g., reference data, transactional data, etc.) associated with a live system (e.g., application, asset, etc.). The data may be archived to a centralized repository in compliance with corporate data retention requirements. In yet another example, the automated workflow management system 104 may provide a purging service that may include a process for purging data from a live database (e.g., a database in a production environment, etc.) that has satisfied the corporate data retention requirements. In a further example, the automated workflow management system 104 may provide a performance archiving service that may include a process for archiving transactional data from a live database (e.g., a database in a production environment, etc.) to a separate database (e.g., a database storing historical transactional data). The separate database may reside within the same environment (i.e., the production environment) as the live database from which the transactional data was retrieved. It will be appreciated that the automated workflow management system 104 illustrated in FIG. 1B is shown by way of example and that other implementations of automated workflow management systems 104 may include additional or alternative components, modules, sub-systems, and so forth.

The automated workflow management system 104, in this example, includes a planning module 108, an initiation module 110, a snapshot module 112, a decision module 114, a requirements capture module 116, a status tracker module 118, a retirement module 120, and a data store 122. The planning module 108 may be configured to, in operation enable impact assessment of a new retirement project in terms of costs and resources. The initiation module 110 may be configured to, in operation, enable creation of a new project and allocation of resources to the project. The snapshot module 112 may be configured to, in operation, determine and capture information for all assets associated with an application. The decision module 114 may be configured to, in operation, decide whether to pursue a project. The requirements capture module 116 may be configured to, in operation, capture requirements critical to each service offered by the automated workflow management system 104, and enable review and approval of the captured requirements. The status tracker module 118 may be configured to, in operation, track the implementation of the captured requirements and validate the implementation. The retirement module may be configured to, in operation, handle retirement of software assets and hardware assets.

Example implementations of the planning module 108, the initiation module 110, the snapshot module 112, the decision module 114, the requirements capture module 116, the status tracker module 118, and the retirement module 120 will be described in further detail below. Further, as noted above, these modules are described by way of example only and other implementations of an automated workflow management system 104 may include additional or alternative components.

The data store 122 may store information related to assets, applications, and retirement projects. The data store 122 may thus include a project status database 124, a project detail database 126, a software asset info database 128, a hardware asset info database 130, and a specifications database 132. The automated workflow management system 104 may also include additional or alternative databases, for example, within each of the modules previously described. The automated workflow management system 104 may utilize this information in retiring applications (archive or no archive), retiring data, purging data, and performance archiving.

The project status database 124 may be used to capture the current status of a retirement project as it goes through the workflow. As such, the automated workflow management system 104 may update the project status database 124 at each phase of the workflow. Further, the Application Project Manager may the information stored in the project status database 124 to determine the current status of a project. In at least one embodiment, the project status database 124 may include a project ID, a status (e.g., Active, Inactive, Cancelled, Closed, etc.), a service (e.g., Application Retirement—Archive, Application Retirement—No Archive, Data Retirement, Purge, Performance Archive, etc.), a phase (e.g., Scheduled, Initiation, Snapshot, Decision, Requirements Capture, Archive, Retrieval, Retention, Data Security, Close Out, Retirement, Complete, etc.), a cancel reason code, one or more notes (e.g., from the Application Project Manager 106), and a timestamp (e.g., created date, last updated date, etc.). In some examples, information about a particular project may be retrieved using the project ID associated with the project. In other examples, the project status database 124 may be configured return one or more projects associated with a particular search criteria (e.g., all Active projects, all Application Retirement—Archive projects, etc.).

The protect detail database 126 may be used to store all information association to a project. In at least one embodiment, the project detail database 126 may include a project ID, an initiative, a service (e.g., Application Retirement—Archive, Application Retirement—No Archive, Data Retirement, Purge, Performance Archive, etc.), a ticket number, an application ID, an application name, a requestor ID, a ticket creation date, a legacy owner, a business unit, an application description, a project planned start date, a project planned end date, and notes (e.g., from the Application Project Manager 106). Additionally, the project detail database 126 may maintain, e.g., through a database relationship, an association between a project in the project detail database 126 and a project status in the project status database 124, e.g., based on the project ID.

The software asset info database 128 may be used to store information associated with software assets. In at least one embodiment, the software asset info database 128 may include a software asset ID, an asset type (e.g., Software, etc.), an asset name, an annual maintenance cost, a contract type (e.g., Application Specific, etc.), an asset status (e.g., Supported, Under License Review, etc.), and a timestamp. Further, the software asset info database 128 may also include a vendor name, a version number, an environment (e.g., Development, Testing, Production, etc.), a list of servers on which software is installed, a vendor management name, and a vendor management number. In some examples, the software asset info database 128 may maintain an association between a software asset and an application. For instance, a software asset may be considered to be associated with an application where the application currently includes or requires the software asset. In such examples, the software asset info database 128 may also include an application ID, and an application name. It will be appreciated by those skilled in the art that other circumstances may also result in an association between software assets and applications.

The hardware asset info database 130 may be used to store information associated with hardware assets. In at least one embodiment, the hardware asset info database 132 may include a hardware asset ID, an asset type (e.g., Server, etc.), an asset name, an asset status (e.g., Active, Retiring, etc.), an end state designation, and a timestamp. Further, the hardware asset info database 130 may also include a server type (e.g. Physical, Virtual, etc.), an environment (e.g., Development, Testing, Production, etc.), a data center, a hostname, a DSN name, an IP address, a hardware vendor, a hardware type, a platform (e.g., Mainframe, Client/Server, Cloud, etc.), a server size (e.g., in rack units, etc.), a server power (e.g., in kW, etc.), a serial number, an operating system (OS) type, an OS version, a primary failover, an indicator for whether the hardware asset is shared, an indicator for whether the hardware asset is clustered, a CPU type, a CPU speed (e.g., in MHz, etc.), a number of CPUs (e.g., number of cores, etc.), an amount of local storage (e.g., in GB, etc.), an amount of network storage (e.g., in GB, etc.), and an amount of memory (e.g., in GB, etc.). In some examples, the hardware asset info database 130 may maintain an association between a hardware asset and an application. For instance, a hardware asset may be considered to be associated with an application where the application is stored on, executed on, or otherwise requires, the hardware asset. In such examples, the hardware asset info database 130 may also include an application ID, and an application name. It will be appreciated by those skilled in the art that other circumstances may also result in an association between hardware assets and applications.

The specifications database 132 may be used to capture various requirements that need to be satisfied prior to retirement of an application. For example, the specifications database 132 may store information associated with technical requirements, structured data requirements, unstructured data requirements, retrieval requirements, access management requirements, retention management requirements, and legal requirements. In some examples, the specifications database 132 may be divided such that requirements of a particular type are grouped together (e.g., the data store 122 may have a structured data specifications database, unstructured data specifications database, retrieval specifications database, access specifications database, retention specifications database, legal specifications database, and so forth).

FIG. 1C illustrates the modules that may be used by each service offered by the automated workflow management system 104. As such, although an automated workflow management system 104 may include multiple modules and sub-modules, not each service offered by the automated workflow management system 104 may require each of the modules and sub-modules. The modules and sub-modules used by a service offered by the automated workflow management system 104 may depend on the life cycle of each service. For example, in at least one embodiment, the Application Retirement—Archive service may use the planning module 108, the initiation module 110, the snapshot module 112, the decision module 114, the requirements capture module 116, the status tracker module 116, and the retirement module 120. In another example, the Application Retirement—No Archive service may use the same modules as the Application Retirement—Archive service, but unlike the Application Retirement—Archive service, the Application Retirement—No Archive service may not use all the sub-modules of the status tracker module 118. For instance, the Application Retirement—No Archive may only use a close out sub-module of the status tracker module 118, but not use an archive sub-module, a retrieval sub-module, a retention sub-module, or a data security sub-module. In other examples, the Data Retirement, Purge, and Performance Archive services may not use the decision module 114 or the retirement module 120. Further, in yet another example, the Purge service may only use an archive sub-module and a close out sub-module of the status tracker module 118. Thus, the planning module 108, the initiation module 110, the snapshot module 112, the requirements capture module 116, and the close out sub-module of the statute tracker module 118 may be used by all services offered by the automated workflow management system 104 (i.e. they are common to all services).

Figure 2A:
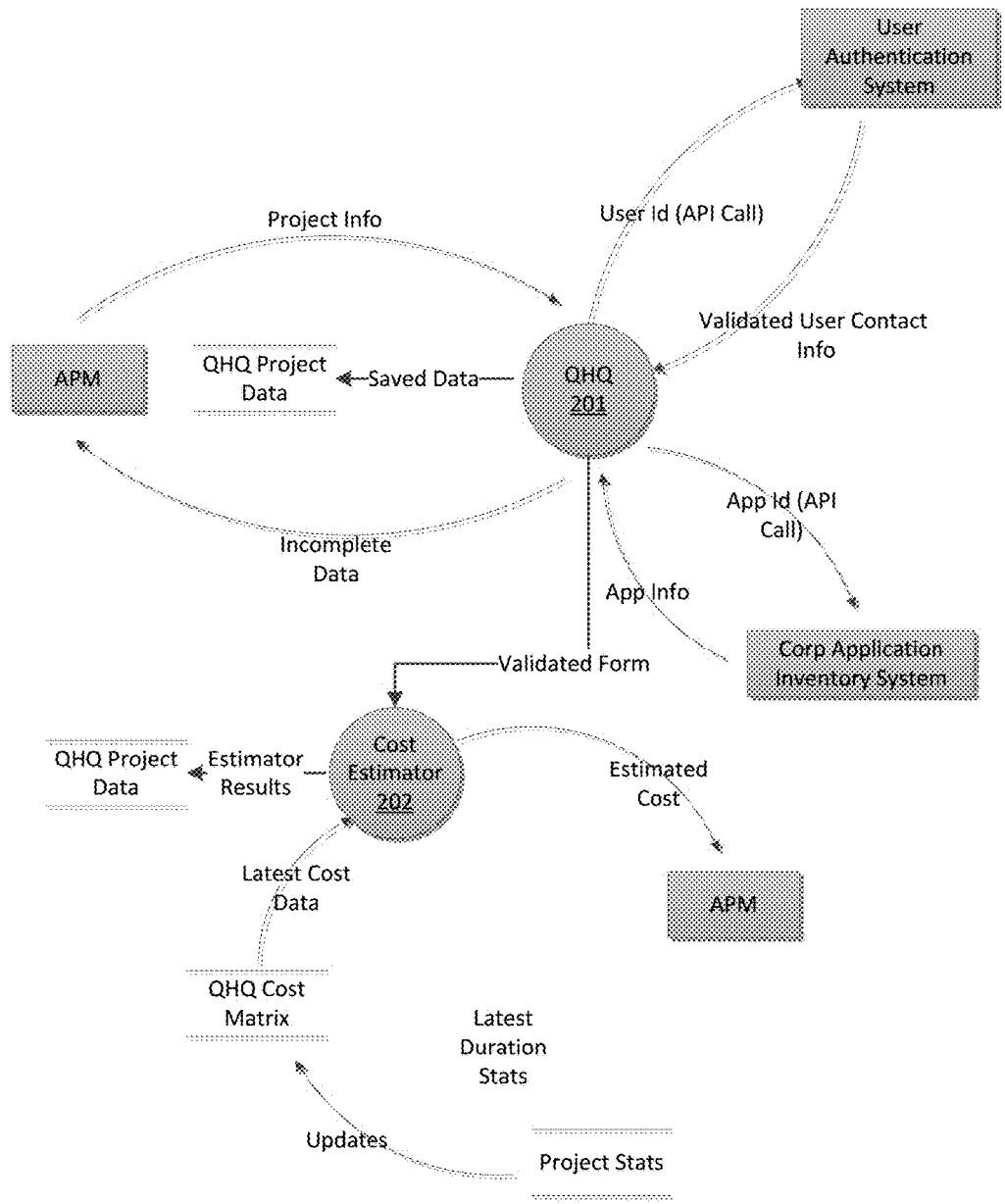
FIGS. 2A-B are block diagrams of an example of an implementation of a planning module of an automated workflow management system.
Figure 2B:
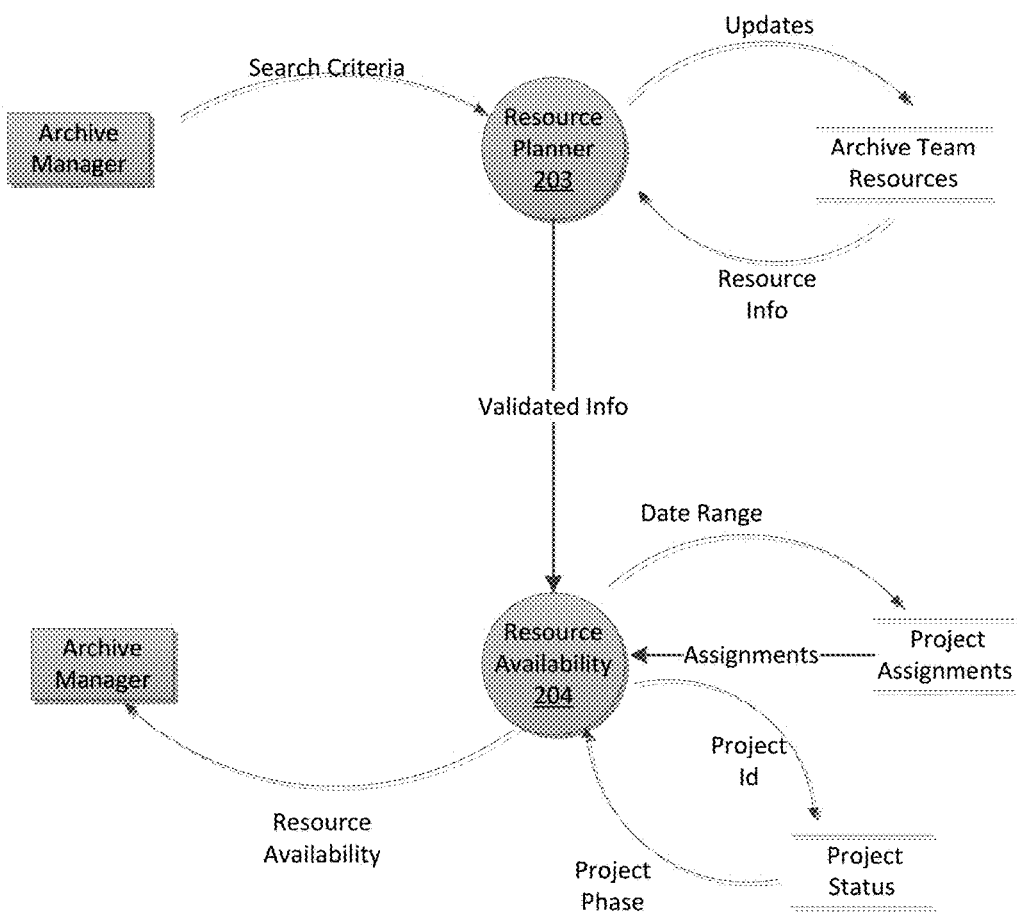

FIGS. 2A and 2B illustrate example workflows of a planning module 108 that may be carried out by an automated workflow management system 104 in accordance with aspects of this disclosure. The system may initially employ the planning module 108 to obtain requisite information for a specific project. In some embodiments, the planning module 108 may allow a user, such as a prospective application owner, to enter in the requisite information through a user interface screen. In other embodiments, the planning module 108 may be configured to gather this information from one or more sources (e.g., systems, databases, other sources external to the automated workflow management system 104) in the enterprise network. The planning module 108 may implement a process for capturing the requisite information and subsequently making application program interface (API) calls to external systems for authentication purposes. As an example, the external systems may include a user authentication system and a corporate application inventory system. As such, the planning module 108 may make API calls to a user authentication system to authenticate a user ID and return user contact information associated with the user ID. For example, the planning module may receive associated user contact information, such as a name, contact number, and email of the user whose user ID was submitted for authentication. The planning module 108 may also make API calls to a corporate application inventory system to authenticate an application ID and return application information associated with the application ID. In such examples, the planning module may receive an application name of the application whose application ID was submitting for authentication.

In some embodiments, the API calls may auto-populate fields in a user interface screen without necessitating user input. The planning module 108 may obtain requisite information, including structured data, unstructured data, reports, and the like, and the requisite information may be stored within an information store or repository which may be accessed by users at a later time. Furthermore, the planning module 108 may validate the data for completion and submit or forward the data to the next module in the life cycle.

The example workflow in FIG. 2A illustrates flows corresponding to a quick hit questionnaire (QHQ) module 201 and a cost estimator module 202. In at least one embodiment, modules 201 and 202 may be components or sub-modules that are a part of the planning module 108.

The quick hit questionnaire module 201 and cost estimator module 202 may provide a high-level estimation of overall project costs, archiving costs, reporting costs, and server/storage costs, based on a cost matrix algorithm and associated factors. The estimated costs may include archiving costs, reporting costs, and server and storage costs for each project. The quick hit questionnaire module 201 may capture pertinent data for each project, including one or more of the following: application ID, application name, user ID, user name, user contact number, user email address, type of service (e.g., performance archive, purging, data retirement, and application retirement), database type, database version, operating system type, operating system version, platform, requested start date, and requested end date. The quick hit questionnaire module 201 may include questions regarding structured data associated with an application, such as allocated database size, estimated archive percentage, estimated archive objects, whether or not data staging is required, whether or not source data includes sensitive personal information (SPI) data, whether or not source data includes Payment Card Industry (PCI) data (i.e., is the PCI Data Security Standard applicable?), whether or not source data is encrypted, and the like. If a performance archive or purging service is selected, then the quick hit questionnaire module 201 may also include questions regarding estimated purge or archive growth rates (e.g., percentage values). The quick hit questionnaire module 201 may also further include questions regarding unstructured data questions, such as directory/drive size, file types, unrelated and/or related data, SPI data, PCI data, and encrypted source data. The quick hit questionnaire module 201 may be configured to generate one or more reports, either automatically or on-demand (e.g., in response to a user request). Reports generated by the questionnaire 201 may be associated with a complexity (e.g., low, medium, or high).

Upon completion of the quick hit questionnaire module 201, the planning module 108 may validate the data and output the validated data to the next process, which may be implemented by the cost estimator module 202. The cost estimator module 202 may process the validated data against a cost matrix reference table. The reference table may be able to map the values received and return assigned values for the following: total estimated archive hours for structured and unstructured data, total estimated hours for a predefined number of reports, total estimated hours for implementing an encrypted solution and handling encrypted source data, and total estimated hours for a predefined number of retention policies. The cost estimator module 202 may also provide infrastructure costs for storage and cloud resources as well as project staff costs based upon a total duration of a project. The reference table may be updated with the latest project statistics and duration statistics for all phases of a project, including archive, retrieval, retention, and data security. As an example, project statistics may include one or more of the following: archive cost, estimated archive duration, report cost, estimated report duration, retention cost, estimated retention duration, legal cost, estimated legal duration, computing cost, and storage cost. The statistics may allow the cost estimator module 202 to provide users with more realistic estimates based on the reference table.

In some cases, the cost estimator module 202 may store resulting data in a database for future reference. These results may serve as estimated project values which may be measured against actual project values collected from future projects. For example, the planning module 108 may compare the estimated project values against actual project values to determine a predictive accuracy of the quick hit questionnaire module 201, the cost estimator module 202, and the associated processes and make adjustments accordingly in order to increase the accuracy of future estimates.

From the results, the cost estimator module 202 may also generate any number of reports which may be requested by a user, where a report may be associated with a complexity (e.g., low, medium, or high). Users may utilize the information from generated reports to obtain funding for particular projects.

The example workflow in FIG. 2B illustrates flows corresponding to resource planner module 203 and resource availability module 204. In some embodiments, modules 203 and 204 may be components or sub-modules that are a part of the planning module 108. The resource planner module 203 and the resource availability module 204 may allow an archive team manager or a project manager to review existing project team assignments in order to determine resource availability for future projects. For example, the resource planner module 203 and the resource availability module 204 may assess the number of resources needed for future projects and determine which resources are available based on the projections.

The resource planner module 203 may store pertinent data regarding archive team resources in an associated data store. For example, the data regarding archive team resources may include resource ID, resource name, resource type (e.g., full-time employee, part-time employee, contractor, etc.), hourly rate, resource phone number, status (e.g., active, inactive, etc.), database platforms (e.g., VSAM/IMS, Oracle, SQLServer, Sybase, etc.), operation system (OS) platforms (e.g., Mainframe, Linux, Unix, Windows, etc.), and specialty/expertise (e.g., retirement archive, performance archive, reports, project management, etc.).

The process illustrated in FIG. 2B may also allow an archive team manager to keep resource information up-to-date. For example, the resource availability module 204 may allow the archive team manager to review existing project team assignments to determine resource availability for future projects. In some embodiments, this information might not be stored and may be provided to the team manager in the form of a generated report. For example, the resource availability module 204 may generate a report that presents a current snapshot of existing resources and to what archives the existing resources are assigned for particular range of dates. The report may allow a project manager or archive team manager to determine whether or not resources, such as analysts, are available for a new project. In some embodiments, the report may provide entries for particular projects, wherein the entries may include analyst names, analyst roles, support levels, application names, services, project phases, project statuses, estimated hours, and the like. As an example, an analyst may have two entries for a given project, such as a first entry for a reporting analyst and a second entry for an archive analyst.

Figure 3:
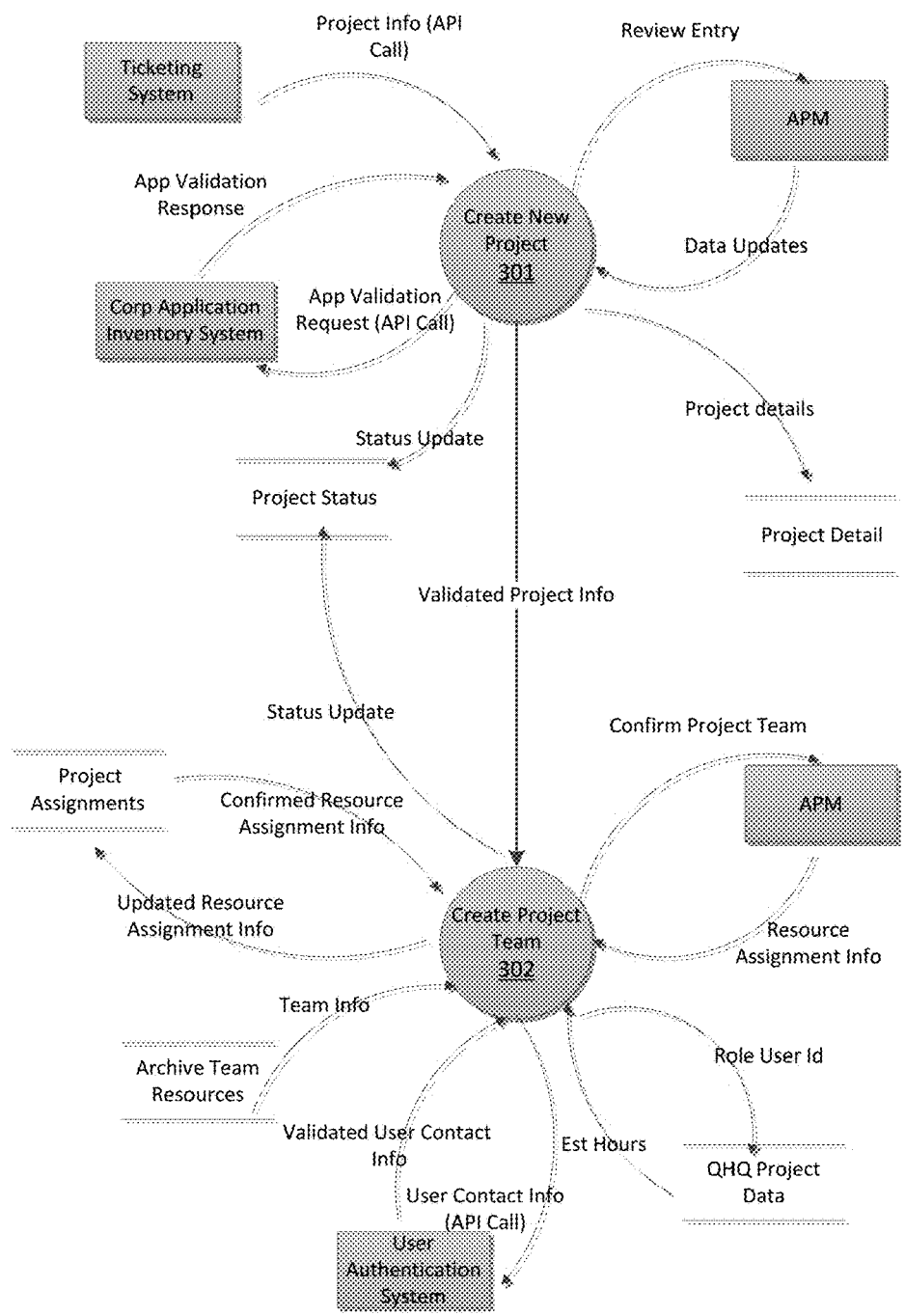
FIG. 3 is a block diagram for an example of an implementation of an initiation module of an automated workflow management system.

FIG. 3 illustrates an example workflow of an initiation module 110 that may be carried out by an automated workflow management system 104 in accordance with aspects of this disclosure. The example workflow in FIG. 3 illustrates flows corresponding to a create new project module 301 and a create project team module 302. Modules 301 and 302 may be components or sub-modules that are a part of the initiation module 110. After completing the planning process using the planning module 108, the system may employ the create new project module 301 to capture pertinent information for a new project. In some cases, the pertinent information may include data that is prepopulated using information from a ticketing system, where the ticketing system may be a resource external to the automated workflow management system 104. For example, the initiation module 110 may focus on creating a new project by using data that is prepopulated using and/or verified against data from the corporate application inventory system.

The create new project module 301 may capture a current status of a project as the project goes the life cycle. The create new project module 301 may update statuses at the start of each phase that the project goes through. Updated statuses may be stored in the project status database 124.

The create new project module 301 may also store data regarding project details for one or more new projects. The project details may be stored in the project detail database 126. In some examples, one or more fields of the project detail data may be pre-populated data. In other examples, projects may start off in a scheduled mode and may stay in that particular mode until a planned start date is exceeded.

The create project team module 302 may allow a project manager to select resources and assign roles to a project. The create project team module 302 may assign resources for the duration of a project and also verify information against the user authentication system. The create project team module 302 may store data regarding assignments for given projects in a project assignments database. An assignment may provide information for future project planning. For example, where a resource is currently assigned to a project full-time (e.g., 40 hours per week), the resources will not be available to be assigned to any other projects for the duration of that project. In some cases, an automated project manager may be able to assign resources to a project even when the project is in a scheduled phase. Once all resources have been assigned, the project may stay in the scheduled phase until the planned date is reached. The project assignment data may include data regarding project ID, resource ID, resource name, resource phone number, service, role (e.g., application retirement project manager, archive analyst, reporting analyst, etc.), primary/secondary, estimated hours, and assigned data.

The create project team module 302 may also store data regarding the current status of a project as the project goes through a full life cycle. Updated status may be stored in the project status database 124. When a planned project date has passed and there is confirmation to proceed, the project phase may then commence to the initiation phase and allow the project to officially move forward.

Figure 4A:
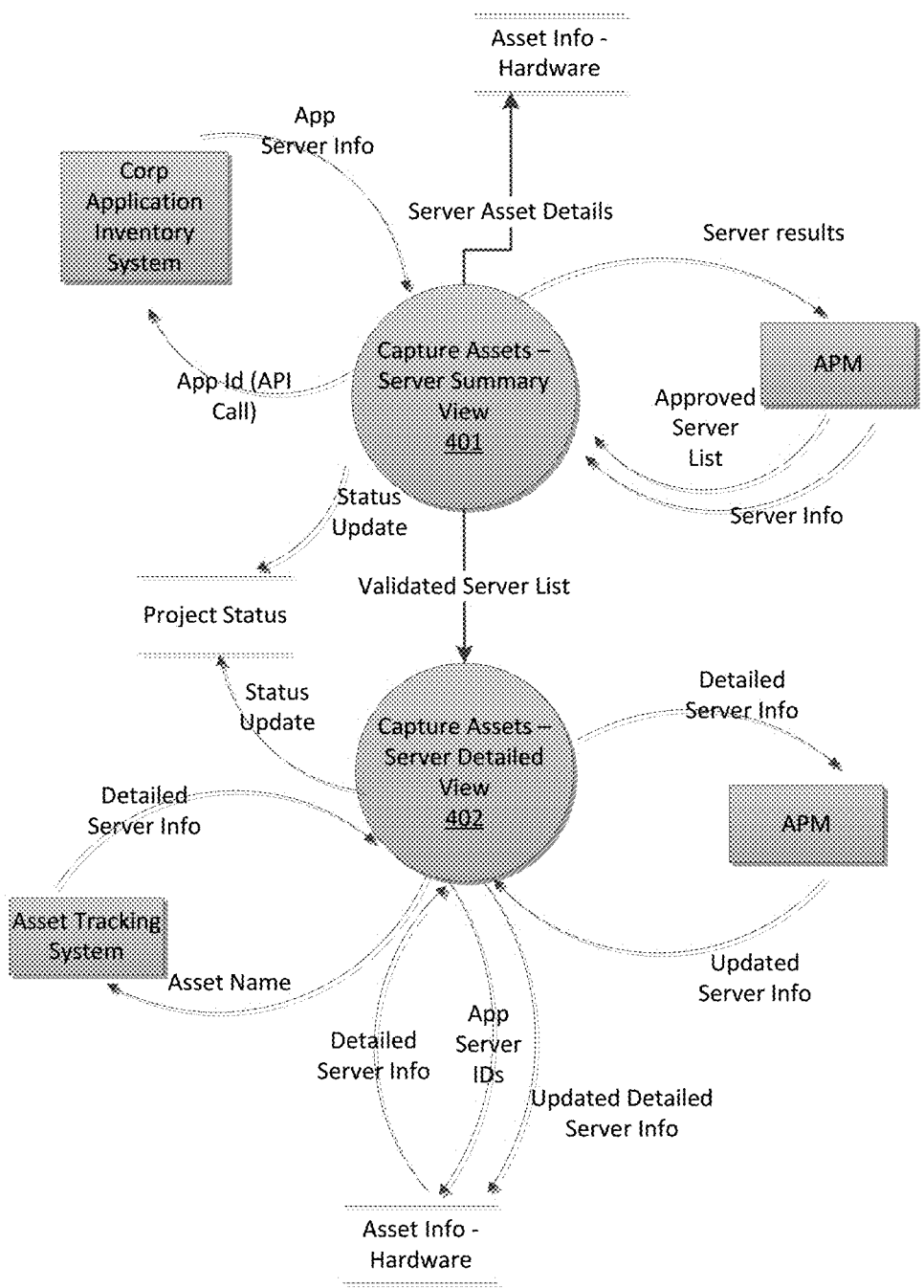
FIGS. 4A-B are block diagrams of an example implementation of a snapshot module of an automated workflow management system.
Figure 4B:
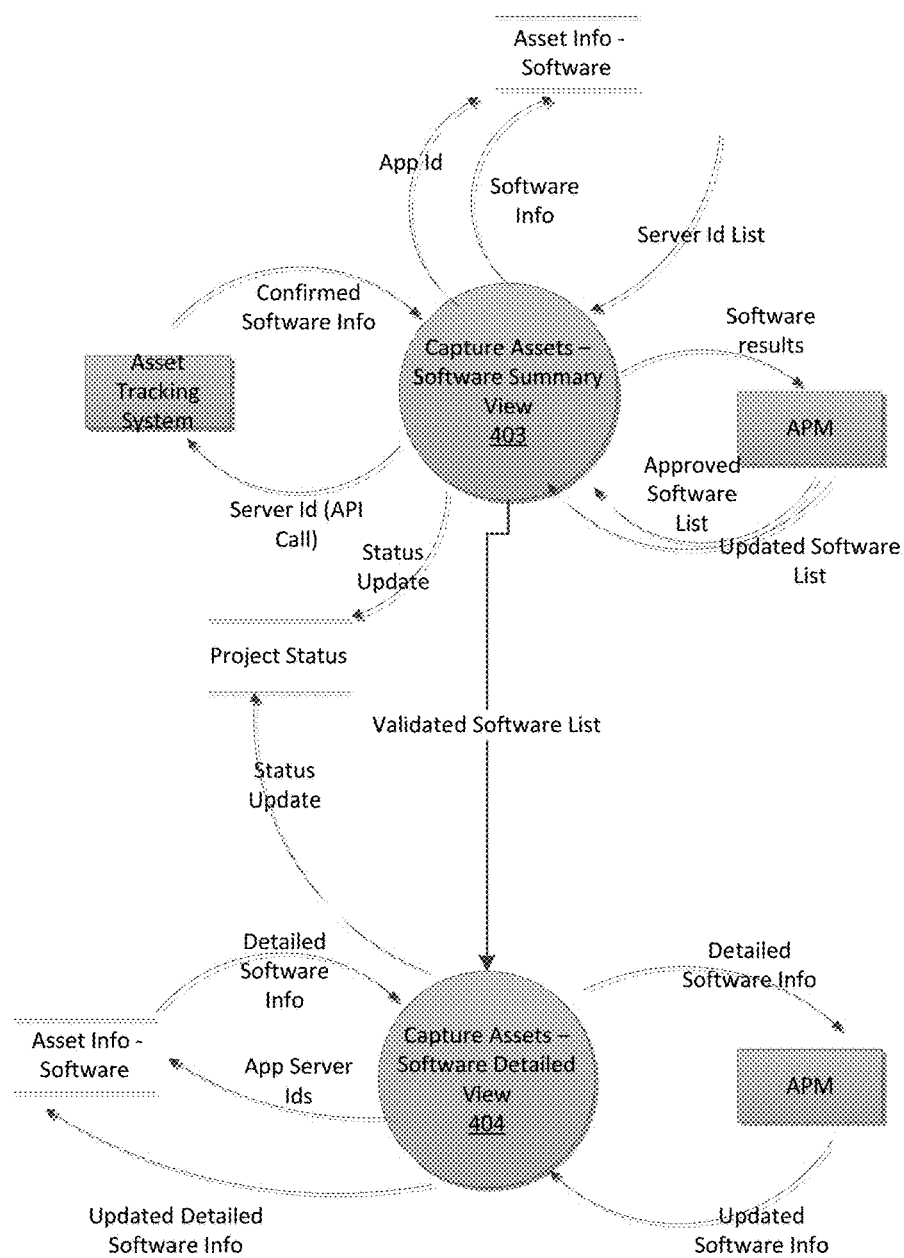

FIGS. 4A and 4B illustrate example workflows of a snapshot module 112 that may be carried out by an automated workflow management system 104 in accordance with aspects of this disclosure. The example workflows in FIGS. 4A and 4B illustrate flows corresponding to components configured to, in operation, capture information associated with assets of an application. The assets may include hardware assets and software assets. The automated workflow management system 104 may use the captured information during the subsequent steps of the life cycle of the service.

The example workflow in FIG. 4A illustrates flows corresponding to capturing information associated with hardware assets (e.g., servers, etc.). In this example, the flows include a capture assets—server summary view module 401 and a capture assets—server detailed view module 402. In at least one embodiment, modules 401 and 402 may be components or sub-modules that are a part of the snapshot module 112. It will be appreciated by those skilled in the art that in other examples, the snapshot module 112 may include additional or alternative components or sub-modules. For instance, the flows associated with the capture assets—server summary view module 401 and the capture assets—server detailed view module 402 may be combined, such that only one module may be required to capture both summary-level and detailed-level information associated with hardware assets.

The capture assets—server summary view module 401 may capture a current status of the project. The updated status may be stored in the project status database 124.

The capture assets—server summary view module 401 may make an API call to a corporate application inventory system with the application ID to obtain current information associated with the application. The current information may include a list of hardware assets associated with the application ID, and summary information associated with each hardware asset. The module 401 may then store the summary information associated with the hardware assets in the hardware asset info database 130. In some examples, the module 401 may provide the summary information to an application project manager for validation. As such, the module 401 may be configured to enable validation of the list of hardware assets and summary information by the application project manager. Further, the module 401 may be configured to receive additional information associated with the hardware assets from the application project manager.

The capture assets—server summary view module 401 may provide the validated list of hardware assets to the capture assets—server detailed view module 402. The capture assets—server detailed view module 402 may capture a current status of the project. The updated status may be stored in the project status database 124.

The capture assets—server detailed view module 402 may make API calls to an asset tracking system with an asset name to obtain detailed information about each asset in the validated list of hardware assets provided by the capture assets—server summary view module 401. The module 402 may then store the detailed information associated with the hardware assets in the hardware asset info database 130. In some examples, the module 402 may also provide the detailed information to an application project manager for validation. As such, the module 402 may be configured to enable validation of the detailed information by the application project manager, and further be configured to receive additional information associated with the hardware assets from the application project manager.

The example workflow in FIG. 4B illustrates flow corresponding to capturing information associated with software assets. In this example, the flows include a capture assets—software summary view module 403 and a capture assets—software detailed view module 404. In at least one embodiment, modules 403 and 404 may be sub-modules that are part of the snapshot module 112. It will be appreciated by those skilled in the art that in other examples, the snapshot module 112 may include additional or alternative components of sub-modules, For instance, the flows associated with the capture assets—software summary view module 403 and the capture assets—software detailed view 404 module may be combined, such that only one module may be required to capture both summary-level and detailed-level information associated with software assets.

The capture assets—software summary view module 403 may capture a current status of the project. The updated status may be stored in the project status database 124.

The capture assets—software summary video module 403 may make API calls to the asset tracking system using the hardware asset ID to obtain current information about each software asset associated with each hardware asset associated with the application. The current information may include a list of software assets associated with the hardware asset ID, and summary information associated with each software asset. The module 403 may then store the summary information associated with the software assets in the software asset info database 128. In some examples, the module 403 may provide the summary information to an application project manager for validation of the list of software assets and summary information by the application project manager. Further, the module 403 may be configured to receive additional information associated with the software assets from the application project manager.

The capture assets—software summary view module 403 may provide the validated list of software assets to the capture assets—software detailed view module 404. The capture assets—software detailed view module 404 may capture a current status of the project. The updated status may be stored in the project status database 124.

The capture assets—software detailed vide module 404 may store detailed information associated with the software assets in the software asset info database 128. The detailed information may include any additional information obtained from the application project manager, or from other external sources. In some examples, the module 404 may provide the detailed information to an application project manager for validation. As such, the module 404 may be configured to enable validation of the detailed information by the application project manager, and further be configured to receive additional information associated with the software assets from the application project manager.

Figure 5:
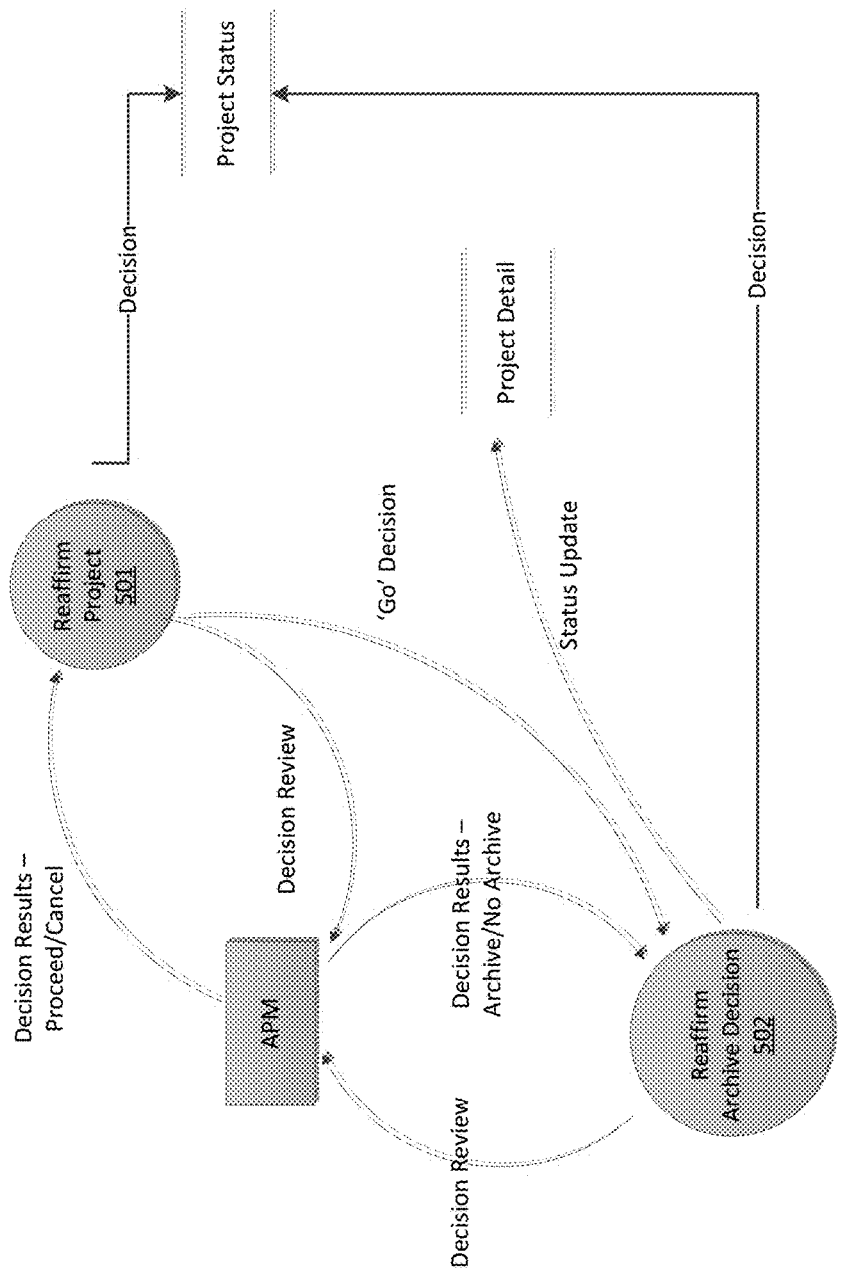
FIG. 5 is a block diagram of an example implementation of a decision module of an automated workflow management system.

FIG. 5 illustrates an example workflow of a decision module 114 that may be carried out by an automated workflow management system in accordance with aspects of this disclosure. The example workflow in FIG. 5 illustrates flows corresponding to components configured to, in operation, capture decisions on whether to pursue the project. The decisions may include whether to proceed with the project, and whether to archive. The automated workflow management system 104 may use the decisions captured by the decision module 114 during the subsequent steps of the life cycle of the service.

In at least one embodiment, the flows may include a reaffirm project module 501 and a reaffirm archive decision module 502. In some examples, the modules 501 and 502 may be components or sub-modules that are a part of the decision module 114. It will be appreciated by those skilled in the art that in other examples, the decision module 114 may include additional or alternative components or sub-modules.

The reaffirm project module 501 may determine whether to pursue the project (i.e. a go/no-go decision) based at least on the cost, resource, and asset information captured by the planning module 108, the initiation module 110, and the snapshot module 112. In some examples, the reaffirm project module 501 may be configured to have a default decision (e.g., always "go" or always "no-go"). In other examples, the reaffirm project module 501 may be configured to make a decision based on predetermined conditions for cost, resources, and assets. For instance, the reaffirm project module 501 may be configured to provide a "go" decision where the cost below a threshold value (e.g., cost of project is less than $X), where there are sufficient resources available for each role, where the assets are not blacklisted (e.g., assets associated with a particular application ID, hardware assets in a particular warehouse, etc.), or a combination thereof. Alternatively, the reaffirm project module 501 may be configured to provide a "no-go" decision where the predetermined conditions for cost, resources, and assets are not met.

In some examples, the reaffirm project module 501 may provide the decision to an application project manager for review. As such, the reaffirm project module 501 may be configured to enable review of the decision by an application project manager. The application project manager may either affirm or reject the decision made by the reaffirm project module 501. The application project manager's review of the decision may be based on the same or different predetermined conditions.

The reaffirm project module 501 may store the final decision (i.e. the decision by the application project manager if there is a review, or the decision by the reaffirm project module 501 if there is no review) in the project status database 124. For example, the reaffirm project module 501 may update the status of the project in the project status database 124 to be "Active" for a "go" decision, or to be "Cancelled" for a no-go" decision. Additionally, in some examples, the reaffirm project module 501 may include notes associated with decision, where the notes may be based on the predetermined conditions used to make the decision or additional information provided by the application project manager.

The reaffirm project module 501 may provide the final decision to the reaffirm archive decision module 502. The reaffirm archive decision module 502 may determine whether to archive an application, based at least on the cost, resource, and asset information captured by the planning module 108, the initiation module 110, and the snapshot module 112. In some examples, the reaffirm project module 502 may be configured to have a default decision (e.g., always "archive" or always "no archive"). In other example, the reaffirm archive decision module 502 may be configured to make a decision based on predetermined conditions for cost, resources, and assets.

In some examples, the reaffirm archive decision module 502 may provide the decision to an application project manager for review. As such, the reaffirm archive decision module 502 may be configured to enable review of the decision by an application project manager. The application project manager may either affirm or reject the decision made by the reaffirm archive decision module 502. The application project manager's review of the decision may be based on the same or different predefined conditions.

The reaffirm archive decision module 502 may store the final decision (i.e., the decision by the application project manager if there is a review, or the decision by the reaffirm archive decision module 502 if there is no review) in the project detail database 126. For example, the reaffirm archive decision module 502 may update the service of the project to "Application Retirement—Archive" for an "archive" decision, and to "Application Retirement—No Archive" for a "no archive" decision. Thus, the final decision may change the service ultimately provided by the automated workflow management system 104, and therefore, may change the life cycle associated with the project. Additionally, in some examples, the reaffirm archive decision module 502 may include notes associated with the decision, where the notes may be based on the predetermined conditions used to make the decision or additional information provided by the application project manager).

FIGS. 6A-6H illustrate example workflows of a requirements module 116 that may be carried out by an automated workflow management system in accordance with aspects of this disclosure. The example workflows in FIGS. 6A-6H illustrate flows corresponding to components, configured to, in operation, capture technical and functional project specifications that are critical to each service offered by the automated workflow management system 104. The requirements may include technical specifications for structured and unstructured data, archive specifications for structured and unstructured data (i.e., to specify what structured/unstructured data needs to be archived from the specified source, retrieval/reporting specifications, access specifications (i.e., to identify resources with access to the reports, and to identify encryption/masking needs for archival), retention specifications (i.e., to identify corporate and application-specific needs), data security specifications (i.e., to identify corporate policies for archival), and legal specifications.

Figure 6A:
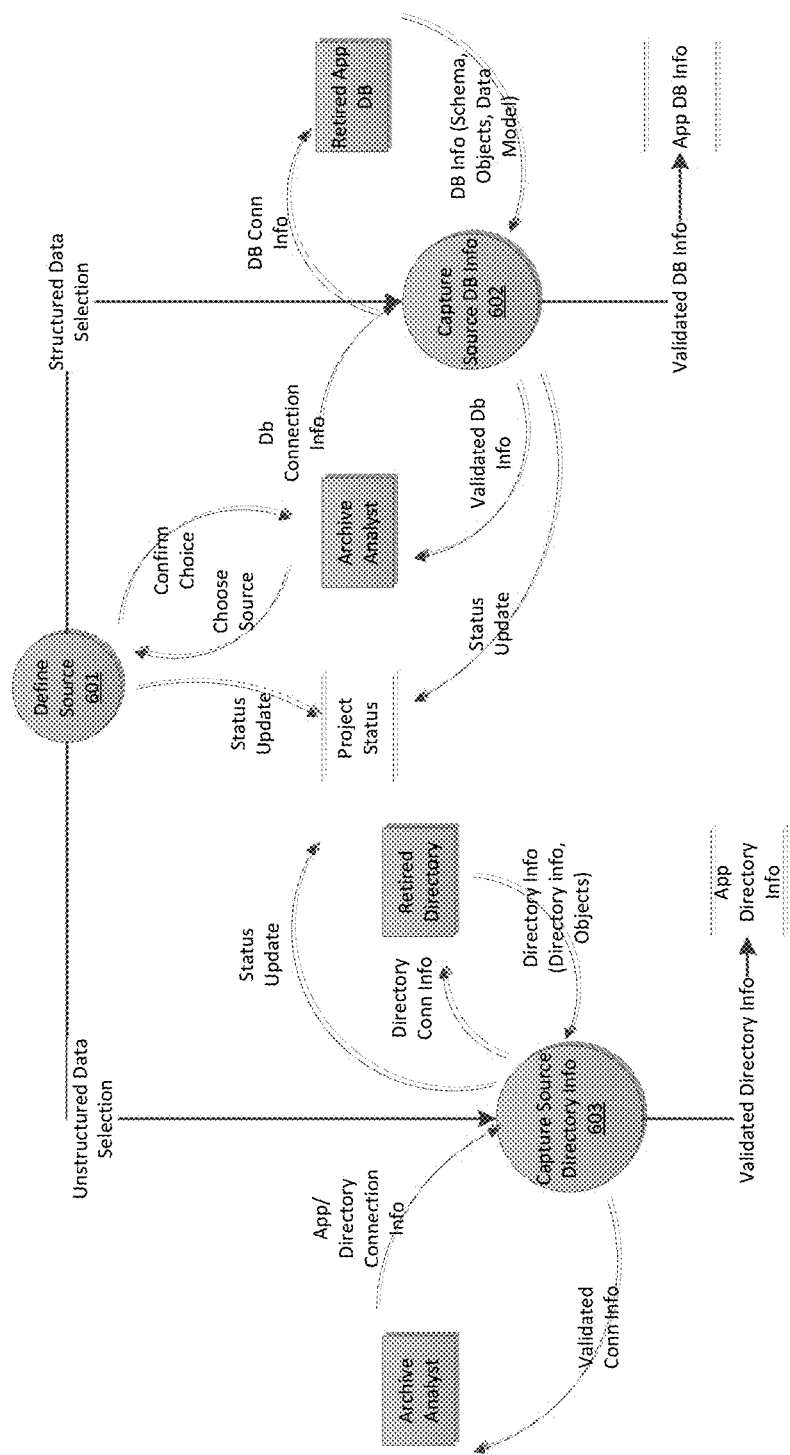
FIGS. 6A-H are block diagrams of an example implementation of a requirements capture module of an automated workflow management system.
Figure 6B:
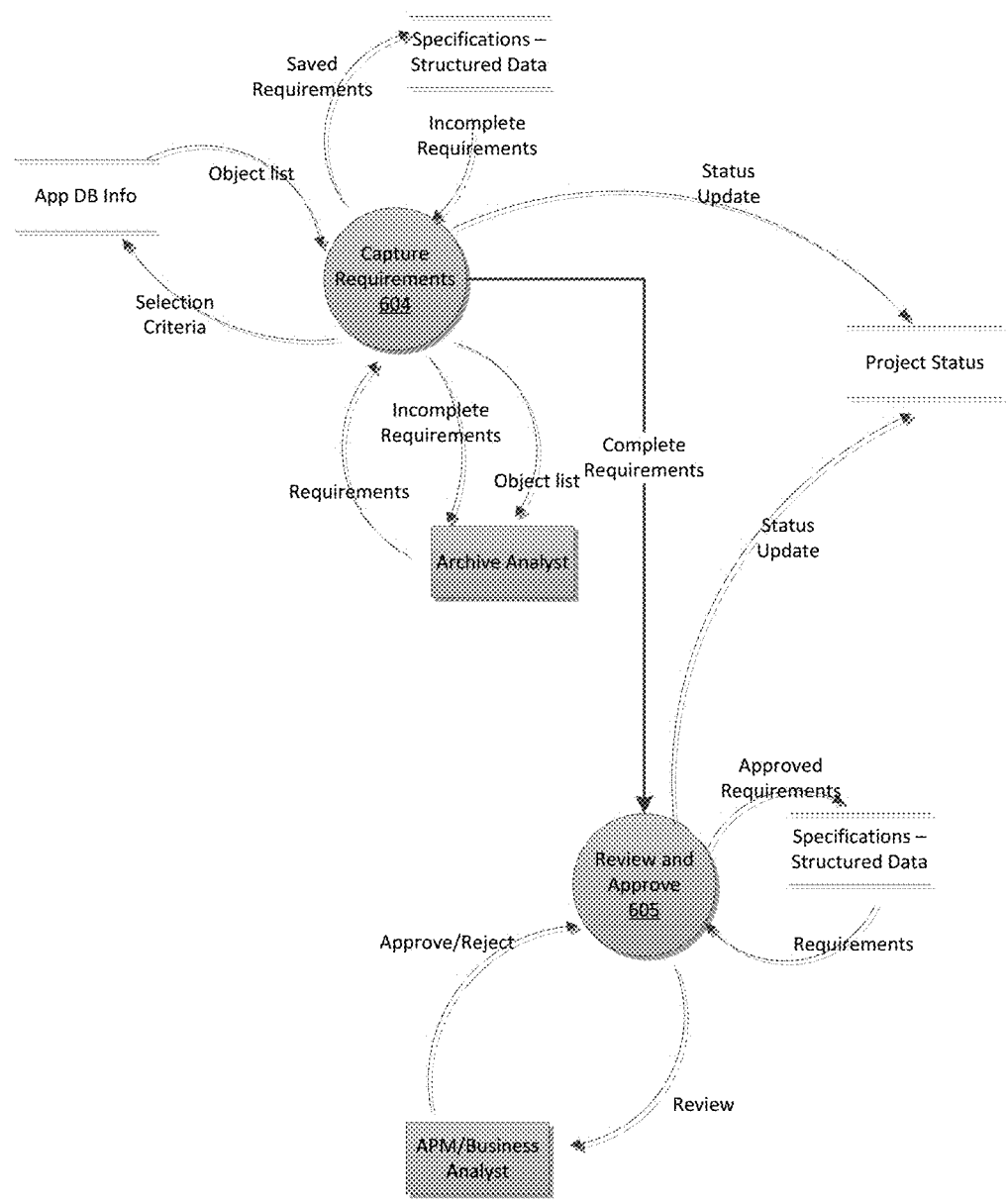
Figure 6C:
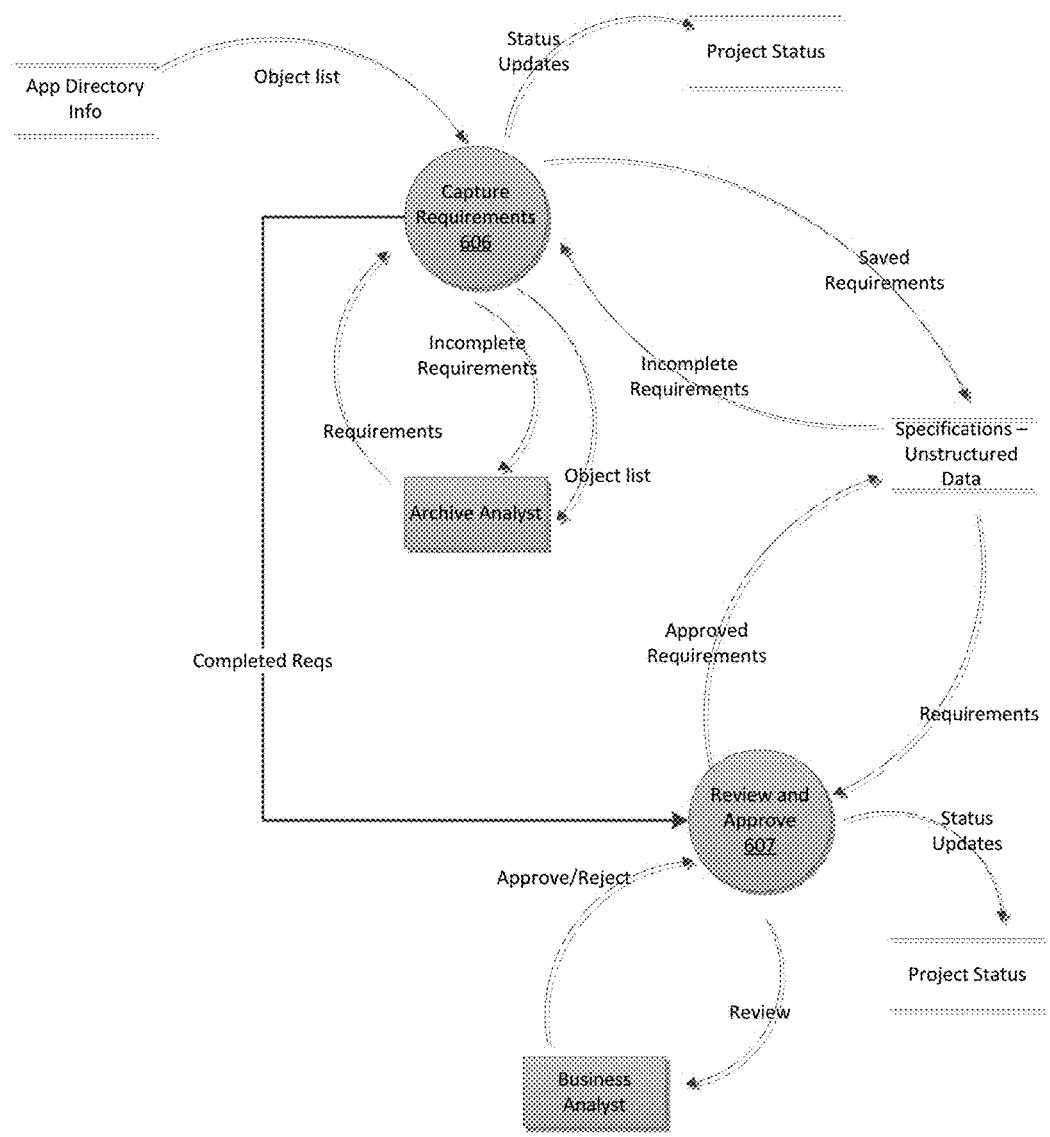
Figure 6D:
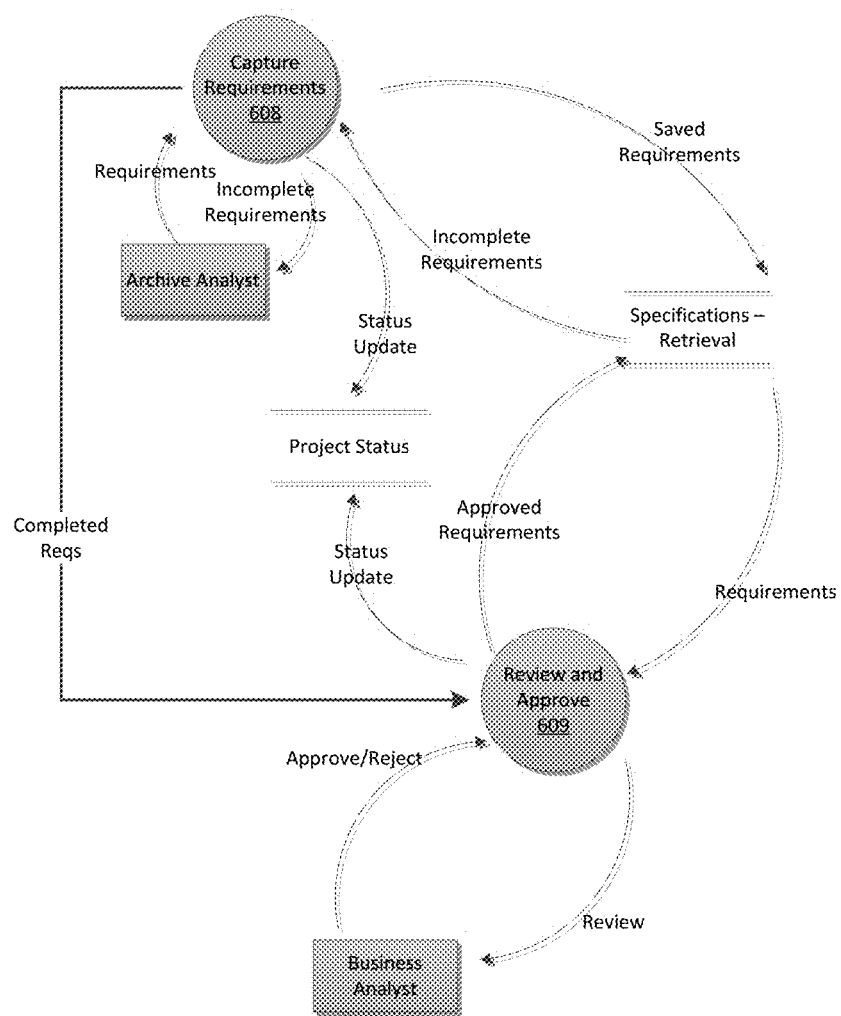
Figure 6E:
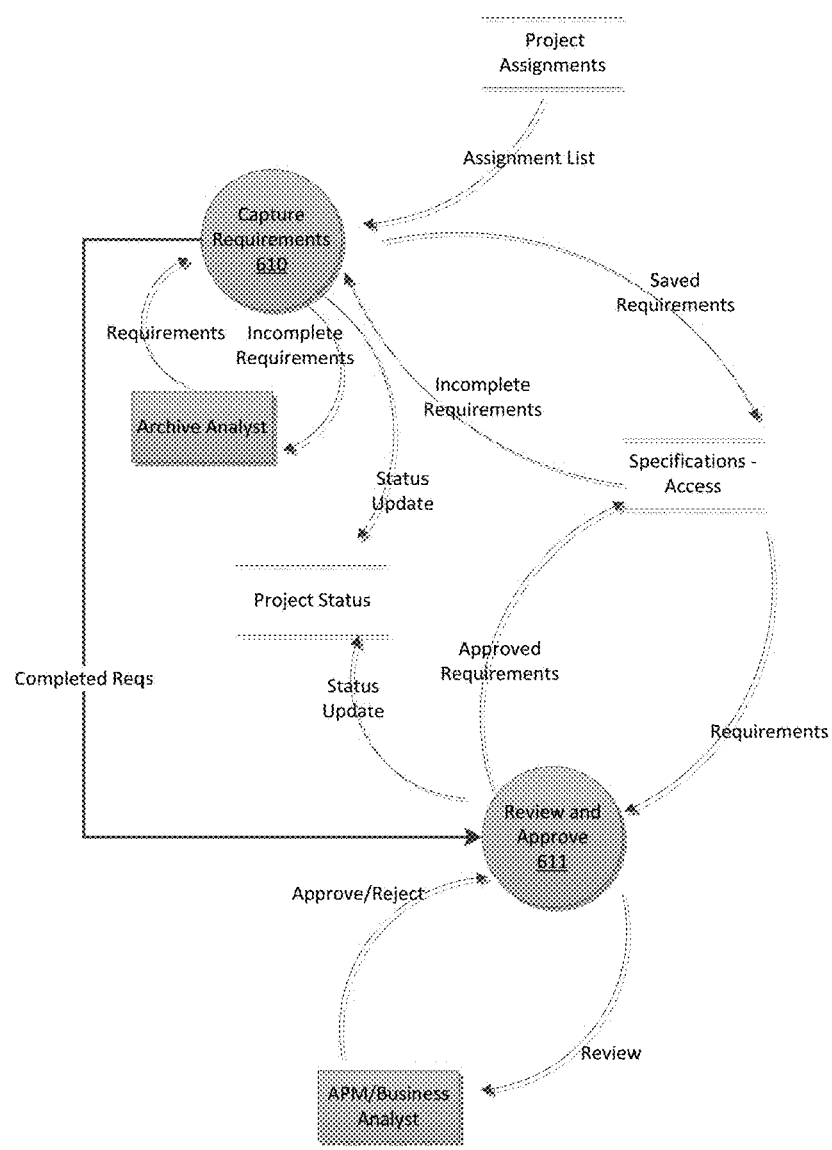
Figure 6F:
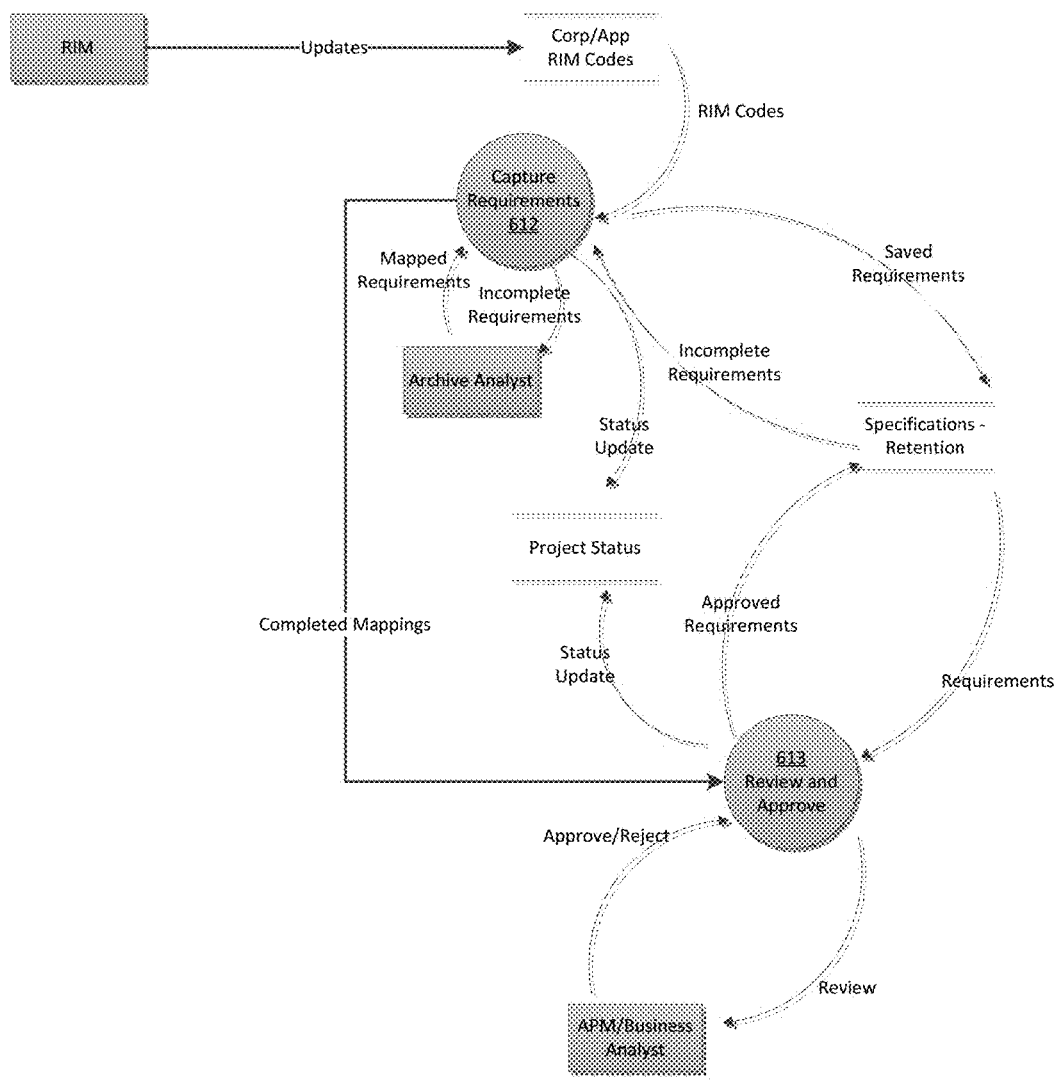
Figure 6G:
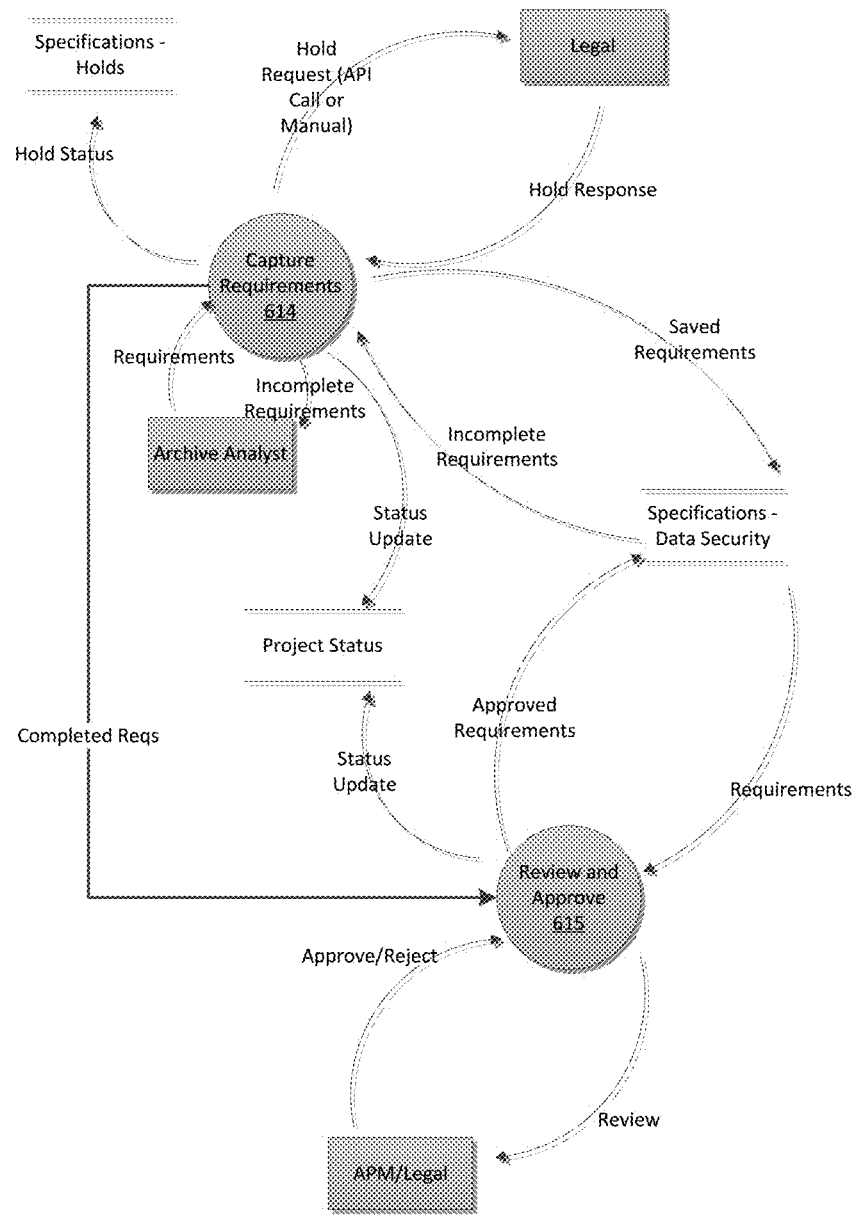

The example in FIG. 6A illustrates flows corresponding to preparation for archiving structured and unstructured data. In this example, the flows include a define source module 601, a capture source database info module 602, and a capture source directory info module 603. In at least one embodiment, modules 601, 602, and 603 are components or sub-modules that are a part of the requirements module 116. It will be appreciated by those skilled in the art that in other examples, the requirements module 116 may include additional or alternative components or sub-modules.

The define source module 601 may capture a current status of the project. The updated status may be stored in the project status database 124.

The define source module 601 may choose a data source, and in some examples, may be configured to confirm that choice with an archive analyst. The source may be either a structured or unstructured data source. The source selection may include connection information to either a structure data source (e.g., database, etc.) or an unstructured data source (e.g., .xls, .csv, .pdf, images, etc.). The archive analyst may either affirm or reject the choice made by the define source module 601. Responsive to the archiving analyst affirming the choice, the define source module 601 may delegate to the capture source database info module 602 and/or the capture source directory info database 603. For example, the define source module 601 may make a request to the capture source database info module 602 to capture the objects that will be required for structured data archiving based on the source selection. Additionally or alternatively, the define source module 601 may make a request to the capture source directory info 603 to capture the objects that will be required for unstructured data archiving based on the source selection.

Where the selected source is a structured data source, the capture source database info module 602 may make an API call to a retired application repository using the database connection information provided by the define source module 601 in the source selection. In some embodiments, the retired application repository may be a database. The retired application repository, in response, may return database info for the selected source, including schemas, objects, and data models associated with the database. In some examples, the retired application repository may return some or all of the objects associated with the database, based on predetermined conditions to determine whether an object needs to be archived. For instance, the retired application database may only return objects having tables with more than 1 row. Alternatively, where a retired application repository does not exist or is otherwise unavailable, the capture source database info module 602 may be configured to allow an archive manager to provide (e.g., upload) relevant database information (e.g., through a spreadsheet).

In some examples, the module 602 may provide the database info to the archive analyst for validation. As such, the module 602 may be configured to enable validation of the detailed information by the archive analyst. The module 602 may store the captured database information in an application database info repository. In at least one embodiment, the application database info repository may include an ID, a schema name, an object name, an object type (e.g., table, index, view, etc.), an indicator for whether the information was validated by an archive analyst, and one or more notes (e.g., from the archive analyst).

The capture source database info module 602 may capture a current status of the project. The updated status may be stored in the project status database 124.

Where the selected source is an unstructured data source, the capture source directory info 603 may make an API call to a retired directory repository using the directory connection information provided by the define source module 601 in the source selection. The retired directory repository, in response, may return directory info for the selected source, including objects and associated metadata (e.g., file type, file size, etc.). Alternatively, where a retired directory repository does not exist or is otherwise unavailable, the capture source directory info module 603 may be configured to allow an archive manager to provide (e.g., upload) relevant database information (e.g., through a spreadsheet).

In some examples, the module 603 may provide the directory info to the archive analyst for validation. As such, the module 603 may be configured to enable validation of the detailed information by the archive analyst. The module 603 may store the capture directory information in an application directory repository. In at least one embodiment, the application directory repository may include an ID, a data source (e.g. a document/content management system such as FileNet, Documentum, etc., a directory or file path, a drive, or other location), a file type (e.g., .pdf, .csv, .doc, .xls, etc.), an estimated total object size, and one or more notes (e.g., from the archive analyst).

The capture source directory module 603 may capture a current status of the project. The updated status may be stored in the project status database 124.

FIGS. 6B-G illustrate flows corresponding to the capturing archive, retrieval, access (e.g., by users of the automated workflow management system 104), retention, and data security requirements. In these examples, the flows include a capture requirements module 604, 606, 608, 610, 612, 614 and a review and approve module 605, 607, 609, 611, 613, 615. In at least one embodiment, modules 604-615 are components or sub-modules that are a part of the requirements module 116. It will be appreciated by those skilled in the art that in other examples, the requirements module 116 may include additional or alternative components or sub-modules. For instance, the flows associated with modules 604-615 may be combined, such that there is one capture requirements module and one review and approve module are used for capturing, reviewing, and approving all of the necessary types of requirements.

The capture requirements module 604, 606, 608, 610, 612, 614 may capture a current status of the project. The updated status may be stored in the project status database 124.

The capture requirements module 604, 606, 608, 610, 612, 614 may be configured to generate one or more specifications for structured data archive, unstructured data archive, retrieval, retention, and data security, respectively. In some examples, the capture requirements module 604, 606, 608, 610, 612, 614 may perform a comparison between the attributes of the current state of the application and the desired end state of the application to determine one or more tasks that need to be performed, such that performance of those tasks results in a desired end state. As such, the capture requirements module 604, 606, 608, 610, 612, 614 may be configured to retrieve and analyze information captured by other modules of the automated workflow management system 104. For instance, the capture requirements module 604 may retrieve a list of objects from the application database info repository, the capture requirements module 606 may retrieve a list of objects from the application directory info repository, and the capture requirements module 610 may retrieve a list of assignments from the project assignments database. In other instances, the capture requirements module 612 may receive one or more policies from an external system (e.g., a corporate RIM data retention policies system, an application-specific RIM data retention policies system, etc.).

In other examples, the capture requirements module 604, 606, 608, 610, 612, 614 may request for requirements from an archive analyst. In yet other examples, the capture requirements module 604, 606, 608, 610, 612, 614 may be able to determine at least a part of requirement, whereby it may provide the incomplete requirement to an archive analyst for completion.

The capture requirements module 604, 606, 608, 610, 612, 614 may store the completed requirements in a specifications database. In some examples, there may be a single specifications database including requirements for structured/unstructured data archive, retrieval, access, data retention, and/or data security. In other examples, there may be separate specifications databases for structured/unstructured data archive, retrieval, access, data retention, or some combination thereof. A structured data specifications database may include an ID, a schema name, an object name, an object type (e.g., table, index, view, etc.), a business rule, and SQL code. An unstructured data specifications database may include an ID, a data source, a file type, an estimated total object file size, and a business rule. A retrieval specifications database may include a report ID, a report name, a report description, SQL code, a number of users, an execution frequency, and one or more notes (e.g., from the archive analyst). An access specifications database may include a security ID, a user ID, a user name, a role, a security responsibility (e.g. LOV), a security description, and one or more notes (e.g., form the archive analyst). A retention specifications database may include a data retention ID, a data retention code, a data retention rule, a data retention type (e.g. corporate, application, etc.), a mapped specifications, and one or more notes (e.g., from the archive analyst).

In some examples, the requirements capture module 116 may also include a review and approve module 605, 607, 609, 611, 613, 615, such that the specifications generated by the capture requirements module 604, 606, 608, 610, 612, 614 may be reviewed and approved by an application project manager. The application project manager may either approve or reject the specifications generated by the capture requirements module 604, 606, 608, 610, 612, 614. In such examples, the specifications database may further include a decision (e.g., Approved, Denied, etc.), a reason for the decision, a timestamp, an approver ID (e.g., of the application project manager), and approver name (e.g., of the application project manager).

Further, the review and approve module 605, 607, 609, 611, 613, 615 may capture a current status of the project. The updated status may be stored in the project status database 124.

Figure 6H:
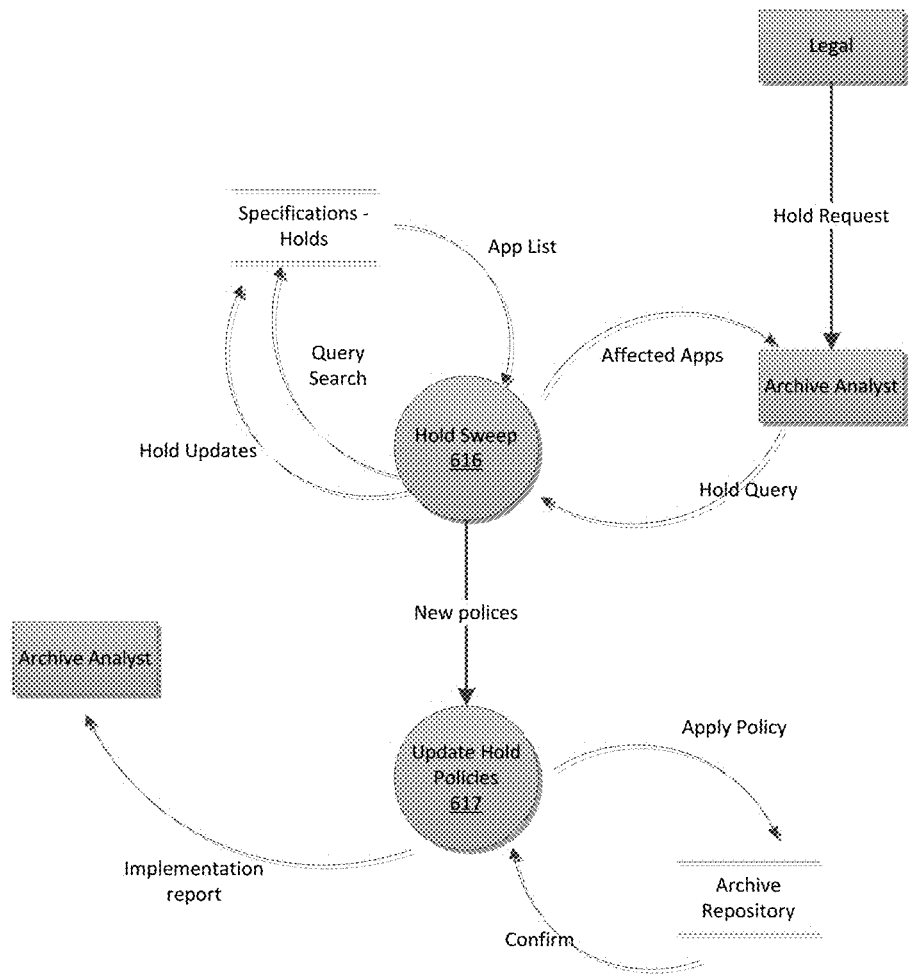

FIG. 6H illustrates an example workflow corresponding to performing legal hold sweeps. As such, this workflow enables a legal sweep of archive repositories or active projects, to ensure that data subject to a legal hold is maintained as required. In this example, the flow includes a hold sweep module 616 and an update hold policies module 617. In at least one embodiment, modules 616 and 617 may be components or sub-modules that are a part of the requirements capture module 116. It will be appreciated by those skilled in the art that in other examples, the requirements capture module 116 may include additional or alternative components or sub-modules.

An archive analyst may receive notice of a new or updated hold request from a legal department or legal system. Responsive to the hold request, the hold sweep module 616 may receive a request for a hold query from the archive analyst. Accordingly, the hold sweep module 616 may be configured to perform a hold query on a legal holds specifications database to determine whether any applications are subject to the new or updated hold request. As such, the hold sweep module 616 may be configured to receive a list of applications subject to the new or updated hold request. Based on the list of applications and the hold request, the hold sweep module 616 may generate a new set of hold policies.

The hold sweep module 616 may provide the new set of hold policies to the update hold policies module 617. The update hold policies module 617 may be configured to apply each of the hold policies in the new set of hold policies to the designated archive repository or active project. In some examples, the hold sweep module 616 may receive a confirming that the new set of hold policies have been applied to the archive repository. Further, in at least one embodiment, the update hold policies module 617 may generate an implementation report, where the report may include details about the new set of hold policies and its application to the archive repository (e.g., time of application, number of records affected, duration of hold, etc.). The hold sweep module 616 may provide the implementation report to the archive analyst.

Figure 7A:
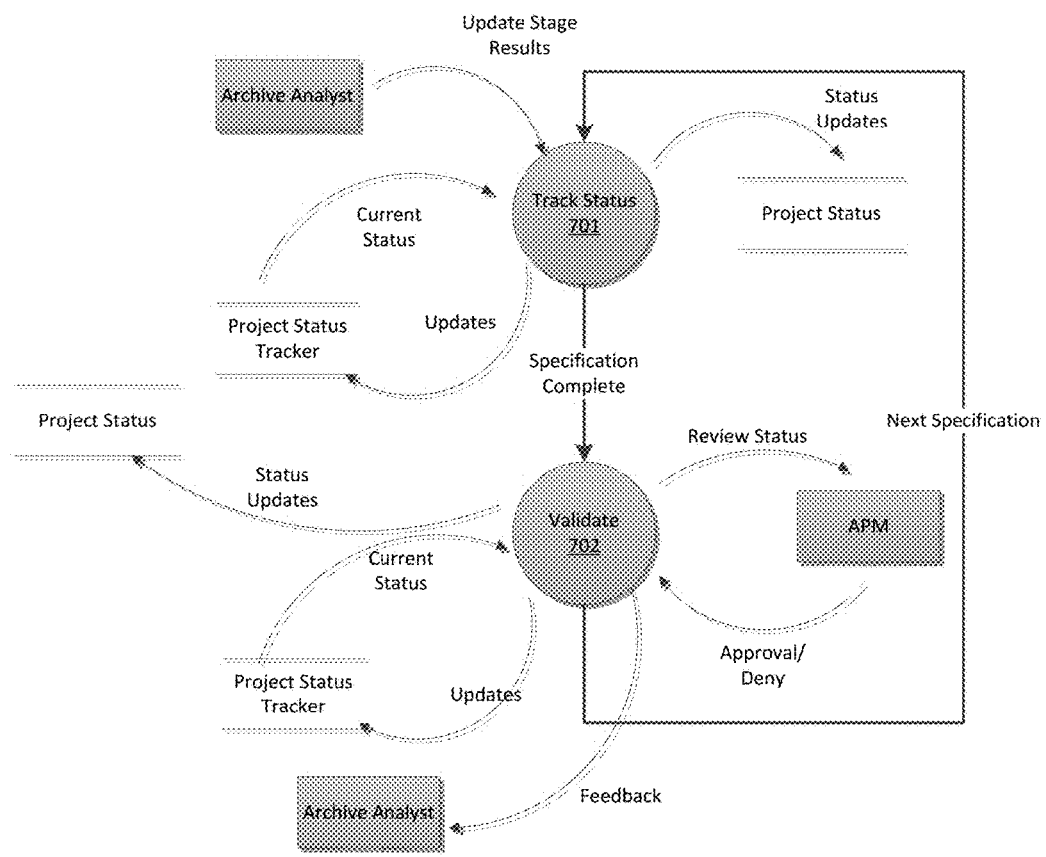
FIGS. 7A-B are block diagrams of an example implementation of a status tracker module of an automated workflow management system.
Figure 7B:
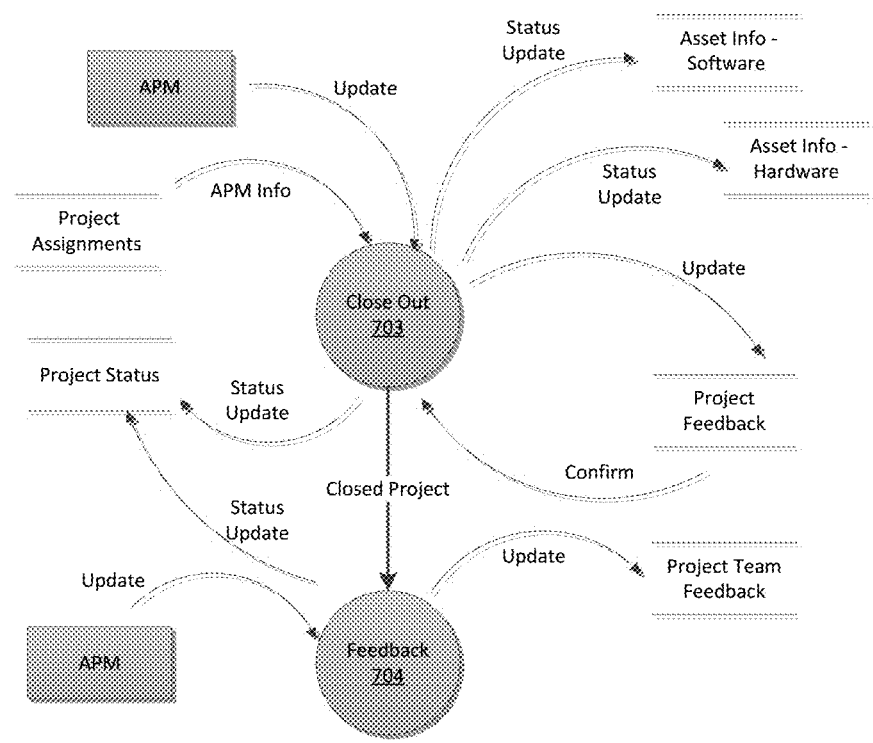

FIGS. 7A and 7B illustrate example workflows of a status tracker module 118 that may be carried out by an automated workflow management system in accordance with aspects of this disclosure. The example workflows in FIGS. 7A and 7B illustrate flows corresponding to components configured to, in operation, track the status of archive, retrieval, retention, and data security, and when completed, prepare the project for close out.

The example workflow in FIG. 7A illustrates flows corresponding to tracking the status of archive, retrieval, retention, and data security related activities though the life cycle. In this example, the flows include a track status module 701 and a validate module 702. In at least one embodiment, modules 701 and 702 may be components or sub-modules that are a part of the status tracker 118. It will be appreciated by those skilled in the art that in other examples, the status tracker module 118 may include additional or alternative components or sub-modules. For example, the flows associated with the track status module 701 and the validate module 702 may be separated by the type of activity, resulting in a pair of track status module 701 and validate module 702 for each of archive, retrieval, retention, and/or data security.

The track status module 701 may be configured to track the status of the implementation of the specifications generated by the requirements capture module 116. For example, the track status module 701 may retrieve a list of specifications associated with a particular activity (e.g., archive, retrieval, retention, data security) from the specifications database(s). For each specification in the retrieved list of specifications (e.g., an archival state, a retrieval report, a corporate/application-specific retention policy, a data security policy, etc.), the track status module 701 may repeatedly (e.g., at regular intervals) query a project status tracker repository to determine the current status of the implementation of the specification. Where there is a change in the status of the implementation, the track status module 701 may update the project status database 124 accordingly. The track status module 701 may continue querying the project status tracker repository until the implementation of the activity (e.g., archive, retrieval, retention, data security) is complete per the specifications provided in the specifications database(s).

Once the track status module 701 deems that an activity has been completed, the validate module 702 may provide confirmation of such completion. As such, the validation module 702 may be configured to compare the list of specifications retrieved from the specifications database(s) to the project status tracker database to ensure there are no discrepancies. These comparisons may be considered to be an audit by the validation module 702 of the tasks performed by the track status module 701. In some examples, the validation module 702 may also enable review by an application project manager. The application project manager may either approve or deny the completion of the activity.

Upon validation of the completion of an activity, the validate module 702 may trigger the track status module 701 to begin tracking the next specification. The process continues until all specifications associated with the activity have been tracked and validated.

In some examples, the example workflow shown in FIG. 7A may be repeated for one or more stages (e.g., development, optimization, final, etc.). As such, the specifications associated with a particular activity may be iteratively modified during each stage.

FIG. 7B illustrates an example workflow corresponding to performing a close out of a project once all the previous project phases have been completed. In this example, the flow includes a close out module 703 and a feedback module 704. In at least one embodiment, modules 703 and 704 may be components or sub-modules that are a part of the status tracker module 118. It will be appreciated by those skilled in the art that in other examples, the status tracker module 118 may include additional or alternative components or sub-modules.

The close out module 703 is configured to update the status of the project in the project status database 124 to Close Out. Additionally, the close out module 703 may update the software asset info database 128 such that all software assets associated with the application have a status of Under License Review. Further, the close out module 703 may update the hardware asset info database 130 such that all hardware assets associated with the application have a status of Retiring. The updates performed by the close out module 703 may be in preparation for the retirement module 120.

In some examples, the close out module 703 may be configured to receive updates from an application project manager. The close out module 703 may update databases of the automated workflow management system 104 based on additional updates from the application project manager. The close out module 703 may also be configured to retrieve resource information from the project assignments database. The close out module 703 may provide the resource information to the application project manager for reference.

The feedback module 704 may be configured to capture feedback from the application project manager or resources associated with the project. For example, the feedback module 704 may store any remarks and supporting documentation in a project feedback database. The project feedback database may include a close out ID, a close reason code, one or more remarks, one or more supporting documents, and a timestamp.

The feedback module 704 may also be configured to capture feedback from the customer. For example, the feedback module 704 may store the customer's feedback in a project team feedback database, where the database may include a customer service rating (e.g., a numerical value between 1 and 5), a timeliness of delivery rating (e.g., a numerical value between 1 and 5), a professionalism rating (e.g., a numerical value between 1 and 5), an overall satisfaction rating (e.g., a numerical value between 1 and 5), and one or more remarks.

In some examples, the feedback module 704 may update the project status database 124 with an updated timestamp once all feedback has been captured and stored.

FIGS. 8A-H illustrate example workflows of a retirement module 120 that may be carried out by an automated workflow management system in accordance with aspects of this disclosure. The example workflows in FIGS. 8A-D illustrate flows corresponding to components configured to, in operation, retire (e.g., repurpose, decommission, etc.) software and hardware assets associated with an application. For example, the retirement module 120 may analyze all software assets associated with an application to ensure that all maintenance contracts are reviewed, cancelled, or repurposed. In other examples, the retirement module 120 may analyze all the hardware assets associated with an application to ensure that the physical aspects of the environment (e.g., servers) are repurposed or decommissioned. A hardware asset that is repurposed may be associated with or used for a different application at a later time. A hardware asset that is decommissioned may be disconnected from the enterprise network, such that it may not be associated with or used for a different application at a later time. In some examples, the hardware asset may be taken off the data center floor.

As such, the retirement module 120 enables the user of the automated workflow management system 104 to track software and hardware assets in an enterprise network after the application retirement phase has been closed out. In some examples, the retirement module 120 may also a final end state of the software and hardware assets associated with a retired application, such that an actual cost savings and/or cost avoidance of the project can be determined. The cost savings and/or cost avoidance may be a factor in determining the overall ROI of retiring the application.

Figure 8A:
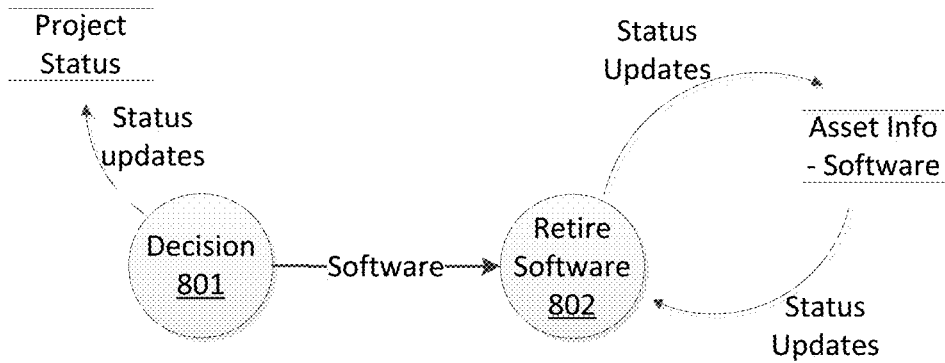
FIGS. 8A-E are block diagrams of an example implementation of a retirement module of an automated workflow management system.

The example workflow in FIG. 8A illustrates flows corresponding to retiring software assets associated with an application. In this example, the flows include a decision module 801 and a retire software module 802. In at least one embodiment, modules 801 and 802 may be components or sub-modules that are a part of the retirement module 120. It will be appreciated by those skilled in the art that in other examples, the retirement module 120 may include additional or alternative components or sub-modules.

The decision module 801 may be configured to determine what type of assets (i.e., software or hardware) needs to be addressed, and the order in which they need to be addressed (e.g., software assets first, hardware assets first, software and hardware assets in parallel, etc.). In some examples, the order may be based on priority defined by a customer of the automated workflow management system 104. Based on the determination, the decision module 801 may trigger execution of the retire software module 802 for software assets and/or the mapping module 803 for hardware assets. Module 803, and other modules addressing hardware assets, will be described in further detail below. The decision module 801 may also capture a current status of the project. The updated status may be stored in the project status database 124. For example, the decision module 801 may update the project status database 124 such that the project has a status of Retiring.

The retire software module 802 addresses software assets, and may be triggered by the decision module 801 as described above. The retire software module 802 may address software assets associated with an application. As such, the retire software module 802 may determine a list of software assets associated with the application. This information may be retrieved from the software asset info database 128 based on the application ID. The retire software module 802 may update the software asset info database 128 such that all software assets associated with the application have a status of Under License Review.

For each software asset in the list of software assets associated with the application, the retire software module 802 may determine the contract type and vendor of the software asset, based at least in part on the information retrieved from the software asset info database 128. In some examples, the retire software module 802 may determine that a software maintenance license may be cancelled (e.g., where the license may not be reused or repurposed, etc.). In other examples, the retire software module 802 may determine that a software maintenance license may not be cancelled (i.e. where the license must be reused or repurposed). In such examples, the software maintenance license may be tied to an Enterprise License Agreement (e.g., database licenses, operating system licenses, product/function specific licenses, such as INFORMATICA for data transformation and archiving, UC4 for automation, and ORACLE for analytics, etc.), where the expiration date of the agreement has not yet been reached. Based on this determination, the retire software module 802 may update the software asset info database 128 such that the software asset has a status of License Cancelled or License Repurposed. The retire software module 802 may repeat this process for the remaining software assets in the list of software assets.

Figure 8B:
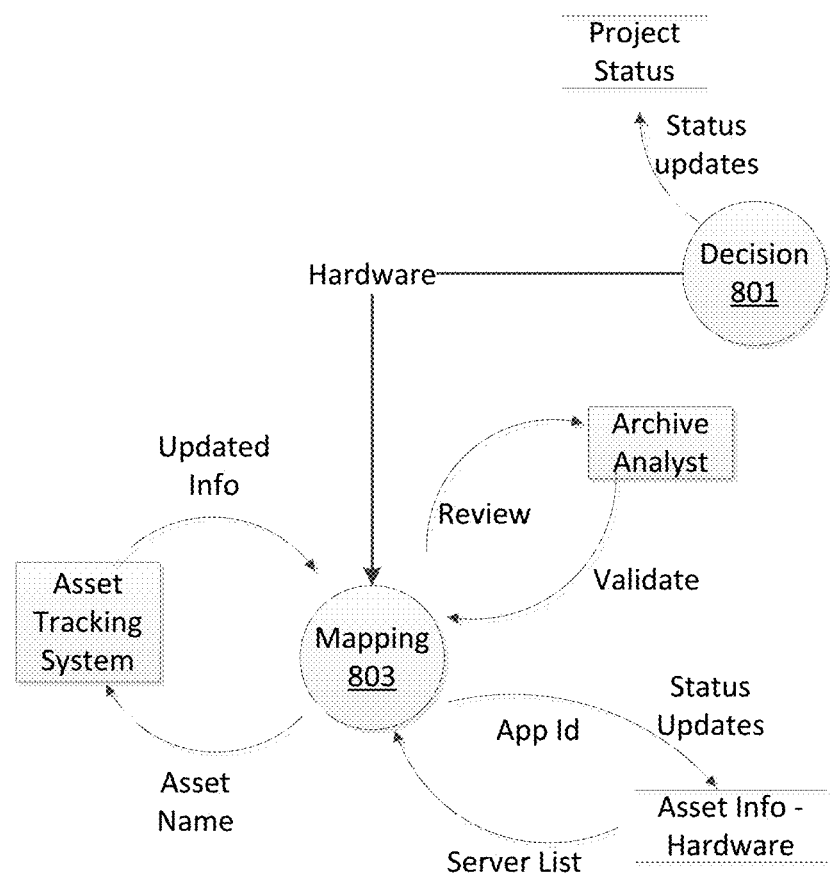

The example workflow in FIG. 8B illustrates flows corresponding to retiring hardware assets associated with an application. In this example, the flows include a decision module 801 and a mapping module 803. In at least one embodiment, module 801 and 803 may be components or sub-modules that are a part of the retirement module 120. It will be appreciated by those skilled in the art that in other examples, the retirement module 120 may include additional or alternative components or sub-modules.

The decision module 801 may operate as described above with respect to FIG. 8A. The mapping module 803 may be triggered by the decision module 801 as described above. The mapping module 803 may address hardware assets associated with an application. As such, the mapping module 803 may determine a list of hardware assets associated with the application. This information may be retrieved from the hardware asset info database 130 based on the application ID.

In some examples, for each hardware asset in the list of hardware assets associated with the application, the mapping module 803 may make API calls to a corporate asset tracking system to validate the information retrieved from the hardware asset info database 130. Where the mapping module 803 finds discrepancies between the information retrieved from the hardware asset info database 140 and the corporate asset tracking system, the mapping module 803 may reconcile the discrepancies. In some examples, the mapping module 803 may be configured to use the information retrieved from the corporate asset tracking system. In other examples, the mapping module may be configured enable an archive analyst to review and reconcile the discrepancies.

For each hardware asset in the list of hardware assets associated with the application, the mapping module 803 may determine a server type, a platform, and whether the asset is shared, based at least in part on the information retrieved from the hardware asset info database 130, the corporate asset tracking system, or a combination thereof. The mapping module 803 may use this information to determine whether determine whether a hardware asset should be repurposed, decommissioned, or bypassed. As such, the mapping module 803 may maintain a set of conditions to determine whether a hardware asset should be repurposed, decommissioned, or bypassed. It will be appreciated by those skilled in the art that the mapping module 803 may use additional or alternative attributes of a hardware asset to determine the appropriate method of retirement. In some examples, the mapping module 803 may determine that a hardware asset should be repurposed where its server type is Virtual, its platform is Client/Server, and it is associated with other applications (i.e., the asset is shared). In other examples, the mapping module 803 may determine that a hardware asset should be decommissioned where it is not associated with other applications (i.e. the asset is not shared). For instance, the mapping module 803 may determine that a hardware asset should be decommissioned where its server type is Physical, its platform is Client/Server, and it is not associated with other applications. In another example, the mapping module 803 may determine that a hardware asset should be decommissioned where it server type is Virtual, its platform is Client/Server, and it is not associated with other applications. As such, for an application associated with multiple hardware assets, the mapping module 803 may determine that a subset of these hardware assets should be repurposed and another subset of these applications should be decommissioned. It will be appreciated by those skilled in the art that the mapping module 803 may use additional or alternative conditions in determining the appropriate method of retirement.

In some examples, these subset of hardware assets may be disjoint (i.e., a hardware asset may not be both repurposed and decommissioned). In such examples, the conditions will be configured such that a hardware asset will only satisfy one condition. Further, in alternate embodiments, even where a hardware asset may satisfy more than one condition, the conditions may be ranked. As such, even where a hardware asset meets two conditions, the mapping module 803 may place the hardware asset in the subset associated with the higher-ranked condition.

In some embodiments, where the mapping module 803 determines that a hardware asset cannot be repurposed or decommissioned, the mapping module 803 may elect to bypass the hardware asset. As such, the mapping module 803 may instruct the automated workflow management system 104 not to address a particular hardware asset (i.e. a no-op). For example, the mapping module 803 may determine that a mainframe system should be bypassed. The determination may be based on, inter alia, the ROI of repurposing or decommissioning a mainframe asset using the automated workflow management system 104. In such examples, the mapping module 803 may create a ticket or a new project for manual retirement of the mainframe asset.

Accordingly, based on these determinations, the mapping module 803 may provide a list of hardware assets for repurposing (a first subset of all hardware assets associated with the application) to the repurpose life cycle tracker module 804. Similarly, the mapping module 803 may provide a list of hardware assets for decommissioning (a second subset of all hardware associated with the application) to the decommission life cycle tracker module 805. Modules 804 and 805 will be discussed in further detail below. In some examples, the mapping module 803 may provide the list of hardware assets for repurposing and decommissioning to an archive analyst for review.

Figure 8C:
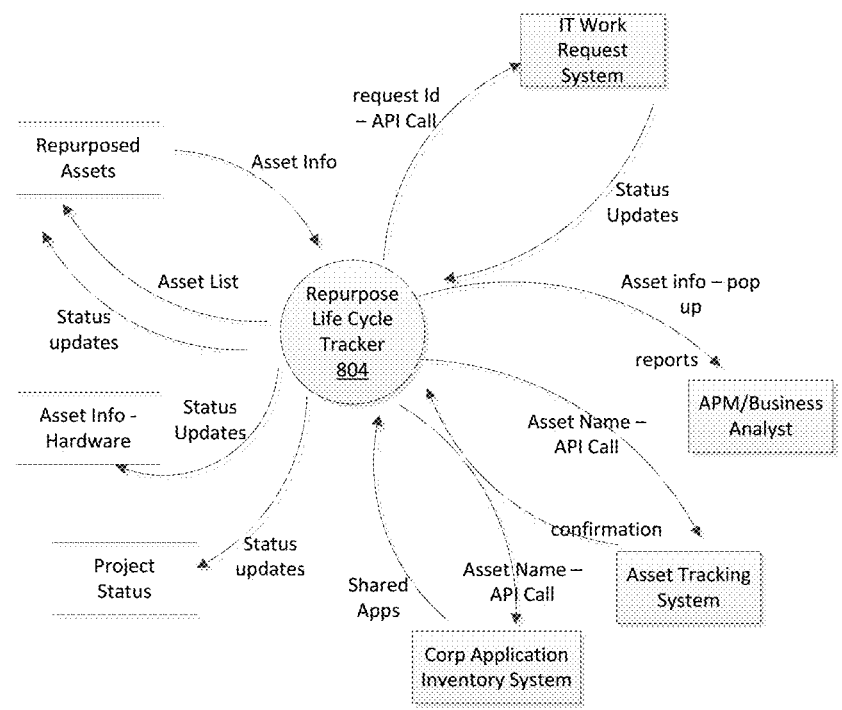

FIG. 8C illustrates an example workflow corresponding to repurposing hardware assets. In this example, the flow includes a repurpose life cycle tracker module 804. In at least one embodiment, module 804 may be a component or a sub-module that is a part of the retirement module 120. It will be appreciated by those skilled in the art that in other examples, the retirement module 120 may include additional or alternative components or sub-modules.

The repurpose life cycle tracker module 804 may be configured to receive a list of hardware assets to be repurposed from the mapping module 803. In some examples, the repurpose life cycle tracker module 804 may receive an asset ID, an application ID, an application name, an asset type, and an asset name for each hardware asset in the list of hardware assets. The repurpose life cycle tracker module 804 may store the list of hardware assets in a repurposed assets database. In addition to storing the information received from the mapping module 803, the repurpose life cycle tracker module 804 may also use the repurposed assets database to capture a current status of the hardware asset in the life cycle. Thus, the retirement module 120 may use both the hardware asset info database 130 and the repurposed assets database to capture a current status of the hardware asset. In some examples, the retirement module 120 may use the hardware asset info database 130 to capture a high-level status of the hardware asset, and the repurpose assets database to capture a detailed status of the hardware asset as it progresses through the workflow corresponding to the repurpose life cycle tracker module 804. For example, the repurpose life cycle tracker module 804 may update the hardware asset info repository such that the status of the asset is Retiring and the end state designation is N/A.

For each hardware asset in the list of hardware assets to be repurposed, the repurpose life cycle tracker module 804 may make API calls to a corporate asset tracking system to retrieve a list of applications (e.g., by application ID) that share the hardware asset. As such, the repurpose life cycle tracker module 804 may determine how many other applications are associated with the hardware asset. Such information may be used to gauge the impact of storage reclamation efforts. For instance, where multiple applications share the same data storage, the automated workflow management system 104 may coordinate with the other applications prior to initiating reclamation of the current asset. As such, the automated workflow management system 104 may minimize the number of application outages caused by retirement of a hardware asset and associated storage.

The repurpose life cycle tracker module 804 may also make API calls to a ticketing system (e.g., an IT Work Request System, etc.) to create a work request ticket to trigger repurposing of the hardware asset. The repurpose life cycle tracker module 804 may be configured to receive, in response, a work request ticket ID from the ticketing system. The repurpose life cycle tracker module 804 may store the work request ticket ID in the repurposed assets database. Additionally, the repurpose life cycle tracker module 804 may update the repurposed assets database such that the status is Entered. In some examples, the repurpose life cycle tracker module 804 may also set a status date as the current date, and an indicator for whether there are pooled apps as Yes. The indicator for whether there are pooled apps may be based on the list of applications that share the hardware asset.

The repurpose life cycle tracker module 804 may repeatedly (e.g., at regular intervals) make API calls to the ticketing system to determine the current status of the work request ticket. The repurpose life cycle tracker module 804 may update the repurposed assets database with any status changes to the work request ticket. The repurpose life cycle tracker module 804 may continue querying the ticketing system until the work request ticket is completed/closed. In some examples, the repurpose life cycle tracker 804 may be configured to provide a user interface or reports to an archive analyst with the current status of the work request ticket. Upon completion, the repurpose life cycle tracker module 804 may update the repurposed assets database with a final state of the hardware asset (e.g., set state as Complete, status date as the current date, etc.).

The repurpose life cycle tracker module 804 may be configured to validate the completion of the work request ticket against an asset tracking system. This validation may ensure that the hardware asset was actually repurposed, and that the asset tracking system accordingly reflects this repurposing. Upon validation, the repurpose life cycle tracker module 803 may update the hardware asset info database 130 such that the hardware asset has a status of Retired, and an end state of Repurposed.

The repurpose life cycle tracker module 804 may repeat this process for the remaining hardware assets in the list of hardware assets to be repurposed.

Figure 8D:
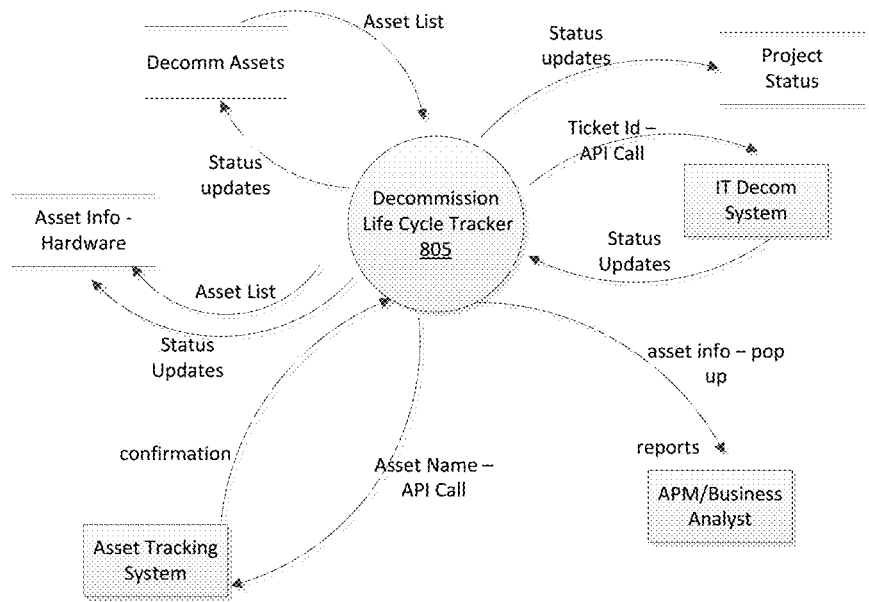

FIG. 8D illustrates an example workflow corresponding to decommissioning hardware assets. In this example, the flow includes a decommission life cycle tracker module 805. In at least one embodiment, module 805 may be a component or a sub-module that is a part of the retirement module 120. It will be appreciated by those skilled in the art that in other examples, the retirement module 120 may include additional or alternative components or sub-modules.

The decommission life cycle tracker module 805 may be configured to receive a list of hardware assets to be decommissioned from the mapping module 803. In some examples, the decommission life cycle tracker module 805 may receive an asset ID, an application ID, an application name, an asset type, and/or an asset name for each hardware asset in the list of hardware assets. The decommission life cycle tracker module 805 may store the list of hardware assets in a decommissioned assets database. In addition to storing the information received from the mapping module 803, the decommission life cycle tracker module 805 may also use the decommissioned assets database to capture a current status of the hardware asset in the life cycle. Thus, the retirement module 120 may use both the hardware asset info database 130 and the decommissioned assets database to capture a current status of the hardware asset. In some examples, the retirement module 120 may use the hardware asset info database 130 to capture a high-level status of the hardware asset, and the decommissioned asset database to capture the detailed status of the hardware asset as it progresses through the workflow corresponding to the decommission life cycle tracker module 805. For example, the decommission life cycle tracker module 805 may update the hardware asset info repository such that the status of the asset is Retiring and the end state designation is N/A.

For each hardware asset in the list of hardware assets to be decommissioned, the decommission life cycle tracker module 805 may make API calls to a ticketing system (e.g., an IT Work Request System, etc.) to create a work request ticket to trigger decommissioning of the hardware asset. The decommission life cycle tracker module 805 may be configured to receive, in response, a work request ticket ID from the ticketing system. The decommission life cycle tracker module 805 may store the work request ticket ID in the decommissioned assets database. Additionally, the decommission life cycle tracker module 805 may update the decommissioned assets database such that the status is Entered. In some examples, the decommission life cycle tracker module 805 may also set a status date as the current date.

The decommission life cycle tracker module 805 may repeatedly (e.g., at regular intervals) make API calls to the ticketing system to determine the current status of the work request ticket. The decommission life cycle tracker module 805 may update the decommissioned assets database with any status changes to the work request ticket. The decommission life cycle tracker module 805 may continue querying the ticketing system until the work request is completed/closed. In some examples, the decommission life cycle tracker module 805 may be configured to provide a user interface or reports to an archive analyst with the current status of the work request ticket. Upon completion, the decommission life cycle tracker module 805 may update the decommissioned assets database with a final state of the hardware asset (e.g., set state as Complete, status date as the current date, etc.).

The decommission life cycle tracker module 805 may be configured to validate the completion of the work request ticket against an asset tracking system. This validation may ensure that the hardware asset was actually decommissioned, and that the asset tracking system accordingly reflects this decommissioning. In some examples, decommissioning the hardware asset may cause it to be reallocated (e.g., physically or virtually reallocated to a different enterprise environment/network, etc.). In other examples, decommissioning the hardware asset may cause it to be removed (e.g., removed from the data center floor, etc.). To determine whether a hardware asset has been reallocated, the decommission life cycle tracker module 805 may query the asset tracking system (e.g., by an API call using the asset ID of the hardware asset and an application ID) to verify that the hardware asset is no longer associated with the current application. To determine whether a hardware asset has been removed, the decommission life cycle tracker module 805 may query the asset tracking system (e.g., by an API call using the asset ID of the hardware asset) to verify that the hardware asset is marked as such. For example, the asset tracking system may indicate that the hardware asset is inactive, has been decommissioned, or no longer exists within the asset tracking system. Upon validation, the decommission life cycle tracker module 805 may update the hardware asset info database 130 such that the hardware asset has a status of Decommissioned, and an end state of Removed. Alternatively, the decommission life cycle tracker module 805 may update the hardware asset info database 130 such that the end state is Reallocated for a hardware asset that has been reallocated to another environment The decommission life cycle tracker module 805 may repeat this process for the remaining hardware assets in the list of hardware assets to be decommissioned.

Figure 8E:
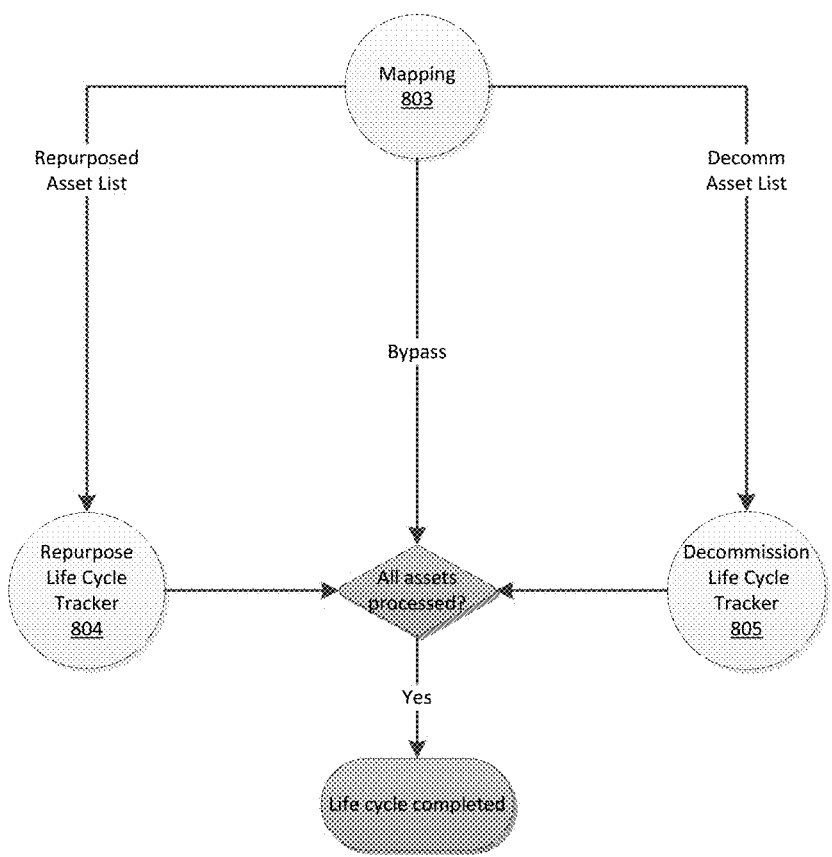

FIG. 8E illustrates an example workflow corresponding to determining the end of the retirement life cycle. In this example, the flow includes the mapping module 803, the repurpose life cycle tracker module 804, and the decommission life cycle tracker module 805. In at least one embodiment, modules 803, 804, and 805 may be components or sub-modules that are a part of the retirement module 120. It will be appreciated by those skilled in the art that in other examples, the retirement module 120 may include additional or alternative components or sub-modules.

The retirement module 120 may be configured to determine whether all the hardware assets identified by the mapping module 803 have been processed. As described herein, the mapping module 803 may determine whether a hardware asset should be repurposed, decommissioned, or bypassed. As such, the mapping module 803 may generate three lists of hardware assets, where each list is a subset of the list of all of the hardware assets associated with an application. A hardware asset associated with an application is a part of at least one of the three lists (or other lists) generated by the mapping module 803. Thus, as shown in FIG. 8E, a hardware asset associated with an application will be processed in one of three ways as determined by the mapping module 803: (1) by the repurpose life cycle tracker module 804; (2) by the decommission life cycle tracker module 805; or (3) by the bypass option.

Upon processing of at least one of the three lists, the retirement module 120 may be configured to determine whether all of the hardware assets associated with a particular application have been processed. Where all of the hardware assets have been processed, the retirement module 120 may determine that the life cycle is complete. For example, where an application is associated with repurposed assets, decommissioned assets, and bypassed assets, the retirement module 120 may determine that the life cycle is complete where the repurpose life cycle tracker module 804 has completed, the decommission life cycle tracker module 805 is completed, and where the retirement module 120 has designated the bypassed assets as such. In another example, where an application is associated with only repurposed assets, the retirement module 120 may determine that the life cycle is complete where the repurpose life cycle tracker module 804 has completed.

Once all the hardware assets in the list have been repurposed, decommissioned, or bypassed, the retirement module 120 may update the project status. The updated status may be stored in the project status database 124. For example, the retirement module 120 may update the project status database 124 such that the project has a status of Complete.

FIGS. 8F-I illustrate an example scenario involving five hardware assets processed by the retirement module 120, in accordance with aspects of this disclosure. These figures are provided by way of example only. Referring to FIG. 8F, table 810 represents five hardware assets associated with a particular application (e.g., a Billing System with application ID 1492), where information associated with the hardware assets may be stored in a hardware assets info database 130. The first hardware asset is a virtual server in a client/server platform, which is shared with three other applications. The second hardware asset is a virtual server in a client/server platform, which is shared with four other applications. The third and fourth hardware assets are physical servers in a client/server platform, which are not shared with other applications. The fifth hardware asset is a mainframe server. Additional information is provided in connection with each asset, where the additional information may or may not be used by the retirement module 120, as discussed herein. Table 820 represents the initiation of the retirement phase (or life cycle) of a project (e.g., with project ID 245), where the automated workflow management system 104 is configured to provide an Application Retirement—Archive service. As such, table 820 represents the data stored in the project status database 124 by the retirement module 120. Table 830 represents the completion of the retirement phase (or life cycle) of the project (e.g., with project ID 245), where the retirement module 120 has processed the hardware assets associated with the application.

Figure 8G:
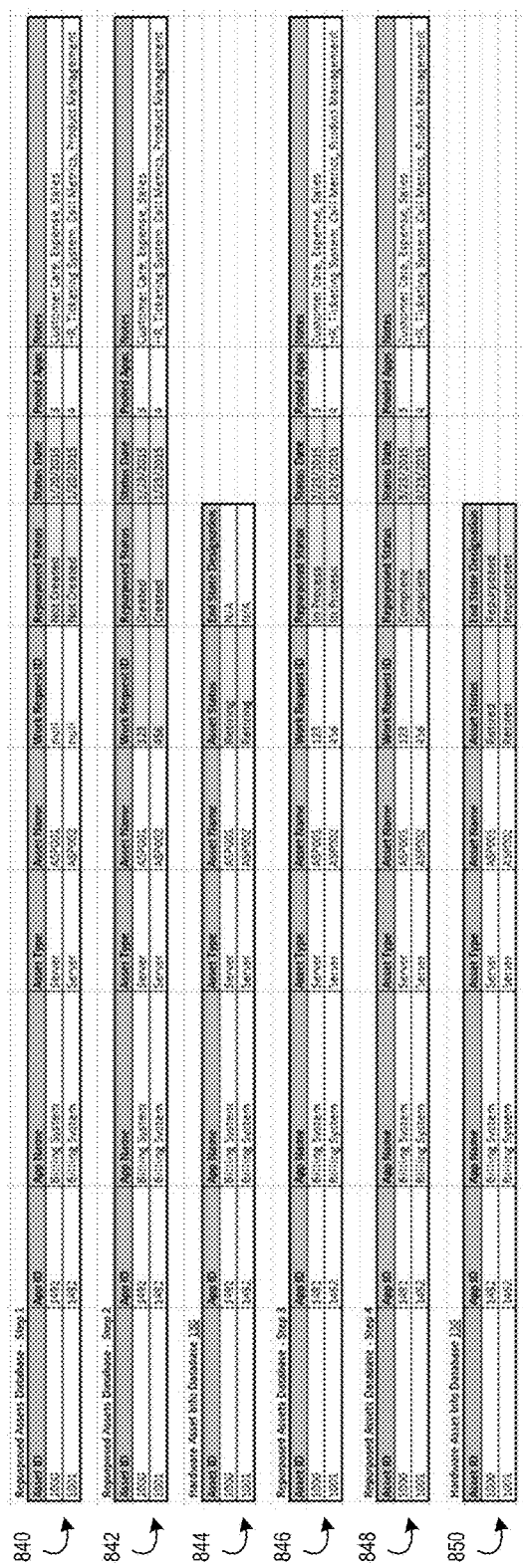
Figure 8H:
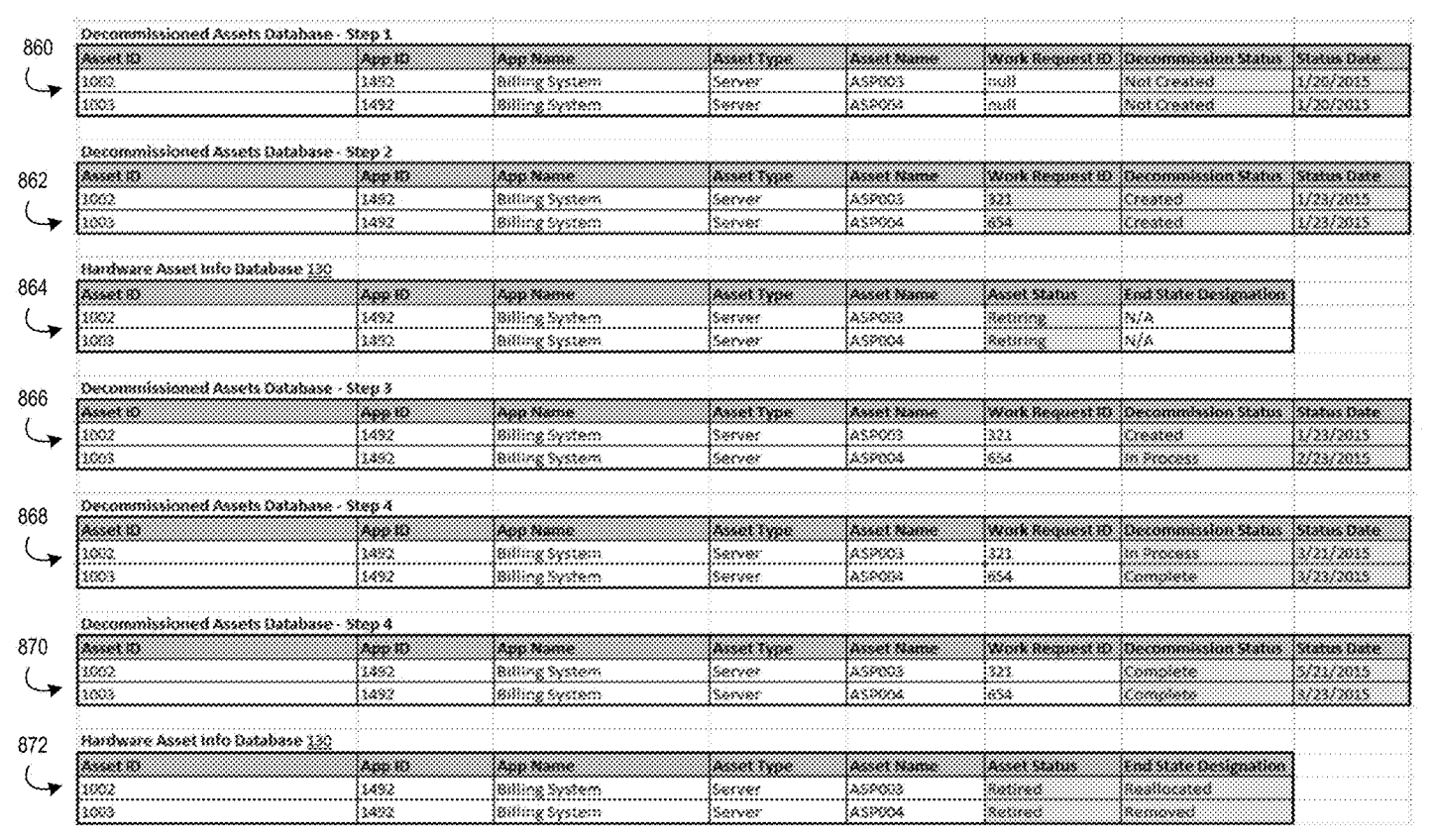
Figure 8I:
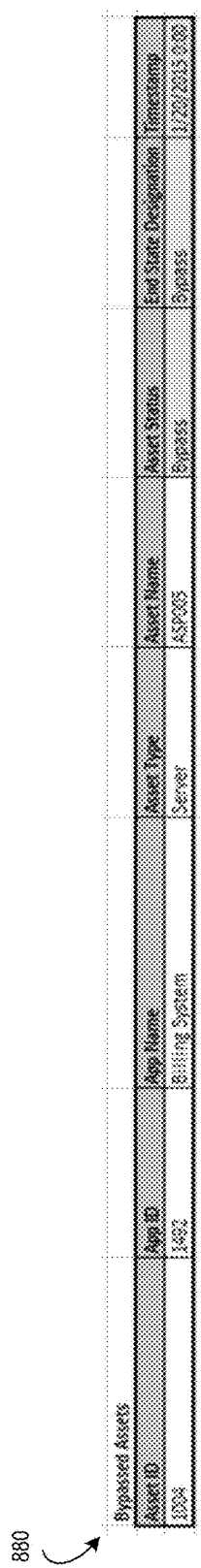

FIGS. 8G and 8H represent four of the five assets of table 820 being processed by repurpose life cycle tracker module 804 and the decommission life cycle module 805, respectively. Additionally, FIG. 8I represents the fifth asset being bypassed. As such, FIGS. 8G-I represent that the mapping module 803 designated the two assets for repurposing (i.e., asset IDs 1000 and 1001), two assets for decommissioning (i.e., asset IDs 1002 and 1003), and one asset for bypass (i.e., asset ID 1004). The mapping module 803 may have made these determinations based on, but not limited to, attributes such as the asset type, the server type, the platform, and whether the asset is shared.

FIG. 8G represents two of the five assets of table 820 being processed by the repurpose life cycle tracker module 804. In a first step 840, the repurpose life cycle tracker module 804 may update the repurposed assets database with the two assets, including information associated with each asset, set the repurposed status to Not Created, and update the status date. In a second step 842, after the module 804 has requested and received a ticket for repurposing each asset, the module 804 may update the repurposed assets database to indicate the work request ID, set the repurposed status to Created, and update the status date. In a third step 844, the module 804 may also update the hardware asset info database 130 to reflect a high-level status. For example, the module 804 may set the asset status to Retiring. In a fourth step 846, the module 804 may update the repurposed assets database to reflect progress of the work request, for example, by setting the repurposed status to In Process. As such, the fourth step 846 may be performed one or more times to reflect the current status of the work request. In a fifth step 848, the module 804 may update the repurposed assets database to reflect completion of the work request, for example, by setting the repurposed status to Complete and updating the status date. In a sixth step 850, the module 804 may update the hardware asset info database 130 may also update the hardware asset info database 130 to reflect a high-level status of completion. For example, the module 804 may set the asset status to Retired, and set the end state designation to Repurposed.

FIG. 8H represents two of the five assets of table 820 being processed by the decommission life cycle tracker module 805. In a first step 860, the decommission life cycle tracker module 805 may update the decommissioned assets database with the two assets, including information associated with each asset, set the decommission status to Not Created, and update the status date. In a second step 862, after the module 805 has requested and received a ticket for decommissioning each asset, the module 805 may update the decommissioned assets database to indicate the work request ID, set the decommission status to Created, and update the status date. In a third step 864, the module 805 may also update the hardware asset info database 130 to reflect a high-level status. For example, the module 805 may set the asset status to Retiring. In a fourth step 866, the module 805 may update the decommissioned assets database to reflect progress of the work request, for example, by setting the repurposed status to In Process. Where each asset is associated with a unique work request ticket, it may be possible for a work request ticket associated with one asset to reflect different progress. As such, as shown in the fourth step 866, the fifth step 868, and the sixth step 870, the module 805 may be configured to allow for one work request to be completed earlier or later than another. As indicated earlier, these steps may be performed one or more times until the work requests associated with each asset is completed. In a seventh step 872, the module 805 may also update the hardware asset info database 130 to reflect a high-level status of completion. For example, the module 805 may set the asset status to Retired, and set the end state designation to either Reallocated or Removed.

FIG. 8I represents one of the five assets being bypassed by the retirement module 120. In some examples, the retirement module 120 may maintain a list of bypassed assets in a bypassed assets database. The bypassed assets database may include information associated with bypassed assets, such as an asset ID, an application ID, an application name, an asset type, an asset name, an asset status, an end state designation, and a timestamp. Upon determination by the mapping module 803 that a particular asset, such as asset ID 1004 here, is to be bypassed by the retirement module 120, the retirement module 120 may update the bypassed assets database with the bypassed assets, including information associated with each asset, set the asset status to Bypass, set the end state designation to Bypass, and update the timestamp.

Once the example steps in FIGS. 8G-I have been completed (in any order), the retirement module may update the project status database 124 to reflect an updated status, as described with reference to table 830 of FIG. 8F.

Figure 9A:
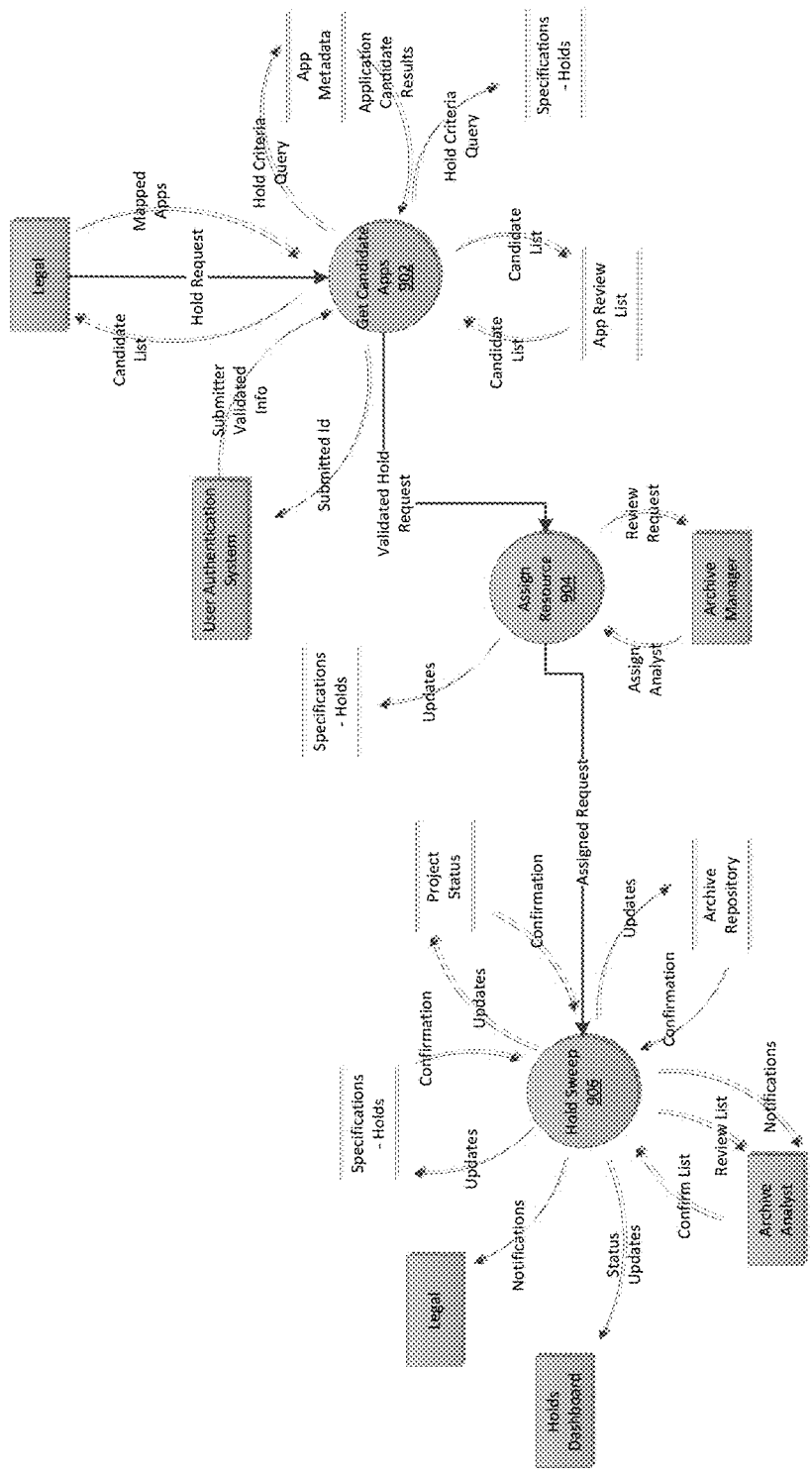
FIGS. 9A-B are block diagrams of example implementations of a requirements capture module of an automated workflow management system in accordance with one or more aspects described herein.
Figure 9B:
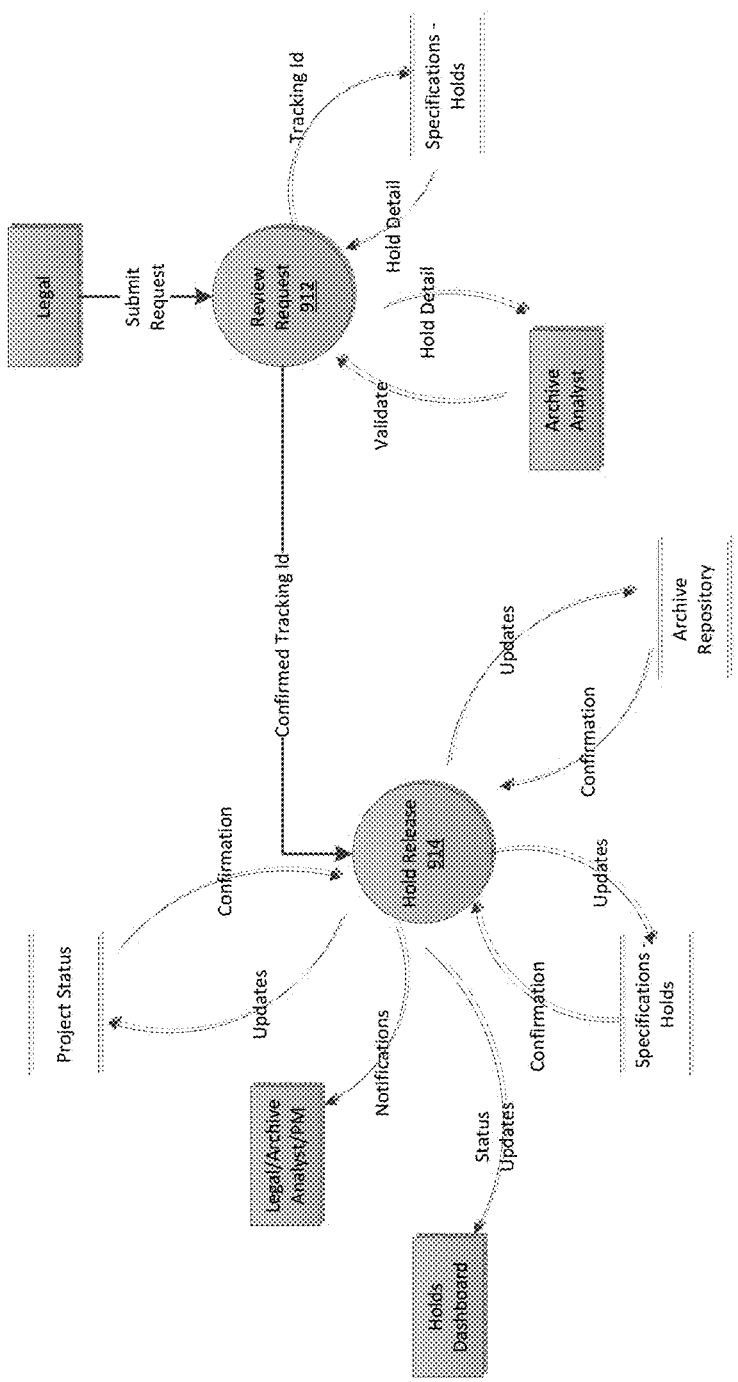

FIGS. 9A-B illustrate example workflows of a requirements capture module 116 that may be carried out by an automated workflow management system 104 in accordance with aspects of this disclosure. FIGS. 9A-B illustrate flows corresponding to components, configured to, in operation capture technical and functional project specifications that are critical to each service offered by the automated workflow management system 104. In this example, the requirements may include at least legal specifications (e.g., hold sweeps, hold releases, etc.). In some examples, the example workflows shown in FIGS. 9A-B may include some or all of the components and/or steps in the example workflows shown in FIG. 6H herein.

Although many different approaches may be employed to create, implement, and monitor legal holds and releases of legal holds, the automated workflow management system 104 described herein provides a mechanism that provides several technical advantages, such as reducing errors and reducing ineffective resource consumption in an enterprise-wide computing system. For instance, by maintaining a centralized repository of legal hold requests and legal hold release requests, the automated workflow management system 104 improves the system by eliminating the scenario in which data is purged before it is placed on a legal hold. Further, by monitoring the status of the legal hold requests and legal hold release requests in the centralized repository, the automated workflow management system 104 improves the system by immediately releasing impacted applications and/or data when a legal case comes to a conclusion. As such, consumption of resources in the enterprise-wide computing system is minimized.

The example in FIG. 9A illustrates flows corresponding to performing legal hold sweeps. As such, this workflow enables a legal sweep of current projects and/or project archive repositories to ensure that data subject to a legal hold is maintained as necessary. This workflow further enables notifying pertinent systems (e.g., impacted applications, etc.) and/or parties during the various phases of the legal hold sweep process (e.g., a hold placed on an application, a hold released from an application, etc.).

In this example, the flow includes a get candidate applications module 902, an assign resource module 904, and a hold sweep module 906. In some examples, the get candidate applications module 902, the assign resource module 904, and the hold sweep module 906 may be components or sub-modules that are a part of the requirements capture module 116. It will be appreciated by those skilled in the art that in other examples the requirements capture module 116 may include additional or alternative components or sub-modules.

The get candidate applications module 902 may receive a legal hold request from a legal department or a legal system. The legal hold request may include a legal hold tracking ID (e.g., a unique alphanumeric value, etc.), an internal legal counsel ID, an internal legal counsel name, a litigation subject, and/or a date requested. In some examples, where the legal hold request does not include an internal legal counsel ID, the get candidate applications module 902 may make API calls to a user authentication system to authenticate a legal counsel based on the legal counsel name and receive an internal legal counsel ID as a response. In other examples, where the legal hold request includes an internal legal counsel ID, the get candidates application module 902 may make API calls to the user authentication system to authenticate the internal legal counsel ID and return contact information associated with the internal legal counsel (e.g., name, contact number, email address, etc.). In further examples, the get candidate applications module 902 may additionally or alternatively make API calls to the user authentication system to verify the information (e.g., internal legal counsel ID, contact information for the internal legal counsel, etc.) provided by the legal department or legal system. Additionally, the legal hold request may include information relating to one or more legal cases, where such information may be used by the get candidate applications module 902 to select relevant applications, as described herein.

Figure 9C:
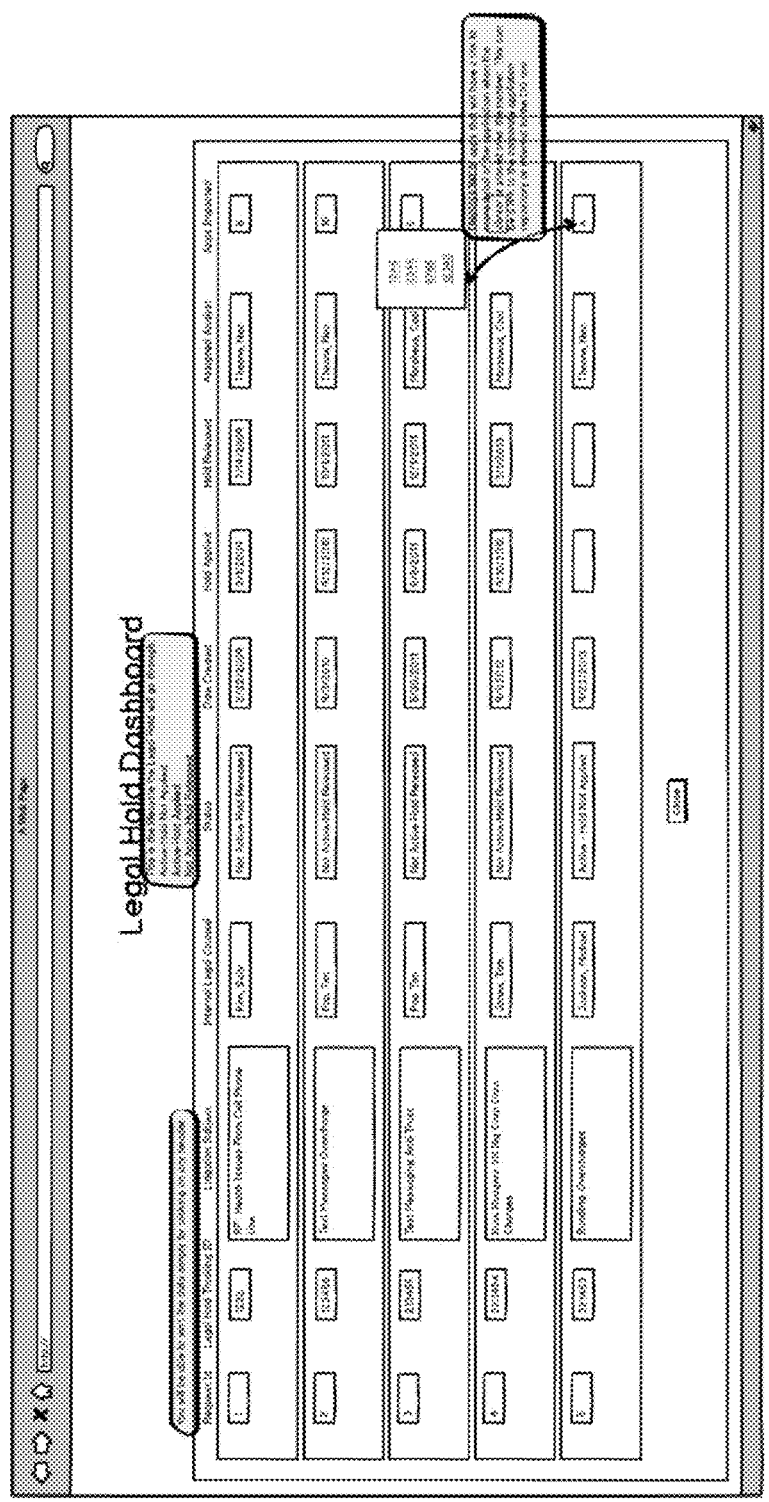
FIGS. 9C-9Q are example user interfaces associated with a requirements capture module of an automated workflow management system in accordance with one or more aspects described herein.
Figure 9D:
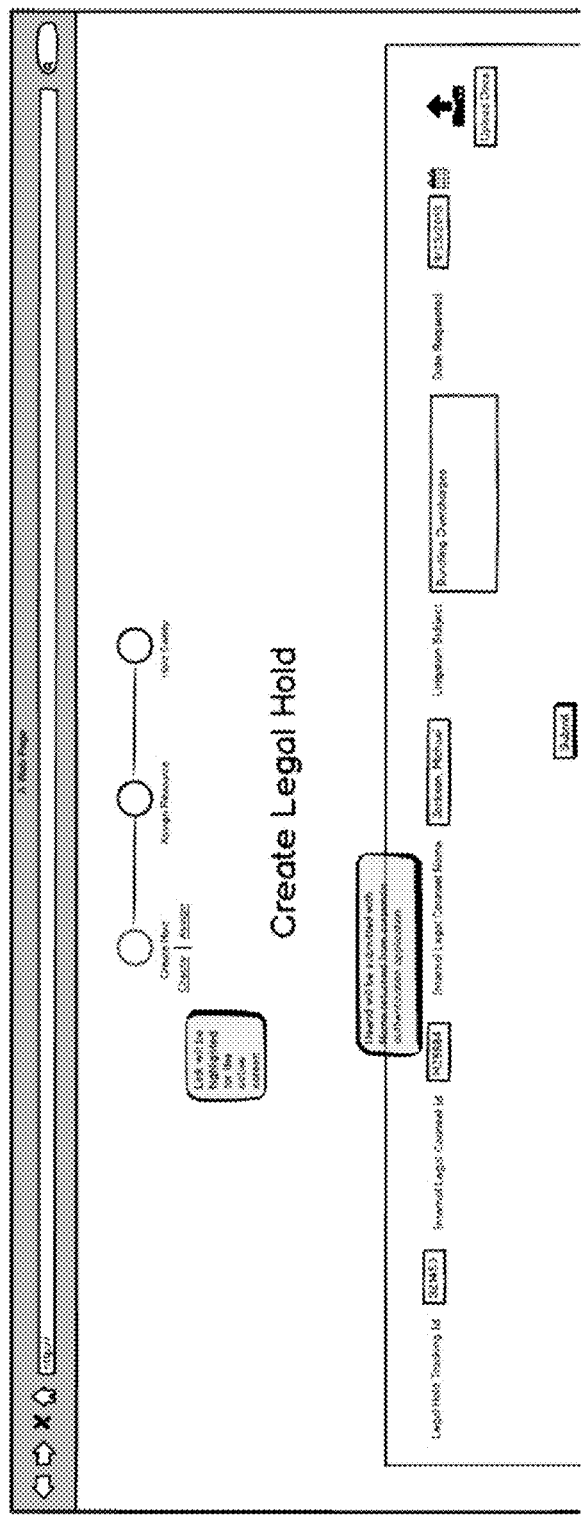

FIG. 9D shows an example user interface via which a legal department or legal system may submit a legal hold request. In some examples, the legal hold request may also include one or more documents containing information relating to legal cases. It will be appreciated that the various fields shown in the example user interface may be required or optional to create a legal hold request.

Based on the legal hold request, the get candidate applications module 902 may select one or more applications that meet the criteria specified by the legal hold request and place the selected applications in a legal hold container. As such, the get candidate applications module 902 may submit one or more searches to one or more databases to retrieve a list of candidate applications for the legal hold request. In some examples, the searches may include search criteria based at least on information included in the legal hold request (e.g., the litigation subject, and/or information relating to one or more legal cases, etc.). For example, the get candidate applications module 902 may submit a first search (e.g., a database query) to an application metadata repository, where the application metadata repository may include information associated with a plurality of applications (e.g., active applications, archived applications, etc.). In another example, the get candidate applications module 902 may submit a search to a specifications database, where the specifications database may include information relating to previous holds on applications having similar legal case histories.

The get candidate applications 902 may store the list of candidate applications retrieved from the one or more searches in a temporary repository (e.g., an application review list repository). As such, for each application in the list of candidate applications, the get candidate applications 902 may store an application ID, an application name, an application state (e.g., Active, Inactive, Cancelled, Closed, Retired, etc.), a service (e.g., Application Retirement—Archive, Performance Archive, Data Archive, etc.), an application description, a description of the data contained within the application, and/or previous holds on the application. In some examples, the list of candidate applications and/or the contents of the temporary repository may be available for review by the legal department or legal system.

Figure 9E:
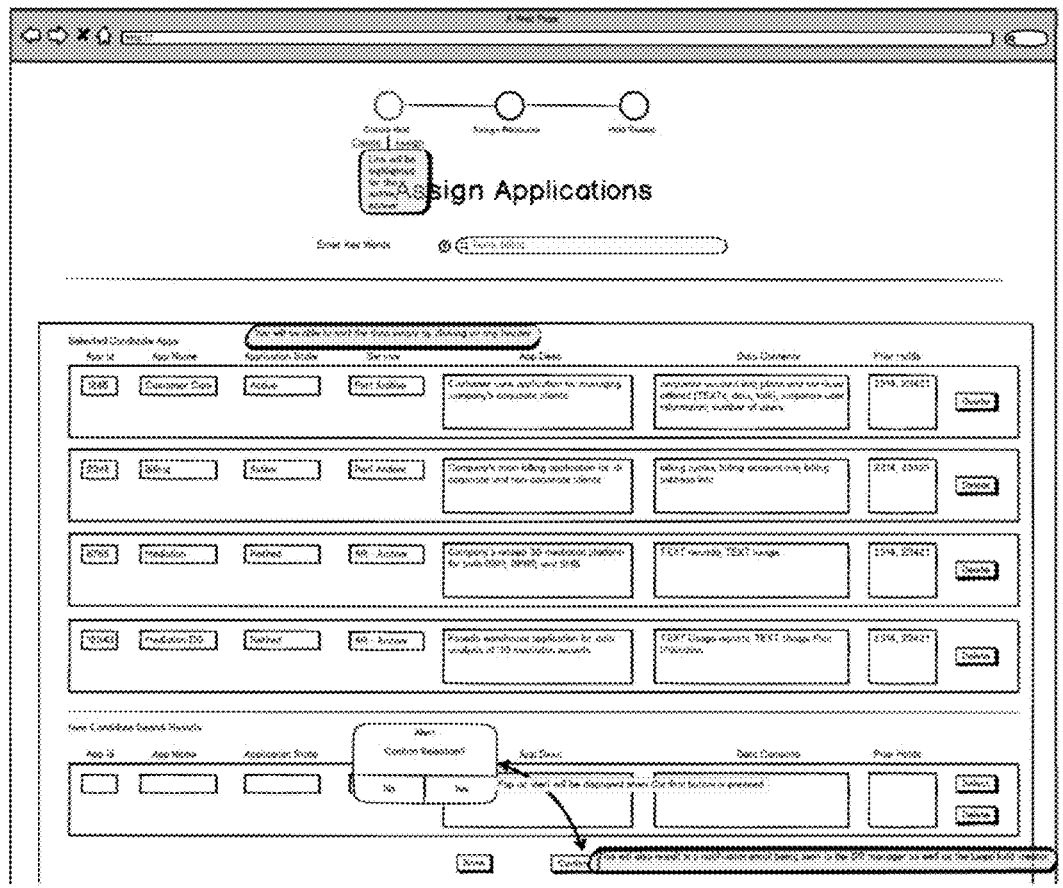

FIG. 9E shows an example user interface via which a legal department or legal system may initiate the one or more searches for a list of candidate applications. Further, the user interface may enable the legal department or legal system to review the list of candidate applications and/or the contents of the temporary repository. As such, the user interface may enable the legal department or legal system to customize (e.g., add, delete, update, etc.) the list of candidate applications stored in the temporary repository for a particular legal hold request. Once the list of candidate applications is finalized, the legal department or legal system may submit the selected candidate applications. Upon submission, the get candidate applications module 902 may generate a legal hold request ID.

The get candidate applications module 902 may then add the list of candidate applications to the legal hold request. At this stage, the legal hold request is created. As such, the get candidate applications module 902 may generate a legal hold request ID (e.g., a unique alphanumeric value, etc.) to be associated with the legal hold request. In some examples, where the legal hold request and/or the list of candidate applications has been reviewed by the legal department or legal system, the legal hold request may be a validated hold request. Additionally or alternatively, the get candidate applications module 902 may generate a plurality of notifications to applications and users associated with the selected candidate applications.

The get candidate applications module 902 may then provide the legal hold request to the assign resource module 904. Upon completion of this process, the get candidate applications module 902 may purge the temporary repository storing the list of candidate applications. As such, the temporary repository may be configured to store a list of candidate applications for a subsequent legal hold request. It will be appreciated that in some examples the temporary repository may be configured to store a plurality of lists of candidate applications associated with a plurality of legal hold requests. In these examples, the get candidate applications module 902 may purge a portion of the plurality of lists of candidate applications upon completion of this process.

In this example, the assign resource module 904 may send a notice to an archive manager of an unassigned legal hold request. The notice may include information associated with the legal hold request, such as a legal hold request ID (e.g., a unique alphanumeric value, etc.), a legal hold tracking ID, a litigation subject, an internal legal counsel ID, an internal legal counsel name, a date requested and/or a date created, a number of impacted applications (e.g., the number of applications in the list of candidate applications associated with the legal hold request, etc.), information related to the impacted applications, etc. The notice may request the archive manager to assign at least one archive analyst to the unassigned legal hold request. In some examples, the notice of an unassigned legal hold request may be sent to an unassigned hold requests inbox of an archive manager.

Figure 9F:
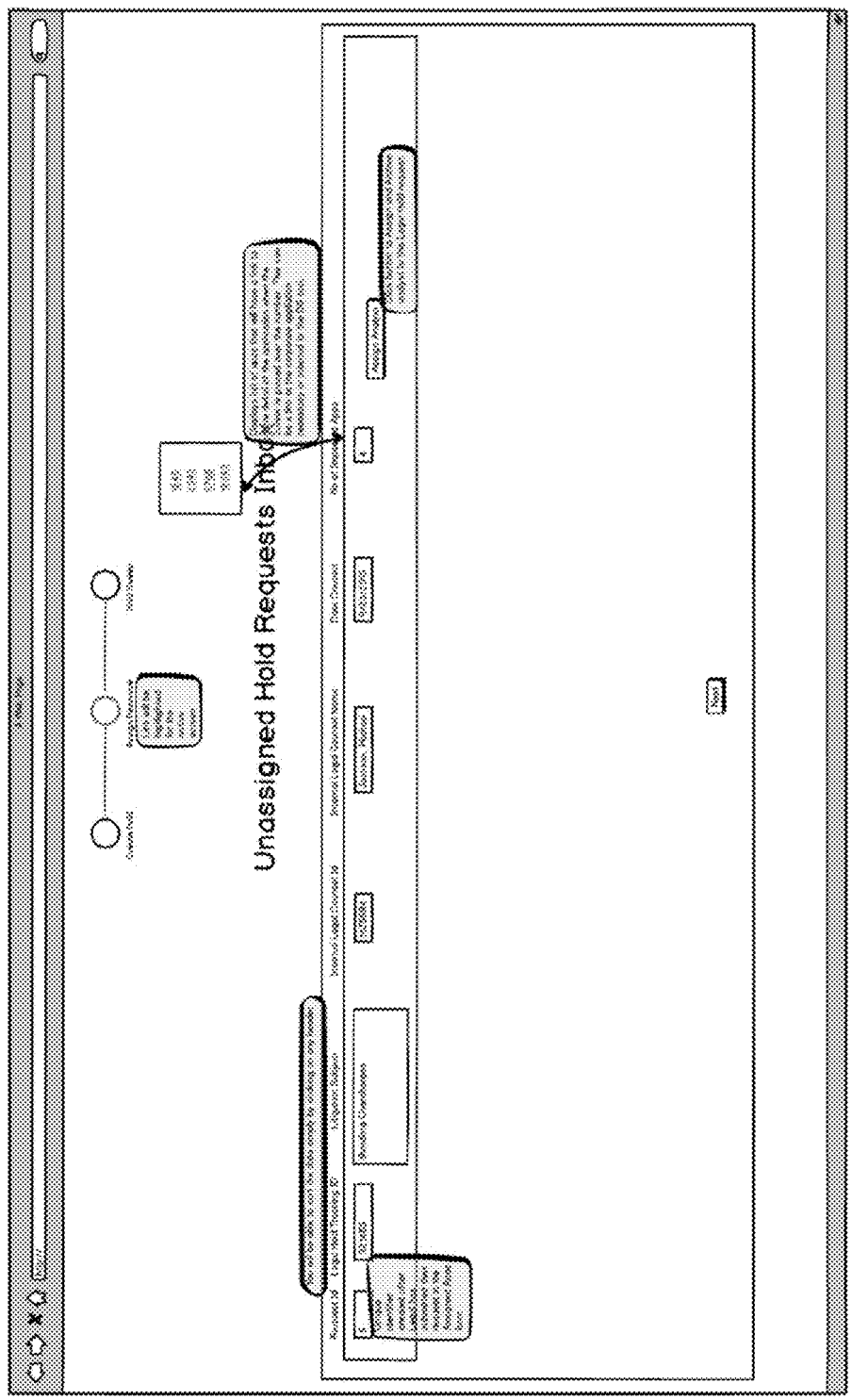

FIG. 9F shows an example user interface via which an archive manager may view, review, update, and otherwise interact with (e.g., assign an archive analyst an unassigned legal hold request) at least one unassigned legal hold request in an unassigned hold requests inbox of the archive manager. The example user interface may display the number of applications in the list of candidate applications associated with the legal hold requests, and information related to the applications (e.g., application IDs, etc.). The user interface may display an option to assign an unassigned legal hold request to an archive analyst, and provide the selected archive analyst to the assign resource module 904.

Responsive to the notice, the assign resource module 904 may receive a request to assign an archive analyst to the unassigned legal hold request. The assign resource module 904 may then assign the unassigned legal hold request to the archive analyst specified in the request, such that the unassigned legal hold request is transformed into an assigned legal hold request. The assign resource module 904 may send a notice to the archive analyst assigned to the assigned legal hold request. The notice may include information associated with the legal hold request, such as a legal hold request ID (e.g., a unique alphanumeric value, etc.), a legal hold tracking ID, a litigation subject, an internal legal counsel ID, an internal legal counsel name, a status (e.g., Active—Hold Not Applied, Active—Hold Applied, Not Active—Hold Applied, Not Active—Hold Released, etc.), a last status date, a number of impacted applications (e.g., the number of applications in the list of candidate applications associated with the legal hold request, etc.), information related to the impacted applications, etc. In some examples, the notice may include one or more artifacts associated with the assigned legal hold request, such as one or more documents containing information relating to legal cases, one or more documents containing information relating to the candidate applications, and the like. Further, in some examples, the notice of an assigned legal hold request may be sent to an assigned hold requests inbox of an archive analyst.

Figure 9G:
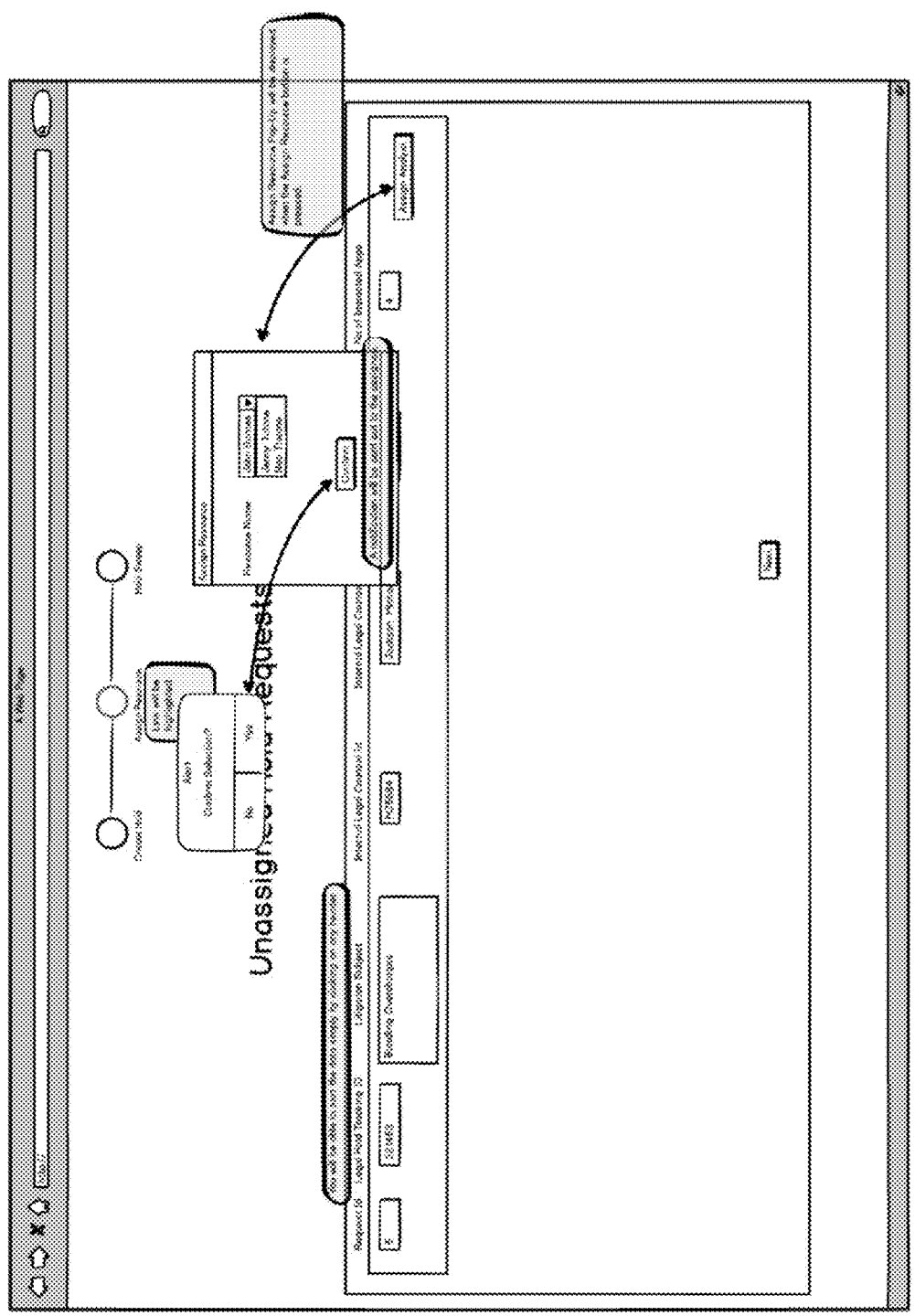

FIG. 9G shows an example user interface via which an archive manager may assign an archive analyst to an unassigned legal hold request in an unassigned hold requests inbox of the archive manager. The example user interface may display a list of archive analysts available to be assigned to the unassigned legal hold request. Once an archive analyst is selected, the assign resource module may send a notification to the selected archive analyst, where the notification may include information related to the assigned legal hold request.

Figure 9H:
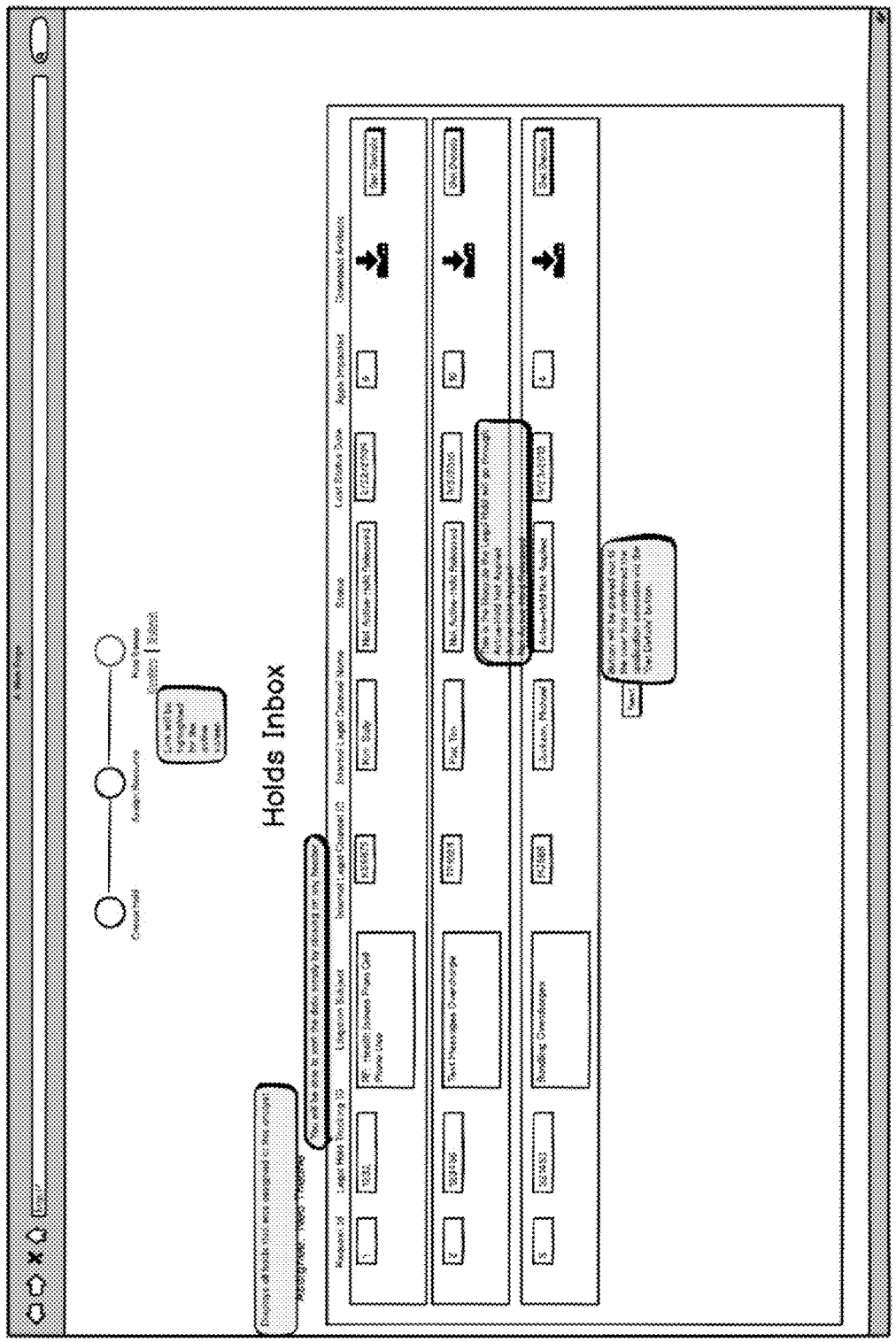

FIG. 9H shows an example user interface via which the archive analyst may view, review, update, and otherwise interact with (e.g., review a list of candidate applications associated with an assigned legal hold request) at least one assigned legal hold request in an assigned hold requests inbox of the archive analyst. Responsive to the notice, the assign resource module 904 may receive a request to confirm the list of candidate applications associated with an assigned legal hold request. Additionally or alternatively, the assign resource module 904 may receive a request to add an application to the list of candidate applications associated with an assigned legal hold request. The request may include information relating to the application to be added, such as an application ID, an application name, an application state (e.g., Active, Inactive, Cancelled, Closed, Retired, etc.), a service (e.g., Application Retirement—Archive, Performance Archive, Data Archive, etc.), an application description, a description of the data contained within the application, and/or previous holds on the application. Further, additionally or alternatively, the assign resource module 904 may receive a request to remove an application from the list of candidate applications associated with an assigned legal hold request. The request may include at least a unique identifier associated with the application to be removed, such as an application ID, an application name, etc. Once the assign resource module 904 receives a request to confirm the list of candidate applications, the list of candidate applications is transformed into a list of impacted applications. As such, the assigned legal hold request may be associated with a list of impacted applications rather than (or in addition to) a list of candidate applications.

Figure 9I:
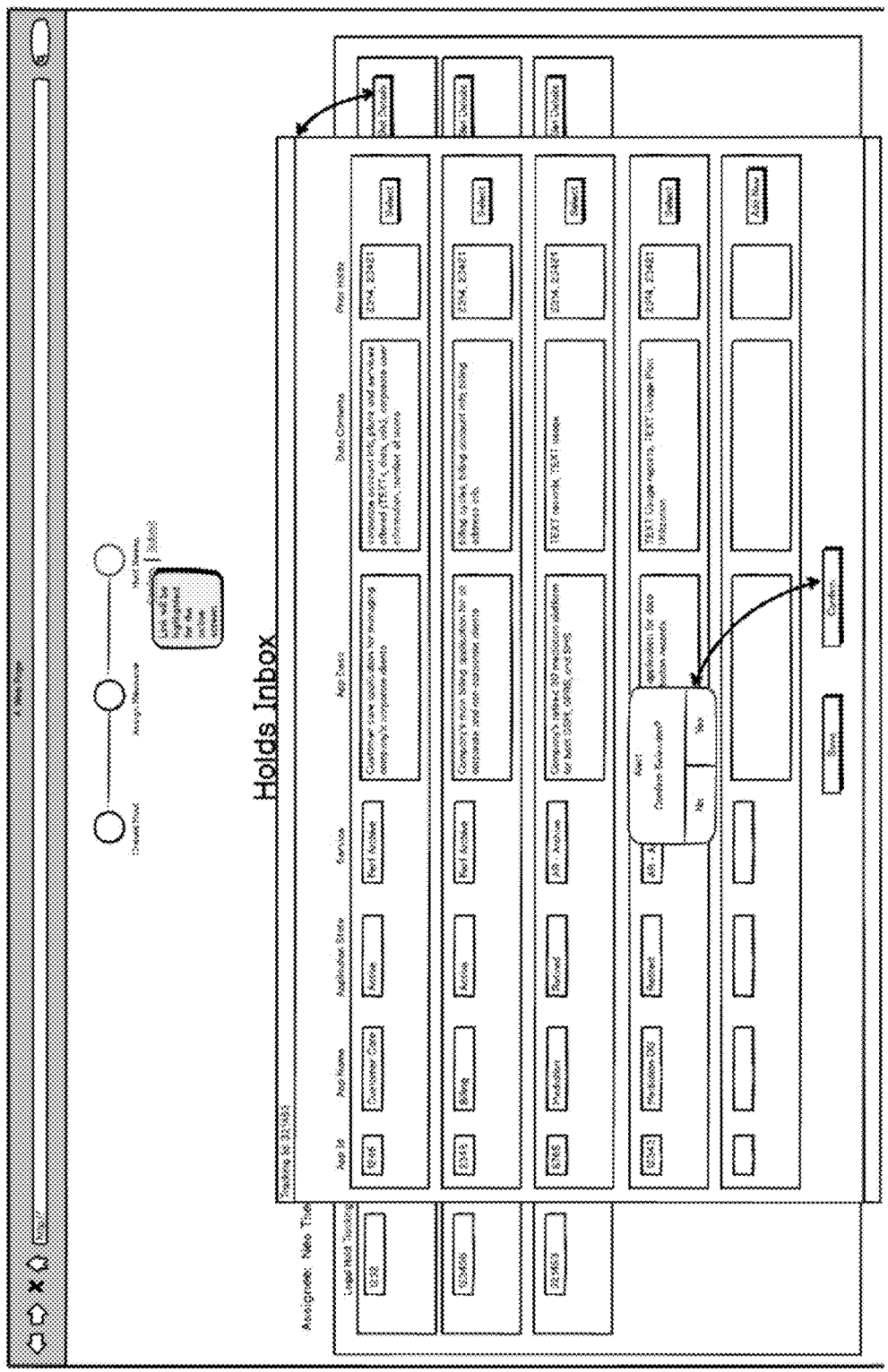

FIG. 9I shows an example user interface via which the archive analyst may review further information related to a list of candidate applications associated with an assigned legal hold request. The example user interface may enable the archive analyst to confirm the list of candidate applications associated with the assigned legal hold request. In some cases, the example user interface may enable the archive analyst to add and/or delete applications to/from the list of candidate applications.

The assign resource module 904 may then provide the assigned legal hold request to the hold sweep module 906. In this example, the hold sweep module 906 may receive a hold sweep request from an archive analyst. In response to the hold sweep request, the hold sweep module 906 may conduct a hold sweep (i.e., sweep through) the list of impacted applications associated with the assigned legal hold request. As such, the hold sweep module 906 may tag and/or record the impacted applications in the specifications database 132 and/or the project status database 124.

In examples where an impacted application is active (e.g., not archived, included in an active project, included in an active service), the hold sweep module 906 may tag the application as Legal Hold State—Project Hold (e.g., change the status of the application to Legal Hold State—Project Hold, etc.) in the specifications database 132. The hold sweep module 906 may also tag the project involving the impacted application as Legal Hold State—Project Hold (e.g., change the status of the project to Legal Hold State—Project Hold, etc.) in the project status database 124. The impacted application will not be able to progress further through the project lifecycle or service until the legal hold is released (e.g., the status is changed to released in the specifications database 132 and/or the project status database 124, etc.).

In examples where an impacted application is archived, the hold sweep module 906 may tag the application as Legal Hold State—Archive Hold (e.g., change the status of the application to Legal Hold State—Archive Hold) in the specifications database 132. The data associated with the impacted application will not be purged until the legal hold is released (e.g., the status is changed to released in the specifications database 132, etc.).

As such, the hold sweep module 906 places an electronic block on the impacted application and/or the data associated with the impacted application, such that other modules of the automated workflow management system 104 may not update or delete information associated with the application and/or the data associated with the impacted application. In this example, the electronic block is placed by changing the status of the application in the specifications database 312; however, it will be appreciated that the electronic block may be placed using other modifications to the various modules, sub-modules, and/or components of the automated workflow management system 104.

In other examples, the hold sweep module 906 may execute a hold sweep periodically. As such, the hold sweep module 906 may perform hold sweeps for pending hold weep requests on a regular basis.

In some examples, upon completion of the hold sweep process, the assign resource module 904 may send notifications to the legal department or legal system, and the archive analyst associated with the assigned legal hold request.

Figure 9J:
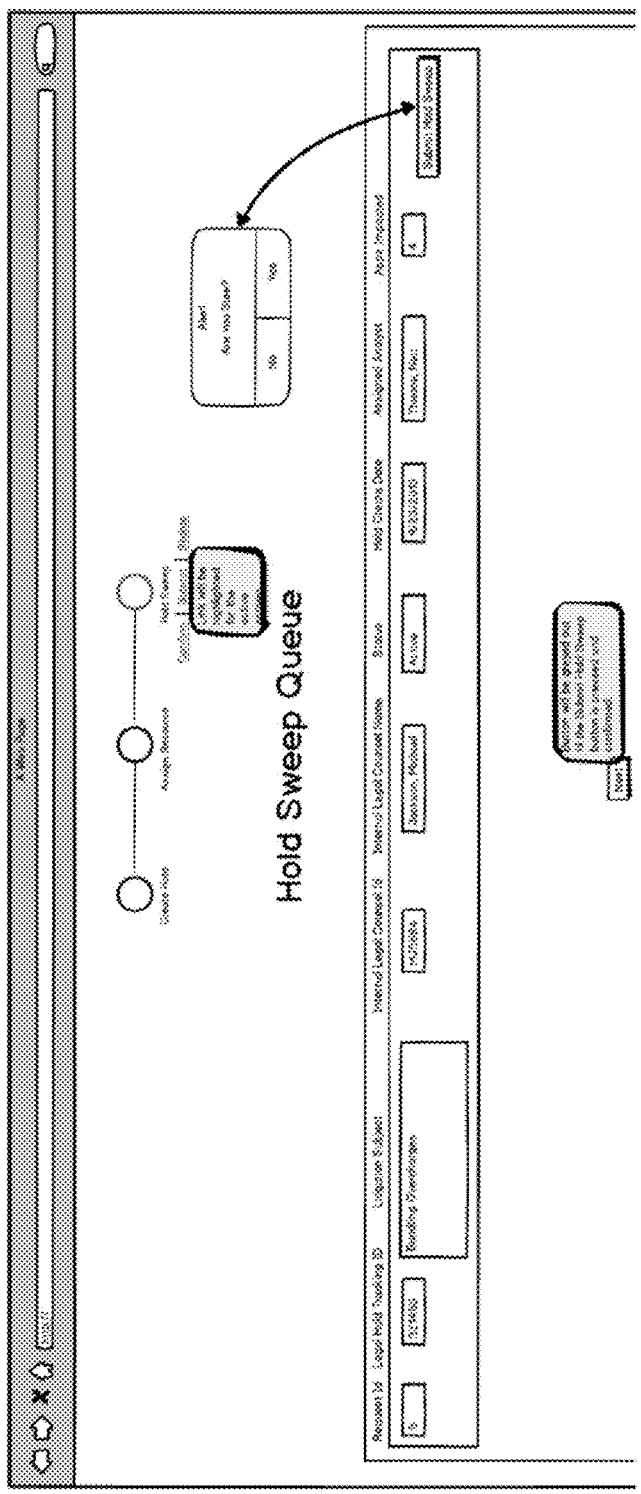

FIG. 9J shows an example user interface (e.g., a hold sweep queue) may display one or more hold requests that are ready for submittal. As such, the example user interface may enable the archive analyst may trigger a hold sweep for the impacted applications associated with a particular assigned legal hold request.

Figure 9K:
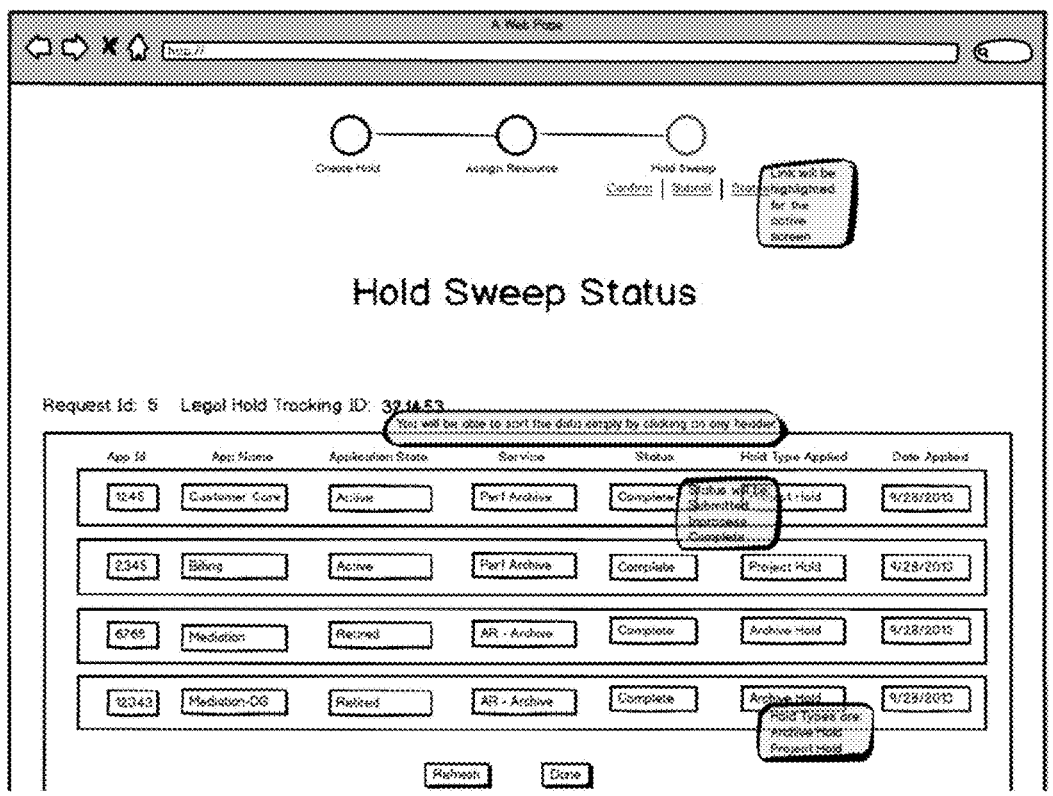

FIG. 9K shows an example user interface via which the archive analyst may monitor the status (e.g., Submitted, In Progress, Completed, etc.) of a hold sweep. The example user interface may also display the hold type applied in response to the legal hold request (e.g., Project Hold, Archive Hold, etc.). Further, the example user interface may provide a notification when one or more jobs (i.e., hold sweeps) are complete.

Figure 9L:
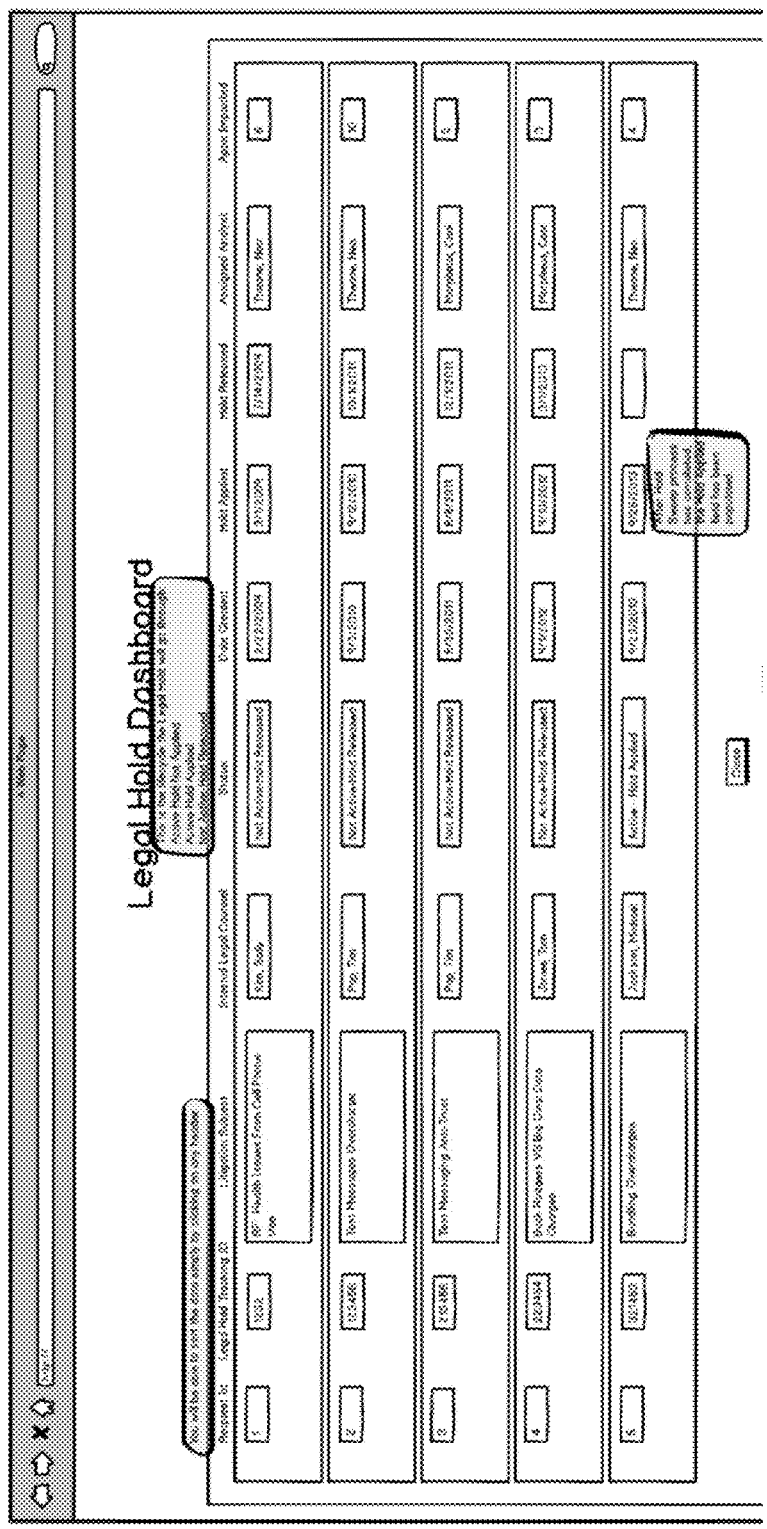

FIGS. 9C and 9L show example user interfaces (e.g., a legal hold dashboard) via which a legal department or legal system may view one or more legal hold requests. As such, a legal department or legal system may be able to monitor the status of one or more legal hold requests, view information associated with one or more legal hold requests, submit new legal hold requests, etc. The example user interface may include information relating to one or more legal hold requests, such as a legal hold request ID, a legal hold tracking ID, a litigation subject, an internal legal counsel ID, an internal legal counsel name, a status (e.g., Active—Hold Not Applied, Active—Hold Applied, Not Active—Hold Released, etc.), a date created, a date a hold was applied, a date a hold was released, an assigned archive analyst, a number of applications impacted, information relating to the impacted applications, etc.

In some examples, while at least one application is placed on hold via the hold sweep module 906, the hold sweep module 906 may periodic hold report (e.g., hourly, weekly, monthly, quarterly, yearly, etc.) to pertinent systems and/or parties. Thus, pertinent systems and/or parties may receive notifications relating to active legal holds.

Now referring to FIG. 9B, flows corresponding to performing legal hold releases are shown. As such, this workflow enables removing the legal hold associated with impacted applications. This workflow further enables notifying pertinent systems and/or parties during the various phases of the legal hold release process.

In this example, the flow includes a review request module 912 and a hold release module 914. In some examples, the review request module 912, and the hold release module 914 may be components or sub-modules that are a part of the requirements capture module 116. It will be appreciated by those skilled in the art that in other examples the requirements capture module 116 may include additional or alternative components or sub-modules.

The review request module 912 may receive a legal hold release request from a legal department or a legal system. For instance, the review request module 912 may receive a legal hold release request from a legal department or legal system in response to the conclusion of a legal case associated with a legal hold request. The legal hold release request may include at least a unique identifier associated with a selected active legal hold, such as a legal hold request ID, a legal hold tracking ID, a litigation subject, etc.

Figure 9M:
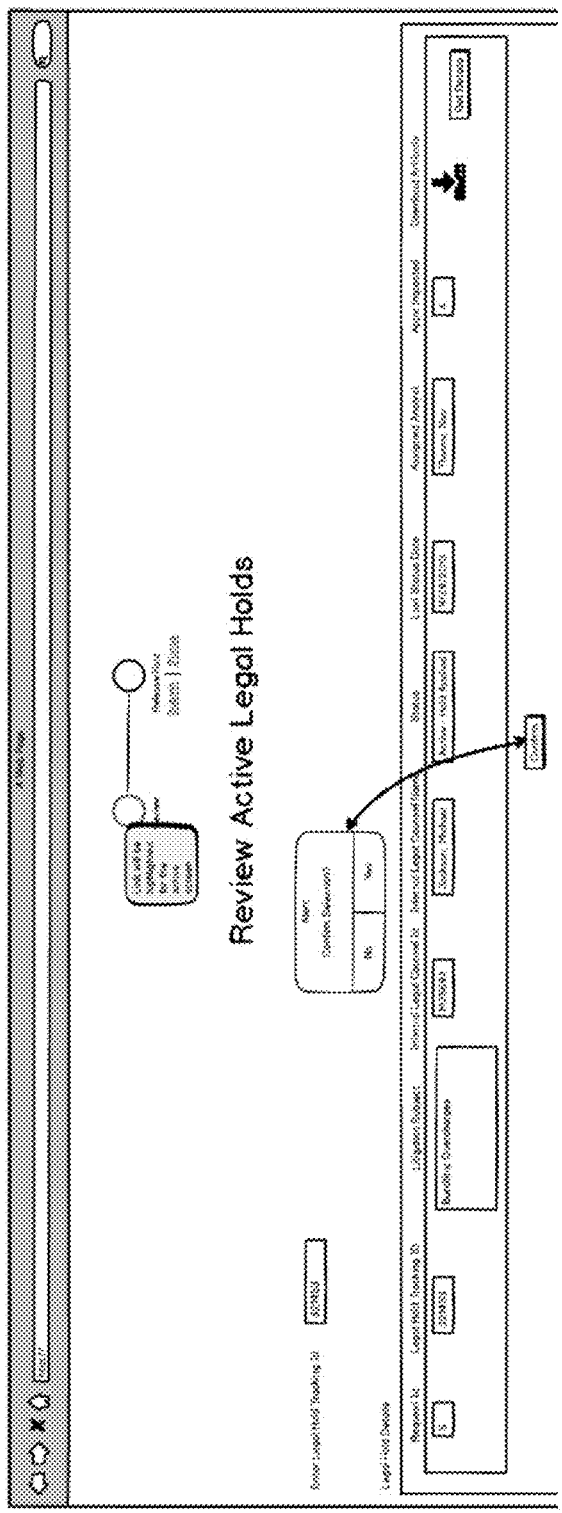

FIG. 9M shows an example user interface via which a legal department or legal system may view active legal holds. For instance, the example user interface may enable a legal department or legal system to view one or more legal hold requests associated with a particular legal hold tracking ID. As such, a legal department or legal system may view the one or more legal hold requests that may be released once a legal case is completed.

Figure 9N:
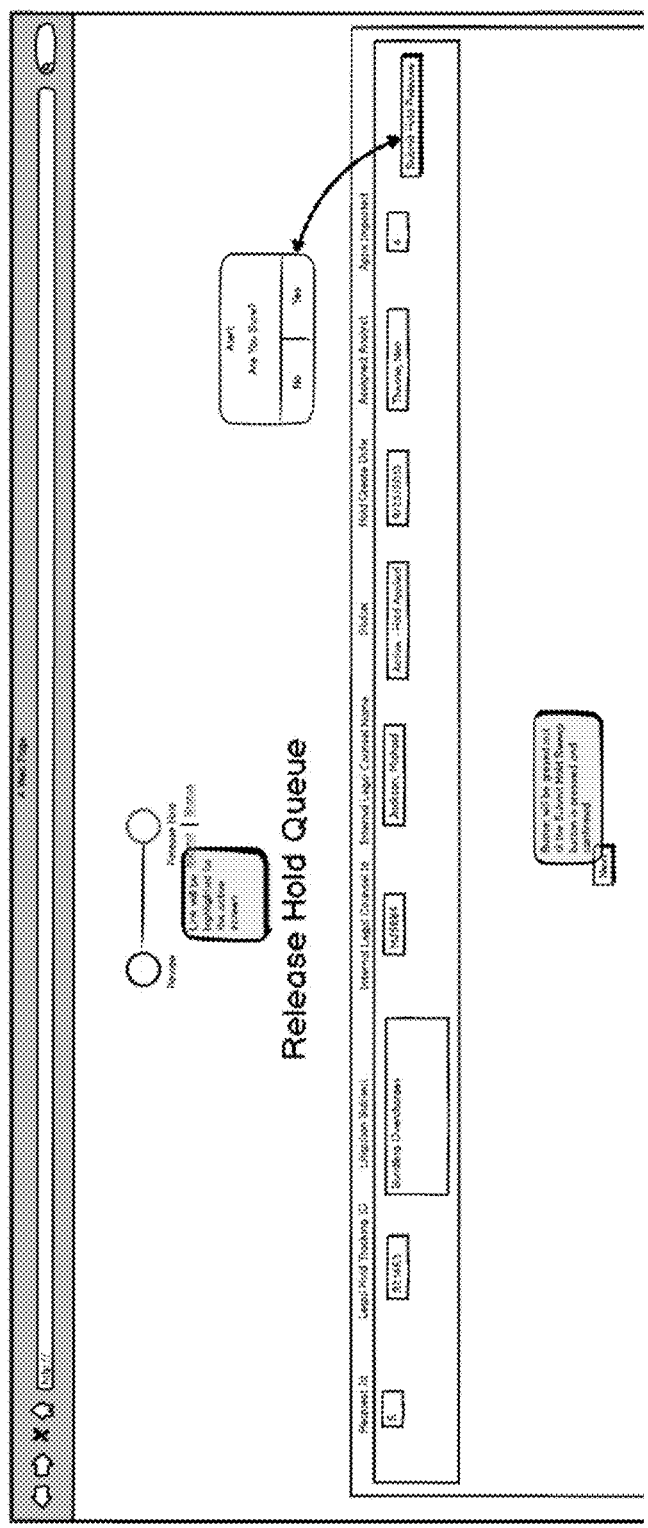
Figure 90:
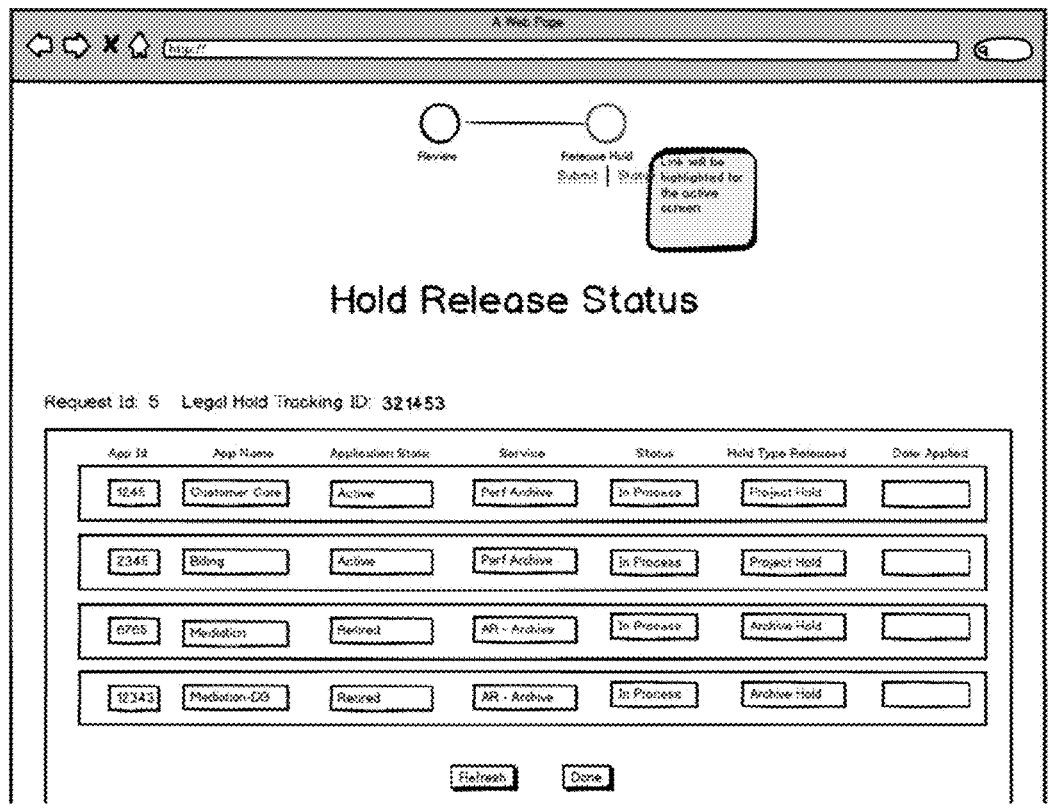

FIG. 9N shows an example user interface (e.g., a release hold queue) via which a legal department or legal system may be able to generate a legal hold release request by selecting one or more of the active legal holds. As such, the example user interface may display one or more legal hold release request ready for submittal. Submitting a legal hold release request may cause the hold release module 914 to execute a hold release for the impacted applications associated with a particular legal hold release request.

In response to the legal hold release request, the hold release module 914 may retrieve the list of impacted applications associated with the selected active legal hold from the specifications database based on the unique identifier associated with the selected active legal hold. The hold release module 914 may then conduct a hold release sweep (i.e., sweep through) the list of impacted applications associated with the selected active legal hold. As such, the hold release module 914 may untag and/or record the impacted applications in the specifications database 132 and/or the project status database 124.

In examples where an impacted application is active, the hold release module 914 may untag the application (e.g., change the status of the application to Active, Project Hold Released, etc.) in the specifications database 132. The hold release module 914 may also untag the project involving the impacted application (e.g., change the status of the project to Active, Project Hold Released, etc.) in the project status database 124. The impacted application will then be able to progress further through the project lifecycle or service.

In examples where an impact application is archived, the hold release module 914 may untag the application (e.g., change the status of the application to Active, Archive Hold Released, etc.) in the specifications database 132. The data associated with the impacted application will then be able to be purged (e.g., by a data purge service, etc.).

As such, the hold release module 914 removes the electronic block on the impacted application and/or data associated with the impacted application by the hold sweep module 906, such that the other modules of the automated workflow management system 104 are no longer restricted from updating or deleting information associated with the application and/or the data associated with the impacted application. In this example, the electronic block is removed by changing the status of the application in the specifications database 132 and/or the project status database 124; however, it will be appreciated that the electronic block may be removed using other modifications to the various modules, sub-modules, and/or components of the automated workflow management system 104. It will also be appreciated that the hold release module 914 may be configured to reverse the operations/modifications performed by the hold sweep module 906.

In some examples, upon completion of the hold release process, the hold release module 914 may send notifications to the legal department or legal system, the application owner, the archive analyst, the APM, etc. In some examples, the notifications may include a confirmation report providing that a legal hold release request was successfully completed. Further, the hold release module 914 may update the legal hold request associated with the legal hold release request with a hold released date and an updated status (e.g., Not Active—Hold Released, etc.).

Figure 9P:
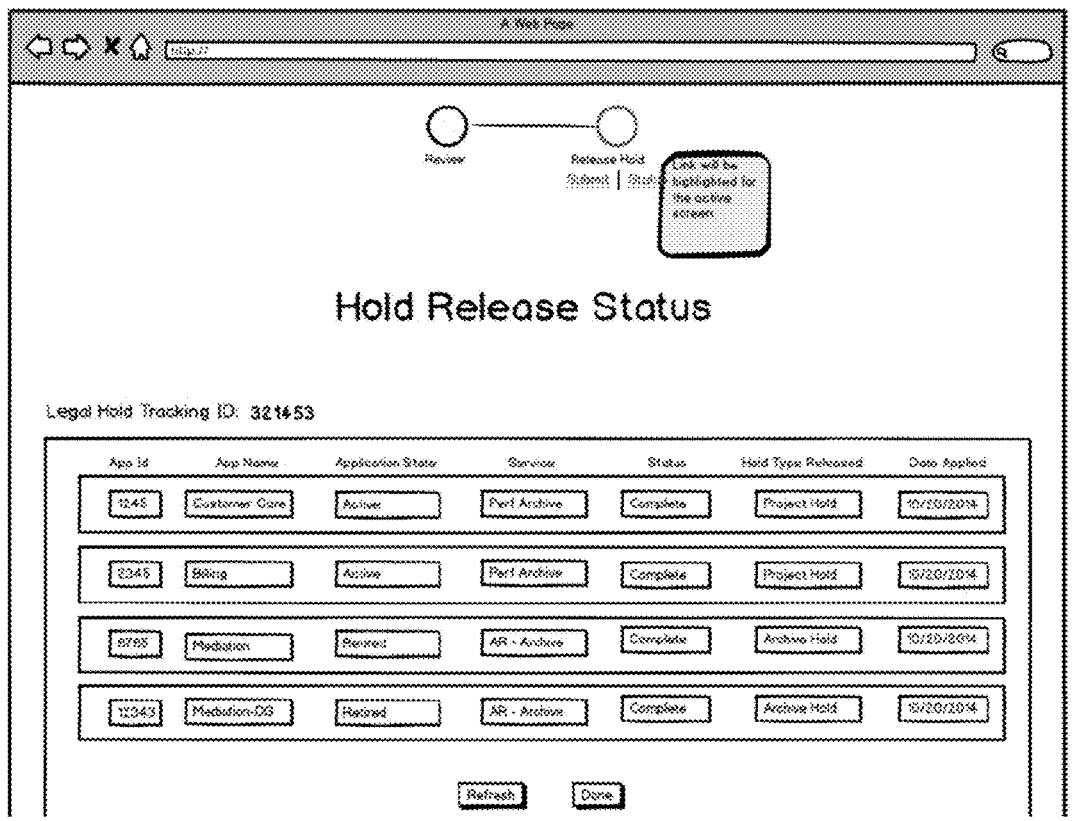

FIGS. 9O-P shows example user interfaces via which an archive analyst, legal department, or legal system may monitor the status (e.g., Submitted, In Progress, Completed, etc.) of a hold release. The example user interfaces may include information relating to one or more legal hold release requests, including information relating to the one or more impacted applications associated with the one or more legal hold release requests. This information may include an application ID, an application name, an application state (e.g., Active, Retired, etc.), a service, a status (e.g., Submitted, In Progress, Completed), a hold type released (e.g., Project Hold, Archive Hold, etc.), a date a hold release was applied, etc.

Figure 9Q:
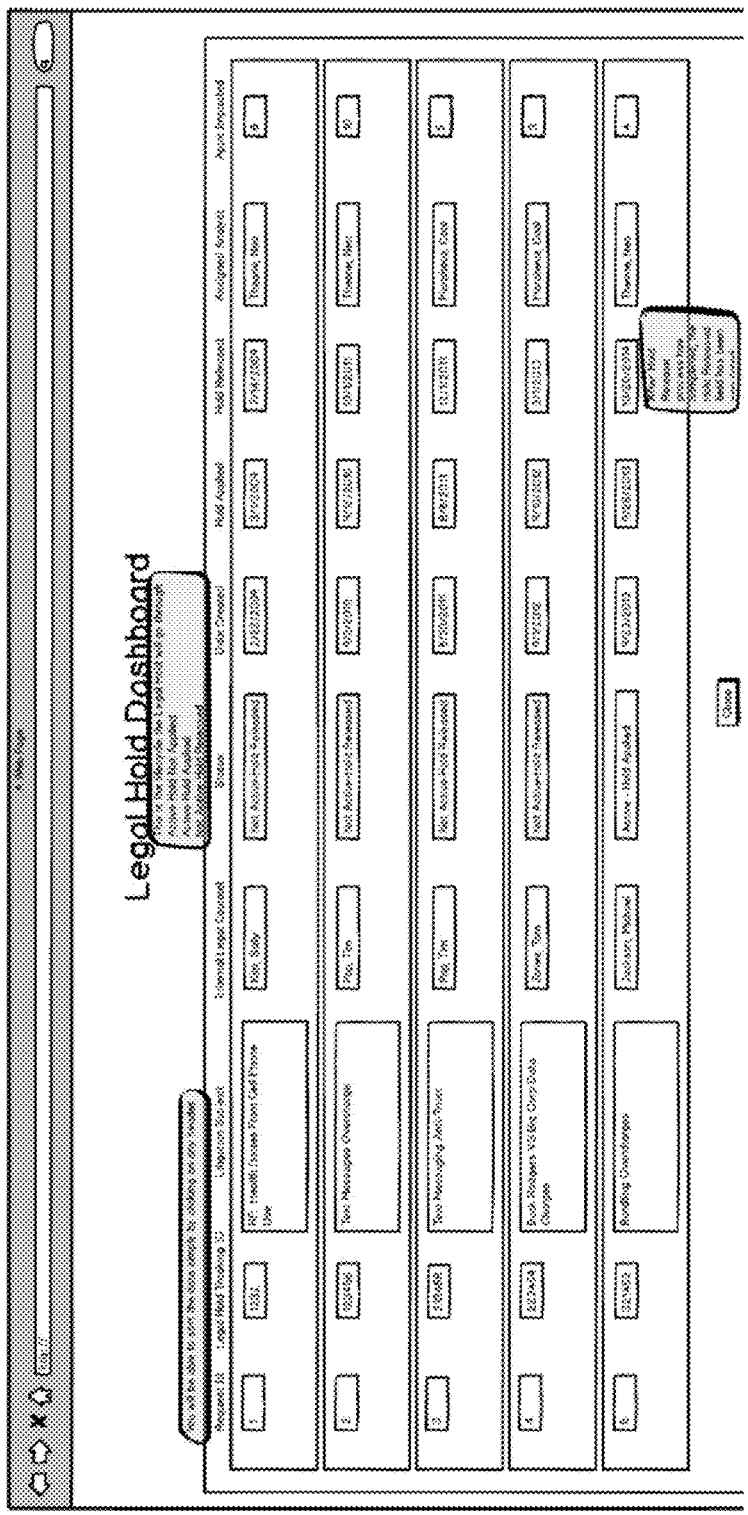

FIG. 9Q shows an example user interface (e.g., a legal hold dashboard) via which a legal department or legal system may view one or more legal hold requests. As such, a legal department or legal system may be able to monitor the status of one or more legal hold requests, view information associated with one or more legal hold requests, submit new legal hold requests, etc. The example user interface may include information relating to one or more legal hold requests, such as a legal hold request ID, a legal hold tracking ID, a litigation subject, an internal legal counsel ID, an internal legal counsel name, a status (e.g., Active—Hold Applied, Active—Hold Applied, Not Active—Hold Released, etc.), a date created, a date a hold was applied, a date a hold was released, an assigned archive analyst, a number of applications impacted, information relating to the impacted applications, etc.

FIGS. 10A-D illustrate example workflows of a planning module 108 that may be carried out by an automated workflow management system 104 in accordance with aspects of this disclosure. FIGS. 10A-D illustrate flows corresponding to components, configured to, in operation to provide a project impact assessment of services offered by the automated workflow management system 104 (e.g., Application Retirement—Archive, Application Retirement—No Archive, Data Archive, Performance Archive, etc.) in terms of costs and resources. In this example, the project impact assessment may include overall project costs, archiving costs, reporting costs, server/storage costs, etc. Further, the assessment may include project duration, project savings, and an estimate of when the project will become ROI positive. In some examples, the example workflows shown in FIGS. 10A-D may include some or all of the components or steps described with reference to the example workflows shown in FIG. 2A.

Although many different approaches may be employed to provide a project impact assessment, the automated workflow management system 104 described herein provides a mechanism that provides several technical advantages. For instance, the automated workflow management system 104 may store actual cost and savings data for completed projects, and may use predictive analytics to improve estimates for future projects based on the actual data. In such examples, the automated workflow management system 104 may use predictive analytics to to find actual data associated with an application and/or project with a similar profile as the application and/or project for which an estimate is being calculated. As such, the estimates provided by the automated workflow management system 104 are more accurate as more actual data is collected. Further, the automated workflow management system 104 provides estimates based on a service type (e.g., Application Retirement—Archive, Application Retirement—No Archive, Data Archive, Performance Archive, etc.), specific application and/or data types, based on a level of complexity of a project, and so forth. Moreover, by performing the calculations and storing the actual data in a centralized repository, the automated workflow management system 104 is optimized such that the number of inputs and outputs associated with the system are minimized.

Figure 10A:
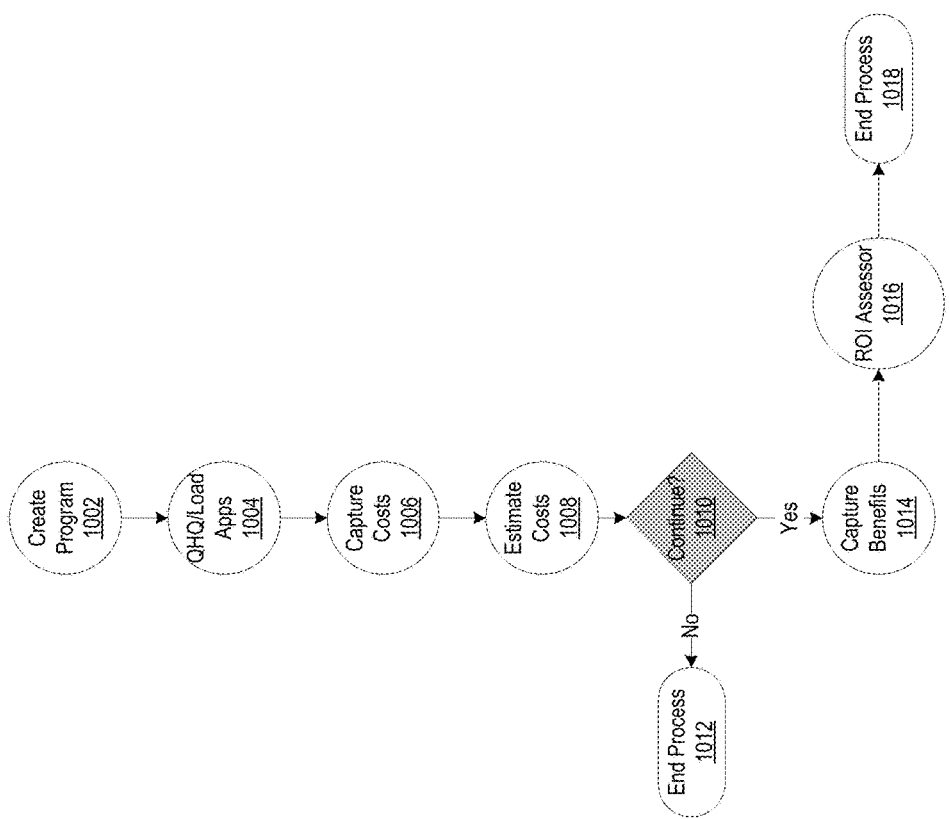
FIGS. 10A-D are block diagrams of example implementations of a planning module of an automated workflow management system in accordance with one or more aspects described herein.

FIG. 10A provides a high-level flow corresponding to providing a project impact assessment. As such, this flow provides an overview of the various components and modules of the planning module 108 that may be configured to, in operation, provide a project impact assessment. In this example, the flow includes a create program module 1002, which may output data to the next process, which may be implemented by the load applications module 1004. The load applications module 1004 may output data to the next process, which may be implemented by the capture costs module 1006. The capture costs module 1006 may output data to the next process, which may be implemented by the estimate costs module 1008. Step 1010 represents a decision to be made by the planning module 108 of the automated workflow management system 104. In one example, the flow may end at step 1012. In another example, the estimate costs module 1008 may output data to the next process, which may be implemented by a capture savings module 1014. The capture benefits module may output data to the next process, which may be implemented by an ROI assessor module 1016. In this example, the flow may end at step 1018. Implementations of these modules will be discussed in further detail below.

It will be appreciated by those skilled in the art that in other examples the planning module 108 may include additional or alternative components or sub-modules. Further, the high-level flow illustrated in FIG. 10A may vary based on a service type. As such, an automated workflow management system 104 providing a project impact assessment for an Application Retirement—Archive service may have a different flow with additional or alternative steps and/or may use additional or alternative modules, components, and/or sub-modules compared to an automated workflow management system 104 providing a project impact assessment for an Application Retirement—No Archive service.

Figure 10B:
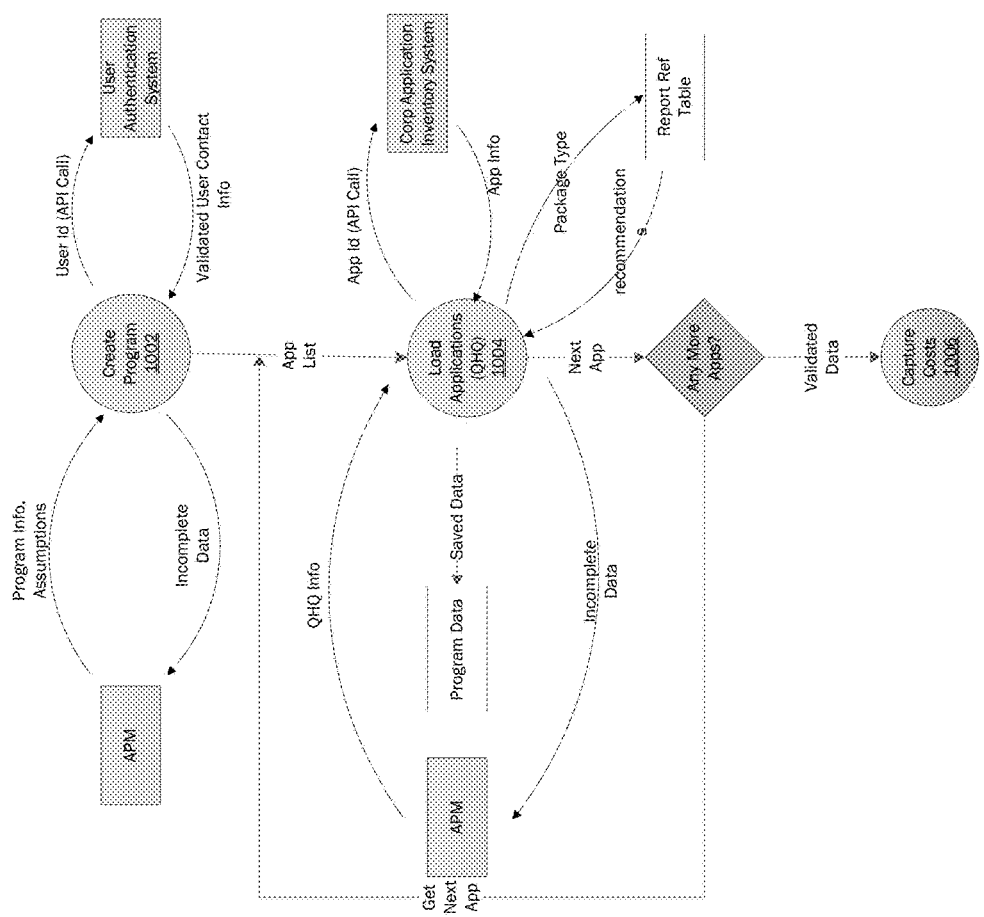

FIG. 10B illustrates flows corresponding to the create program module 1002 and the load applications module 1004. In this example, the create program module 1002 may receive a program request from an APM to create a program container, where the program container includes one or more applications, and where the one or more applications in the program container will be analyzed by the various modules of the planning module 108 to provide a project impact assessment. The program request may include a program container ID, a program container name, a service (e.g., Application Retirement—No Archive, Performance Archive, Data Retirement, Purge, etc.), a program request submitter ID, a program request submitter name, a program request submitter contact number, a program request submitter email, etc.

In some examples, one or more of the program request attributes may be optional. For instance, the create program module 1002 may receive a program request from an APM with only a program container name, a service, and a program request submitter ID. In such examples, the create program module 1002 may make API calls to a user authentication system to authenticate an APM based on the program request submitter ID and receive a program request submitter name, a program request submitter contact number, and a program request submitter email as a response.

In examples where the create program module 1002 detects incomplete data (e.g., a required field is missing, etc.) and/or incorrect (e.g., the user authentication system returns no results for the program request submitter ID of the program request, etc.), the create program module 1002 may request the APM to send (or resend) missing information and/or correct information. As such, the create program module 1002 may receive one or more versions of a program request from an APM. Once the create program module 1002 validates the program request (e.g., the program request submitter ID is authenticated against the user authentication system, no required fields are missing, etc.), the create program module 1002 may create a program container based on program request, and output the program container to the next process, which may be implemented by a load applications module 1004.

Figure 10C:
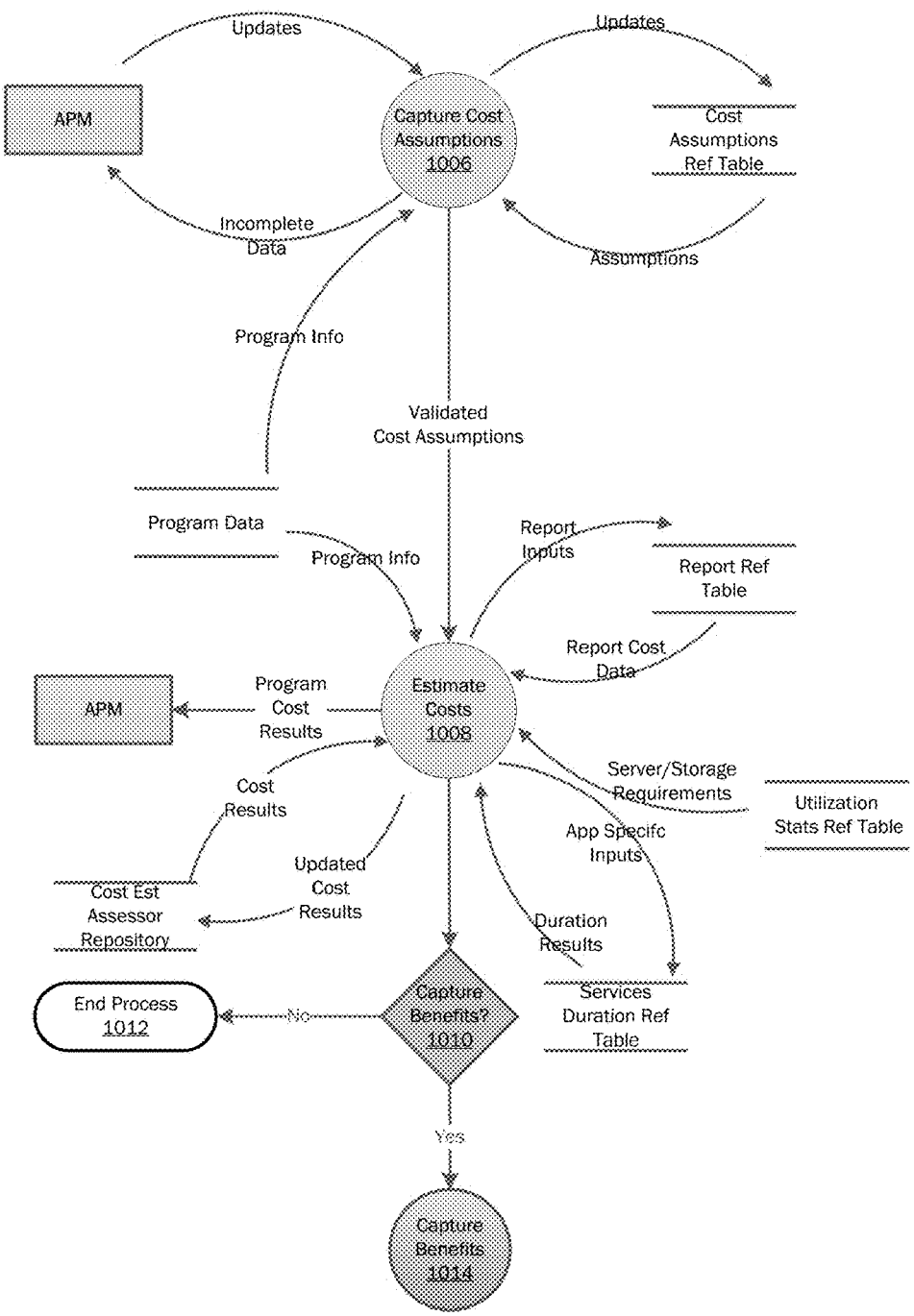
Figure 10D:
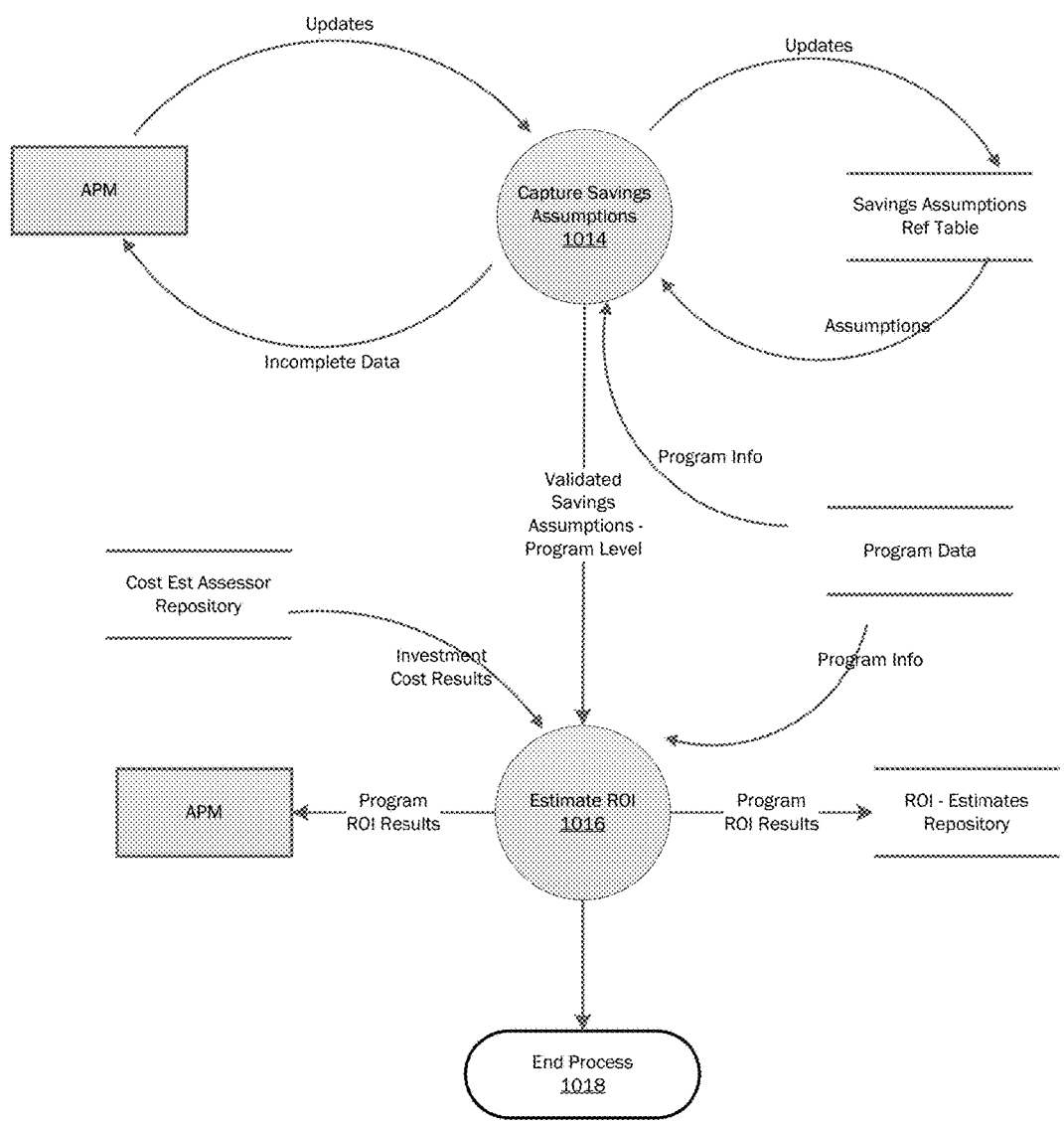
Figure 10E:
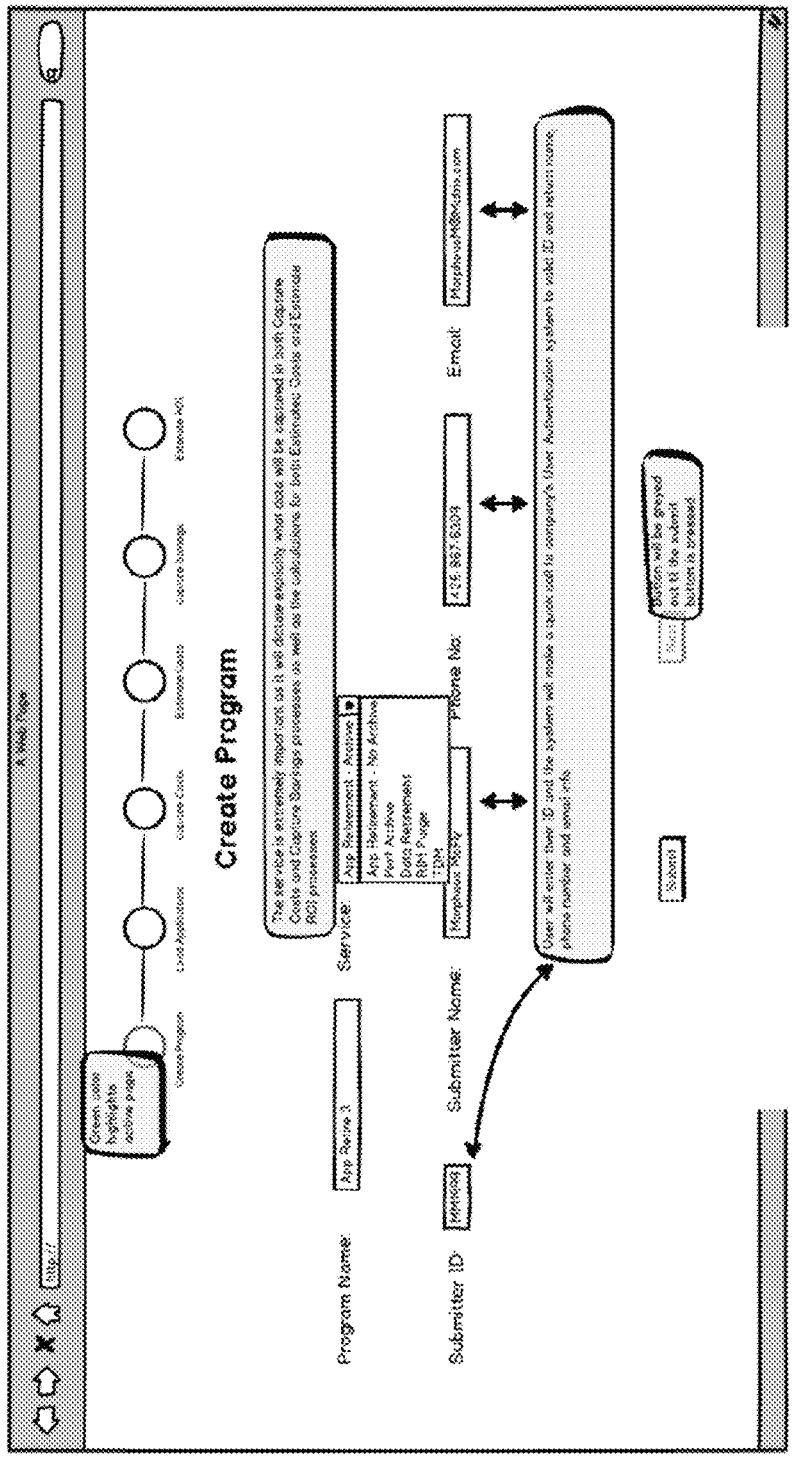

FIG. 10E shows an example user interface via which an APM may submit a program request. For instance, the example user interface may enable an APM to input a program name and a program request submitter ID, and in response, the create program module 1002 may create a new program container. It will be appreciated that the various fields shown in the example user interface may be required or optional to create a program request.

The load applications module 1004 may be configured to, in operation, enable an APM to associate one or more applications to a program container. As such, load applications module 1004 may receive information related to one or more applications. For each application to be associated with a program container, the load applications module 1004 may receive an ID (e.g., a unique identifier for each application in a program container), an application ID, an application name, a database size (e.g., in GB), an indication of whether the application contains special data (e.g., SPI data, PCI data, etc.), an indication of whether there is a legal hold on the application (e.g., Yes, No), an application type (e.g., Package, etc.), a package type (e.g., CRM, Billing, Customer Care, Expense, etc.), a package name (e.g., Oracle, JD Edwards, SAP, Siebel, AMDOCS, etc.), a number of low reports, a number of medium reports, a number of high reports, application notes (e.g., retirement information, etc.), and so forth.

In some examples, one or more of the application attributes may be optional. For instance, the load applications module 1004 may receive information related to an application with only an application ID and application notes. In such examples, the load applications module 1004 may make API calls to a corporate application inventory system based on the application ID and receive an application name, a database size, an indication of whether the application contains special data, an indication of whether there is a legal hold on the application, an application type, a package type, a package name, and so forth. Further, the load applications module 1004 may submit a query to a report reference table to receive a recommended report profile for the application. For instance, the query may include the application's package type, and the report reference table may return a recommended report profile based on past applications associated with the same package type. The recommended report profile may include a number of low reports, a number of medium reports, and a number of high reports based on the past applications associated with the same package type. For instance, the number of low reports may be an average of the number of low reports associated with past applications associated with the same package type, the number of medium reports may be an average of the number of medium reports associated with past applications associated with the same package type, and the number of high reports may be an average of the number of high reports associated with past applications associated with the same package type.

In examples where the report reference table does not contain information related to past applications associated with the same package type, the recommended report profile may be based on past applications associated with other package types. Alternatively, where the report reference table does not contain information related to past applications associated with the same package type, the recommendation report profile may be based on past application associated with each of the report categories (e.g., Low, Medium, High, etc.). As such, the recommendation report may calculate total report costs for each report category. For example, the number of low reports may be based on some or all past applications having actual low costs, the number of medium reports may be based on some or all past applications having actual medium costs, and the number of high reports may be based on some or all past applications having actual high costs. In some examples, the load applications module 1004 may be configured with a predetermined number of joins, a predetermined number of unions, and a predetermined number of report sections.

It will be appreciated that in some examples the load applications module 1004 may receive one or more applications attributes from the APM, and prepopulate the remaining application attributes based on information available in the corporate application inventory system and/or the report reference table.

In examples where the load applications module 1004 detects incomplete data (e.g., a required field is missing, etc.) and/or incorrect (e.g., the corporate application inventory system returns no results for the application ID, etc.), the load applications module 1004 may request the APM to send (or resend) missing information and/or correct information. As such, the load applications module 1004 may receive one or more versions of information related to one or more applications from an APM. Once the load applications module 1004 validates the information related to the one or more applications (e.g., the application ID is authenticated against the corporate application inventory system, no required fields are missing, etc.), the load applications module 1004 may associate the one or more applications with the designated program container (e.g., identified by the program container ID, etc.), and output the program container to the next process, which may be implemented by a capture costs module 1006.

In some examples, the load applications module 1004 may periodically or on-demand (e.g., in response to an APM request, upon completion/validation of an APM request) save information related to applications to be associated to a program container to a program data repository, until a confirmation is received from the APM that information related to all applications to be associated to the program container has been sent. The various modules of the planning module 108 may be in communication with the program data repository to retrieve information related to a program container. As such, the program data repository may be keyed by a program container ID.

Figure 10F:
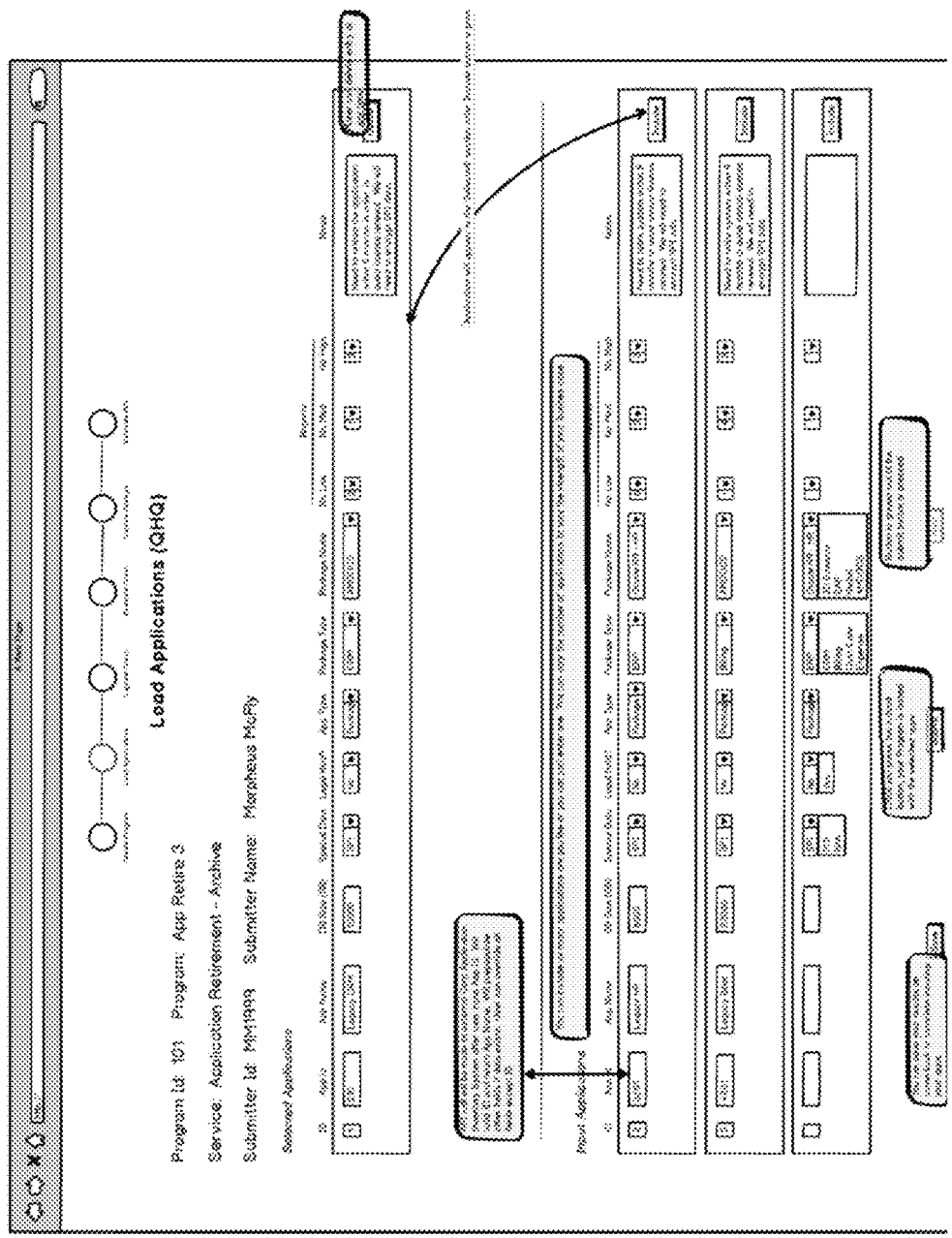

FIG. 10F shows an example user interface via which an APM may provide information relating to one or more applications to be associated with a program container. In this example, the APM may modify some or all of the information prepopulated using information from the corporate application inventory system and/or the report reference table, including the application name, the database size, the indication of whether the application contains special data, the indication of whether there is a legal hold on the application, the application type, the package type, the package name, and so forth. The APM may also add or modify application notes related to an application. In this example user interface, the APM may select one or more applications to be associated with the program container, once all the required information has been entered and validated by the load applications module 1004.

FIG. 10C illustrates flows corresponding to the capture costs module 1006 and estimate costs module 1008. In this example, the capture costs module 1006 may receive one or more cost assumptions from an APM. The cost assumptions may be associated with an application in the program container, or the program container at large. The cost assumptions may be used by the planning module 108 in order to determine which costs to include in the project impact assessment. For example, where the capture costs module 1006 receives a cost assumption for storage costs, the project impact assessment may include an estimate for storage costs. For each cost assumption, the capture costs module 1006 may receive a cost assumption ID (e.g., a unique identifier for each cost assumption), a cost assumption category (e.g., storage, server, resource, etc.), a cost assumption type (e.g., Tier I, Tier II, Full-Time Employee, Contractor, etc.), a cost metric (e.g., cost per GB, hourly cost, etc.), a cost assumption value, cost assumption notes, and so forth.

In examples where the capture costs module 1006 detects incomplete data (e.g., a required field is missing, etc.), the capture costs module 1006 may request the APM to send (or resend) missing information. As such, the capture costs module 1006 may receive one or more versions of information related to one or more cost assumptions from an APM. Once the capture costs module 1006 validates the information related to the one or more cost assumptions (e.g., no required fields are missing, etc.), the capture costs module 1006 may associate the one or more cost assumptions with the designated program container (e.g., identified by the program container ID, etc.), and output the validated cost assumptions to the next process, which may be implemented by an estimate costs module 1008.

In some examples, the validated cost assumptions may be stored in a cost assumptions reference table by the estimated costs module 1008.

Figure 10G:
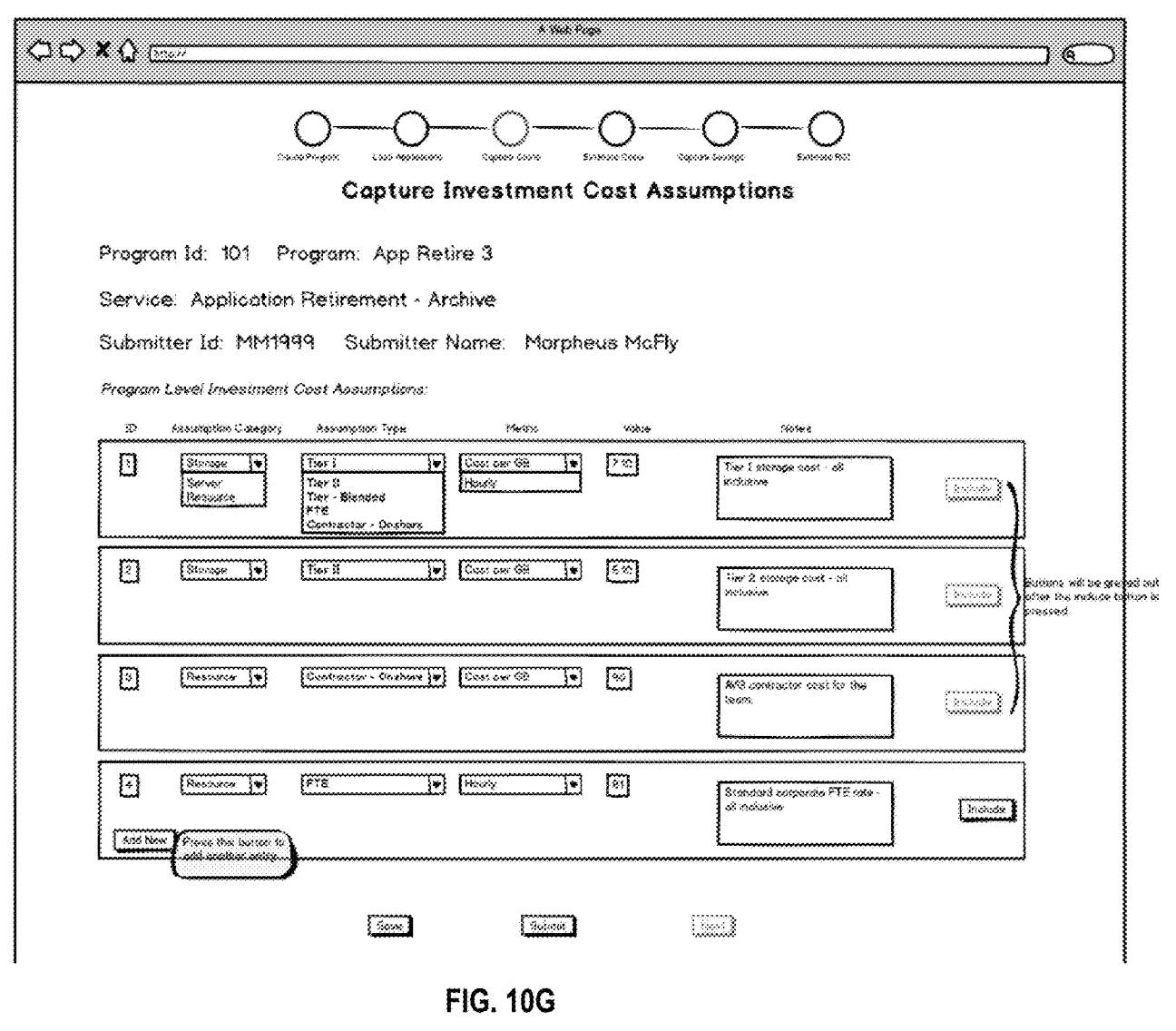

FIG. 10G shows an example user interface via which an APM may provide information relating to one or more cost assumptions. The one or more cost assumptions added via the example user interface may be associated with the designated program container by the capture costs module 1006.

The estimate costs module 1008 may be configured to, in operation, generate a costing model based on the program container and the one or more cost assumptions. The costing model may include program level investment costs (e.g., the costs associated with the program container) and application level investment costs (e.g., the costs associated with some or all of the one or more applications associated with the program container). As such, the costing model may provide a summary cost estimate at a program level, and a detailed cost estimate at an application level. In some examples, the estimate costs module 1008 may generate the program level investment costs of the costing model by summing the application investment costs for each application associated with the program container. In such examples, the program level investment costs may include a total resource time (e.g., resource hours, etc.), a total resource cost (e.g., a monetary value, etc.), a server cost (e.g., a monetary value, etc.), a storage amount (e.g., in GB, etc.), a storage cost (e.g., a monetary value, etc.), and a licensing cost (e.g., a monetary value, etc.). Further, in these examples, the estimate costs module 1008 may generate the application level investment costs of the costing model by summing the application investment costs for each application of a particular category associated with the program container. In such examples, the application level investment costs may include an application ID, an application name, a total resource time, a total resource cost, a server cost, a storage amount, and a storage cost.

The estimate costs module 1008 may generate the costing model by executing an application profile matching process using predictive analytics on actual cost data collected relating to past applications. For instance, the estimate costs module 1008 may query multiple repositories in the automated workflow management system 104 (e.g., a report reference table, a utilization statistics reference table, a services duration reference table, etc.) to identify applications with similar profiles to the applications associated with the project container. For example, application profiles may be based on database size, special data requirements, package type/name, and number of reports. The report reference table may include information such as a number of reports and associated complexity levels (e.g., low, medium, high, etc.), and so forth. The utilization statistics reference table may include information such as a utilization by resource, and so forth. The services duration reference table may include information such as a total project duration, a utilization by resource, a project phase duration, and so forth. Upon identifying one or more past applications with matching profiles, the estimate costs module 1008 may categorize the past applications (e.g., High, Low, Average, etc.) based on the overall actual investment costs associated with the past applications. For instance, in generating a costing model for an application with a package type/name of Legacy CRM, an estimate costing module 1008 may identify two past applications with matching profiles (e.g., past applications with package type/name of Legacy CRM). As such, in this example, the estimate costing module 1008 may categorize the past application with the higher overall actual investment cost as High, and may categorize the past application with the lower overall actual investment cost as Low.

The estimate costs module 1008 may send a notification to an APM including the costing model. In some examples, the notification may also include a low value, a medium value, and a high value for each of the cost attributes described above (e.g., based on the identified past applications with matching profiles). As such, the notification may include a past application associated with a lower value, a medium value, and/or a high value for some or all of the cost attributes described above.

Figure 10H:
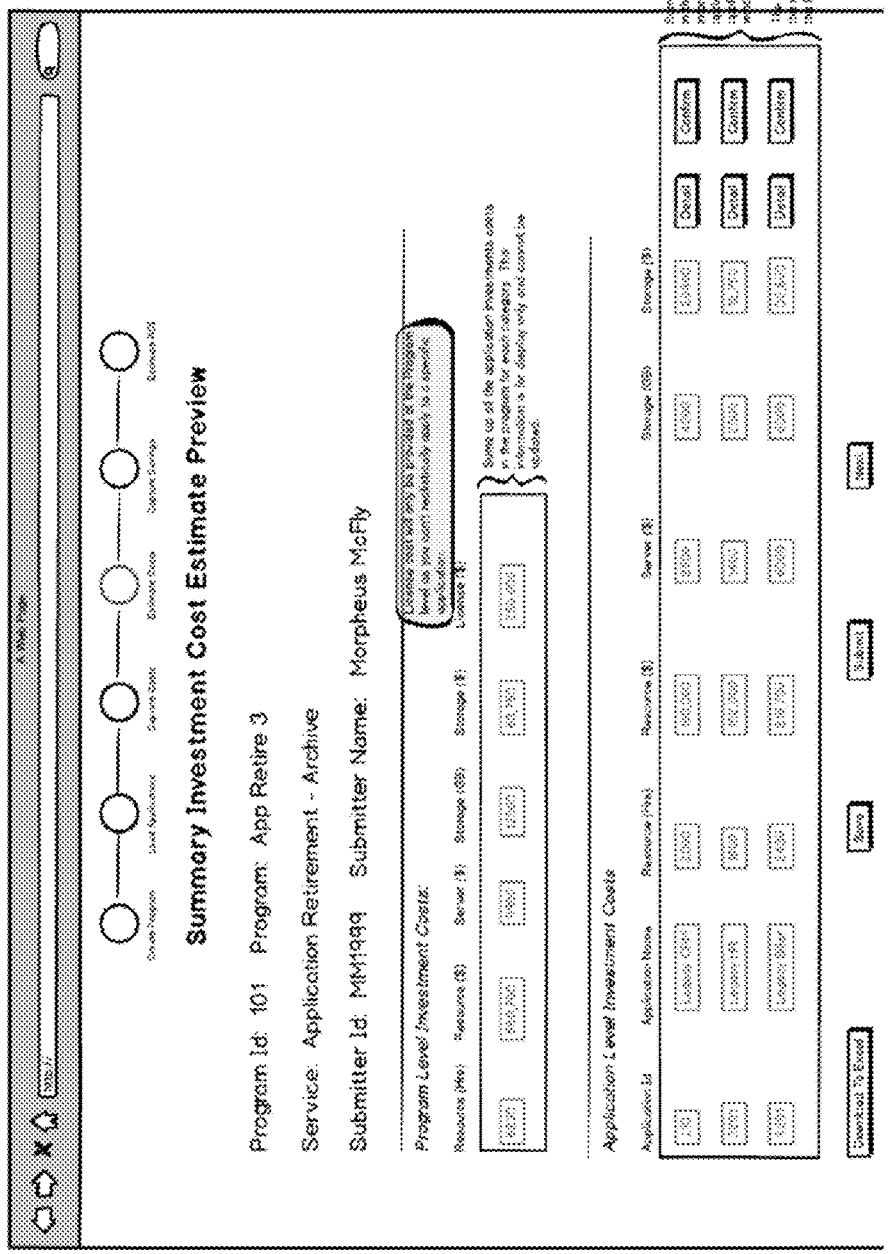

FIG. 10H shows an example user interface via which an estimate costs modules 1008 may notify an APM of the generated costing model. The example user interface may display application level investment costs for each application identified by the load applications module 1004, and may display program level investment costs associated with the program container.

Responsive to the notification, the estimate costs module 1008 may receive from the APM one or more responses, where the responses may be a confirmation of the program level investment costs, a confirmation of some or all of the application level investment costs, a modification to the program level investment costs, a modification to some or all of the application level investment costs, etc. For instance, the modification may be an override to the low values, medium values, and high values calculated using predictive analytics on information related to matching past applications. As such, the modification may replace the costing model with the overrides. In another example, the modification may select a set of values (e.g., the low values, the medium values, or high values) to be used for the costing model. As such, the modification may replace the costing model with selected set of values.

Figure 10I:
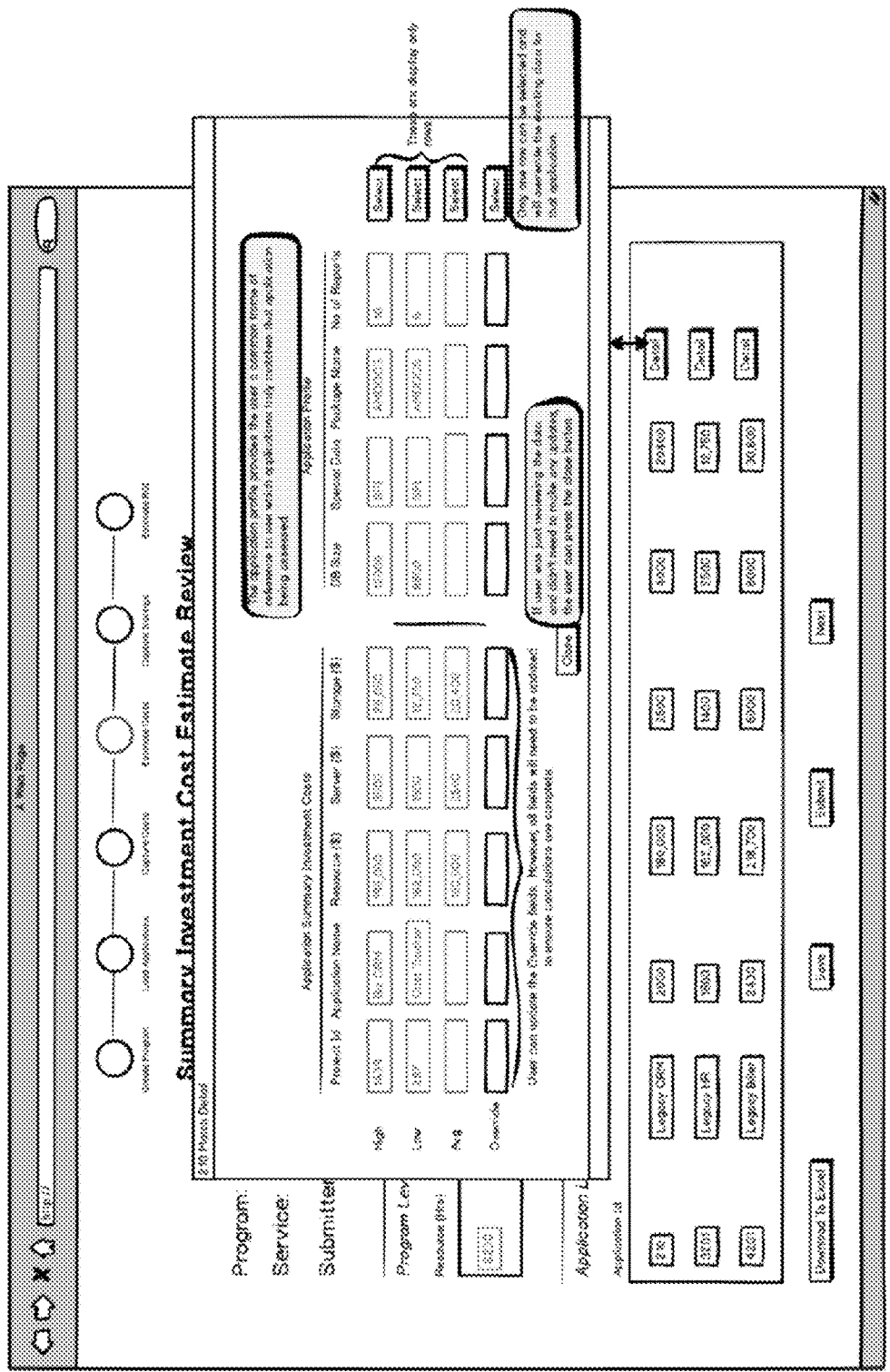

FIG. 10I shows an example user interface via which an APM may provide responses to the estimate costs module 1008 related to the generated costing model. The example user interface may display a breakdown of the costs associated with past applications, where the past applications may be categorized (e.g., as High, Low, Average, etc.). In cases where the APM selects costs associated with a past application, the estimate costs module 1008 may overwrite the existing data in the costing module with the costs associated with the selected past application. The example user interface may also enable the APM to provide override values.

The estimated costs module 1008 may store the final version of the costing model in a cost estimate assessor repository. The information stored in the cost estimate assessor repository may be used by the planning module 108, once the project is completed, to compare actual cost data to the costing model generated by the estimated costs module 1008 to determine the accuracy of the costing model.

As shown in FIG. 10C, the planning module 108 may be configured to send a request to an APM as to whether to continue to capture and estimate benefits for the program container. Where the planning module 108 receives a response not to continue with the workflow, the example workflow shown in FIG. 10C may be terminated at step 1012. Alternatively, where the planning module 108 receives a response to continue with the workflow, the example workflow may directed to the next process, which may be implemented by the capture savings module 1014.

Figure 10J:
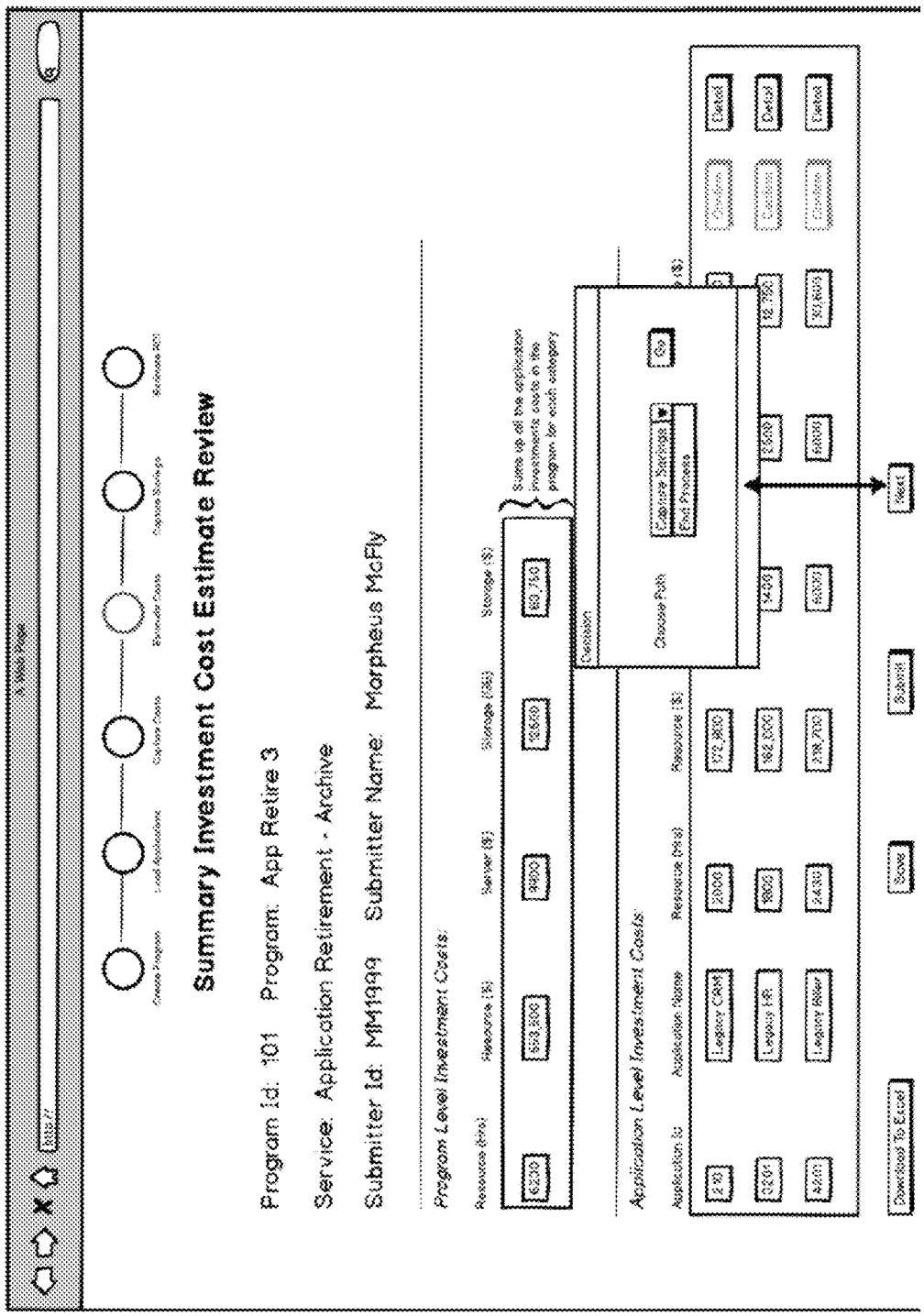

FIG. 10J shows an example user interface via which an APM may provide a response to the planning module 108, where the response indicates whether to end the workflow (step 1012) or whether to continue to capture and estimate savings. In cases where the APM's response is to continue to capture and estimate savings, the workflow may be directed to the capture savings module 1014 and the ROI assessor module 1016.

FIG. 10D illustrates flows corresponding to the capture savings module 1014 and the ROI assessor module 1016. In this example, the capture savings module 1014 may receive one or more savings assumptions from an APM. The savings assumptions may be associated with an application in the program container, or the program container at large. The savings assumptions may include savings anticipated to result from completing the project, such as hard cost savings (e.g., license cost savings, support cost savings, server cost savings, storage cost savings, etc.) and soft cost savings (e.g., eDiscovery cost savings, etc.). The savings assumptions may also include a savings execution value, which includes information related to when the savings are anticipated to start (e.g., 0 for immediately, number of months/years to anticipated start, etc.). Further, the savings assumptions may include a savings duration cap, which includes information related to the duration of the savings. The savings assumptions may be used by the planning module 108 in on order to determine which savings to include in the project impact assessment. For example, where the capture savings module 1014 receives a savings assumption for storage cost savings, the project impact assessment may include an estimate for storage cost savings. For each savings assumption, the capture savings module 1014 may receive a savings assumption ID (e.g., a unique identifier for each savings assumption), a savings assumption category (e.g., storage, server, resource, etc.), a savings assumption type (e.g., Tier I, Tier II, Full-Time Employee, Contractor, etc.), a savings metric (e.g., savings per GB, hourly savings, etc.), a savings assumption value, savings assumption notes, and so forth.

In examples where the capture savings module 1014 detects incomplete data (e.g., a required field is missing, etc.), the capture savings module 1014 may request the APM to send (or resend) missing information. As such, the capture savings module 1014 may receive one or more versions of information related to the one or more savings assumptions from an APM. Once the capture savings module 1014 validates the information related to the one or more savings assumptions (e.g., no required fields are missing, etc.), the capture savings module 1014 may associate the one or more savings assumptions with the designated program container (e.g., identified by the program container ID, etc.), and output the savings assumptions to the next process, which may be implemented by an ROI assessor module 1016.

In some examples, the validated savings assumptions may be stored in a savings assumptions reference table by the capture savings module 1014.

The capture savings module 1014 may generate a savings model based on the program container and the one or more savings assumptions. The savings model may include program level investment savings (e.g., the savings associated with the program container) and application level investment savings (e.g., the savings associated with some or all of the one or more applications associated with the program container). As such, the savings model may provide a summary savings estimate at a program level, and a detailed savings estimate at an application level. In some examples, the capture savings module 1014 may generate the program level investment savings of the savings model by summing the application investment savings for each application associated with the program container. In such examples, the program level investment savings may include a license savings (e.g., a monetary value, etc.), a support savings (e.g., a monetary value, etc.), a server savings (e.g., a monetary value, etc.), a storage savings (e.g., a monetary value, etc.), an eDiscovery savings (e.g. a monetary value, etc.), and a miscellaneous savings. Further, in these examples, the capture savings module 1014 may generate the application level investment savings of the savings model by summing the application investment savings for each application of a particular category associated with the program container. In such examples, the application level investment savings may include an application ID, an application name, a license savings, a support savings, a server savings, a storage savings, an eDiscovery savings, and a miscellaneous savings.

The capture savings module 1014 may generate the savings model by executing an application profile matching process using predictive analytics on actual data collected relating to past applications. For instance, the capture savings module 1014 may query multiple repositories in the automated workflow management system 104 to identify applications with similar profiles to the applications associated with the project container.

The capture savings module 1014 may send a notification to an APM including the savings model. In some examples, the notification may also include a low value, a medium value, and a high value for each of the savings attributes described above (e.g., based on the identified past applications with matching profiles). As such, the notification may include a past application associated with a lower value, a medium value, and/or a high value for some or all of the savings attributes described above.

Responsive to the notification, the capture savings module 1014 may receive from the APM one or more responses, where the responses may be a confirmation of the program level investment savings, a confirmation of some or all of the application level investment savings, a modification to the program level investment savings, a modification to some or all of the application level investment savings, etc. For instance, the modification may be an override to the low values, medium values, and high values calculated using predictive analytics on information related to matching past applications. As such, the modification may replace the savings model with the overrides. In another example, the modification may select a set of values (e.g., the low values, the medium values, or high values) to be used for the savings model. As such, the modification may replace the savings model with selected set of values.

Figure 10K:
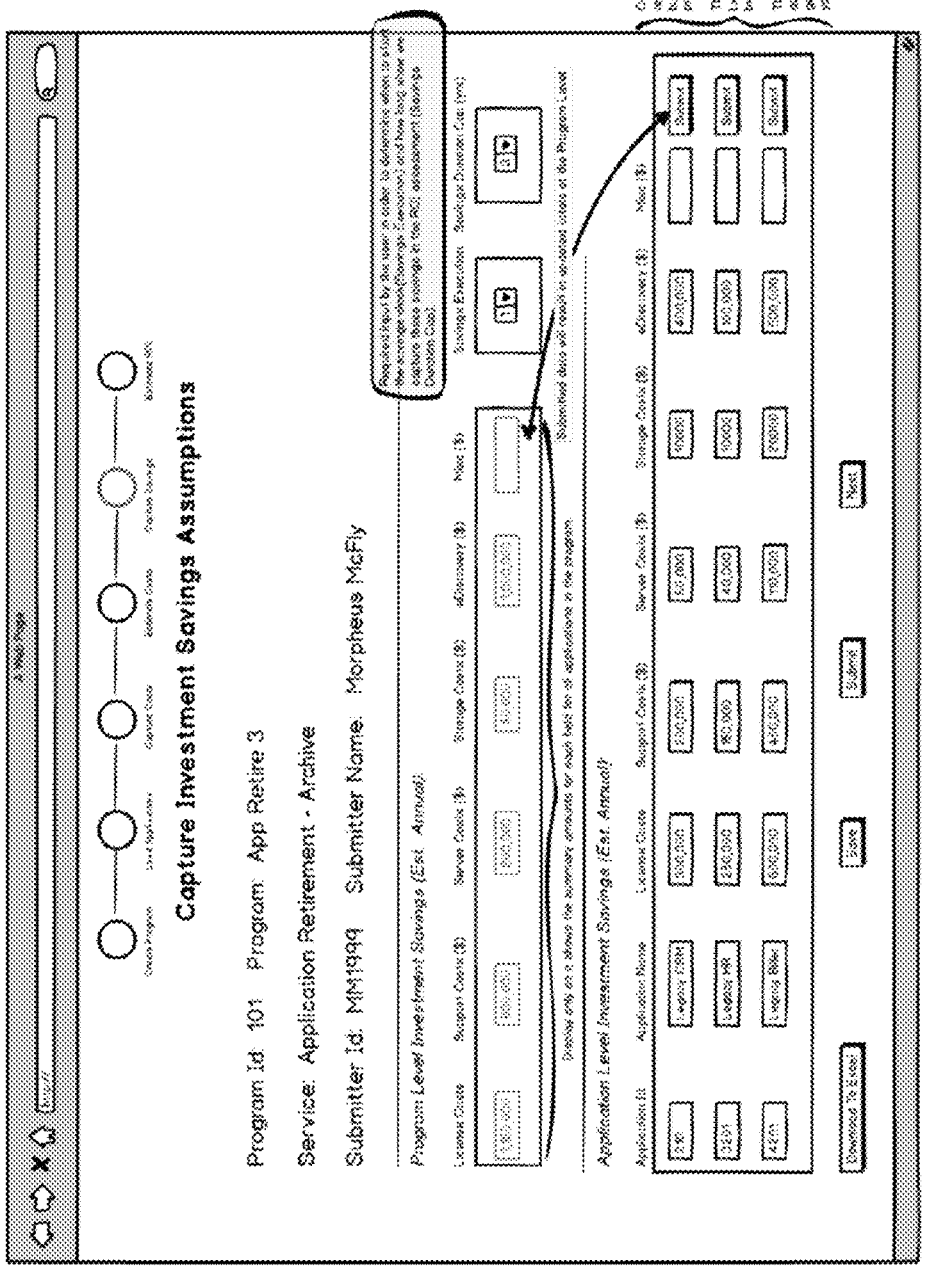

FIG. 10K shows an example user interface via which an APM may provide information relating to one or more savings assumptions, via which a capture savings module 1014 may notify an APM of the generated savings model, and via which an APM may provide responses to the capture savings module 1014 related to the generated savings model. The example user interface may display application level investment savings for each application identified by the load applications module 1004, and may display program level investment savings associated with the program container The ROI assessor module 1016 may be configured to, in operation, apply a service calculation template to the cost assumptions (and/or costing model) and the savings assumptions (and/or the savings model) to generate a project impact assessment. The project impact assessment may include an overall program ROI, a year in which the overall program ROI will first be positive, and a duration of the overall program ROI.

For instance, the ROI assessor module 1016 may apply a service calculation template to the one or more cost assumptions received and the one or more savings assumptions, where the one or more cost assumptions and the one or more savings assumptions are associated with a program container. For example, where the program container is for an Application Retirement—Archive service, the ROI assessor module 1016 may apply the Application Retirement—Archive calculate template to the one or more cost assumptions and the one or more savings assumptions associated with the program container.

In some examples, the ROI assessor module 1016 may use the one or more cost assumptions from the costing model, and/or the one or more savings assumptions from the savings model. In other examples, the ROI assessor module 1016 may retrieve the cost assumptions from the cost estimate assessor repository, and may retrieve the savings assumptions from the savings assumptions reference table.

The ROI assessor module 1016 may calculate one-time costs and recurring costs (e.g., a year-by-year breakdown, etc.) for the program container. One-time costs may be based on license costs, server costs, storage costs, resource costs, and the like. Recurring costs may be based on support costs, license maintenance costs, and the like. The ROI assessor module 1016 may also calculate one-time savings and recurring savings (e.g., a year-by-year breakdown, etc.) for the program container. For instance, recurring costs may be calculated for Year 1, Year 2, etc. One-time savings may be based on storage savings, server savings, and the like. Recurring savings may be based on license savings, support savings, eDiscovery savings, miscellaneous savings, and the like. For instance, the recurring savings may be calculated for a Year 0, Year 1, Year 2, etc. In cases where the savings execution value in the savings model is zero, the ROI assessor module 1016 may populate the recurring savings for Year 0. On the contrary, in cases where the savings execution value in the savings model is non-zero, the ROI assessor module 1016 may not populate the recurring savings for Year 0.

Further, the ROI assessor module 1016 may calculate a total investment cost (e.g., a sum of one-time and recurring costs) and a total investment savings (e.g., a sum of one-time and recurring savings) for the program container. The ROI assessor module 1016 may also calculate a net benefit value, which may be the difference between the total investment cost and the total investment savings.

The ROI assessor module 1016 may also calculate a year in which the overall program ROI will first be positive. As such, the ROI assessor module 1016 may perform a cumulative calculation of both costs (one-time and recurring) and savings (one-time and recurring).

In some examples, the ROI assessor module 1016 may store the project impact assessment in an ROI estimates repository. The information stored in the ROI estimates repository may be used by the planning module 108, once the project is completed, to compare actual ROI data against the project impact assessment generated by the ROI assessor module 1016 to determine the accuracy of the costing model and the savings model.

The ROI assessor module 1016 may also send a notification to an APM including the project impact assessment. The notification may include information relating to the program container, the one or more applications associated with the program container, program level investment costs, program level investment savings, application level investment costs, and/or application level investment savings.

Figure 10L:
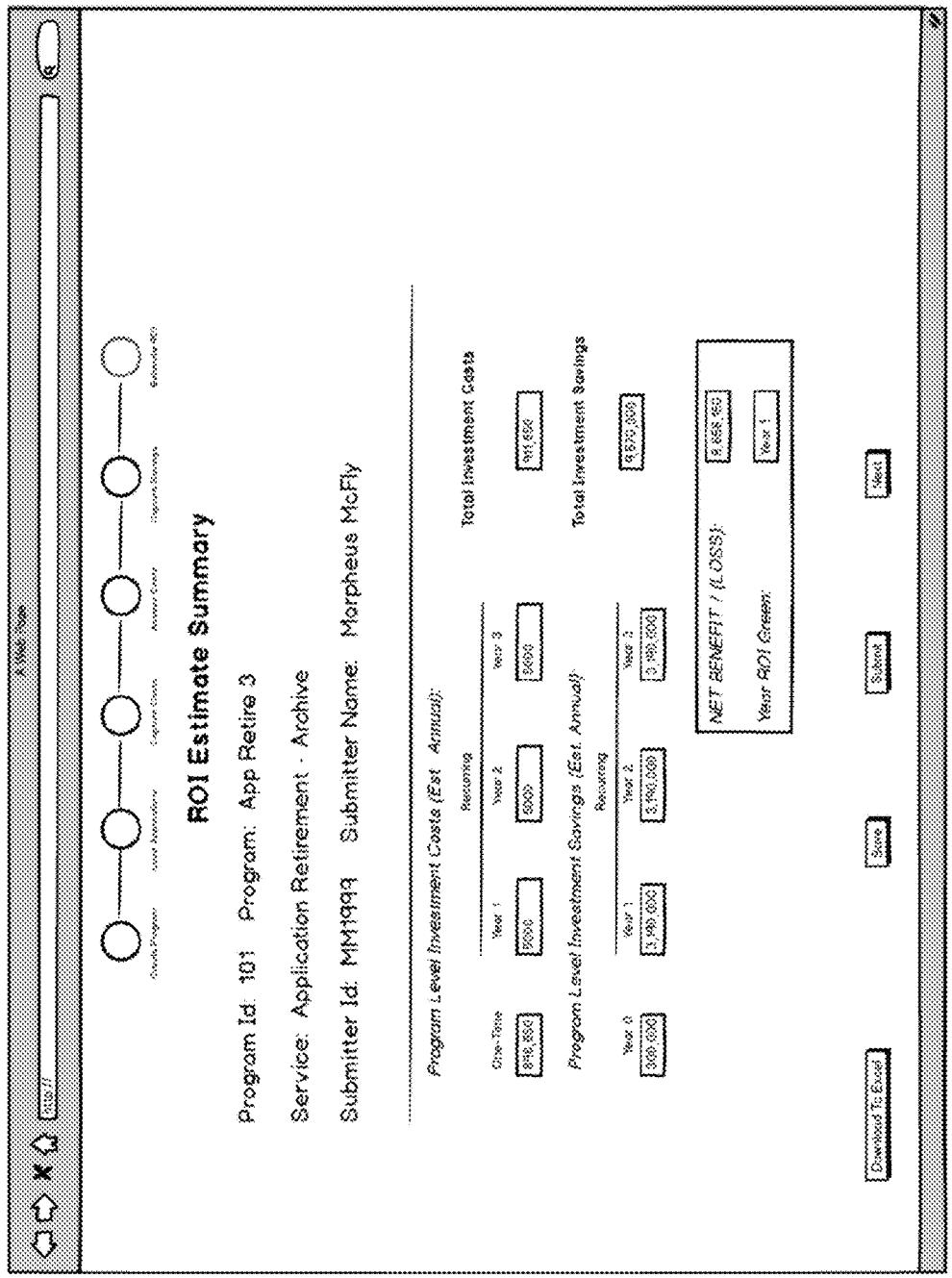

FIG. 10L shows an example interface via which the ROI assessor module 1016 may notify an APM of the generated project impact assessment. An example project impact assessment may include program level investment costs (e.g., estimated annual costs) and program level investment savings (e.g., estimated annual savings). The example project impact assessment may further include total investment costs, total investment savings, a net benefit/loss, and the first year the project ROI is positive. In some examples, the example user interface may enable the APM to download the project impact assessment (e.g., as a text file, CSV file, an Excel file, etc.).

Aspects of the disclosure have been described in terms of illustrative embodiments thereof. Numerous other embodiments, implementations, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Moreover, although some terms have been capitalized, a person of ordinary skill in the art will understand that the terms are not proper nouns; rather, the use of capitalization herein is inconsequential and interchangeable with lower case recitations.

What is claimed is:

1. An automated workflow management system comprising:
   a hardware asset info database that stores information describing hardware assets and information identifying applications associated with the hardware assets, wherein the hardware assets comprise at least one of computer servers, network switches, and network firewalls;
   one or more processors, and
   memory storing computer-readable instructions that, when executed by the one or more processors, cause the automated workflow management system to:
   determine, at a mapping module, based at least in part on information stored in the hardware asset info database, a plurality of hardware assets associated with an application;
   determine, at the mapping module, a first subset of the plurality of hardware assets to be repurposed and a second subset of the plurality of hardware assets to be decommissioned;
   trigger, at the mapping module, a repurpose life cycle tracker module to address the first subset and a decommission life cycle tracker module to address the second subset;
   generate, at the repurpose life cycle tracker module, one or more repurposing work request tickets corresponding to the first subset;
   track, at the repurpose life cycle tracker module, repurposing of the first subset based at least in part on the one or more repurposing work request tickets;
   generate, at the decommission life cycle tracker module, one or more decommissioning work request tickets corresponding to the second subset;
   track, at the decommission life cycle tracker module, decommissioning of the second subset based at least in part on the one or more decommissioning work request tickets;
   update, by a get candidate applications module of a requirements capture module, a specifications database to reflect receiving a legal hold request, wherein the legal hold request includes a set of criteria;
   determining, by the get candidate applications module, a plurality of impacted applications, based, at least in part, on the set of criteria, wherein the plurality of impacted applications includes the application; and
   receive, from a hold sweep module of the requirements capture module, a first notification of an electronic block placed on the application, wherein the electronic block prevents the one or more repurposing work request tickets corresponding to the first subset from progressing further, and wherein the electronic block prevents the one or more decommissioning work request tickets corresponding to the second subset from progressing further.

2. The automated workflow management system of claim 1, wherein the instructions, when executed by the one or more processors, further cause the automated workflow management system to:
   tag, by the hold sweep module, the application for project hold.

3. The automated workflow management system of claim 1 wherein the instructions, when executed by the one or more processors, further cause the automated workflow management system to:
   receive, from a hold release module of the requirements capture module, a second notification of a removal of the electronic block placed on the application, wherein the removal enables the one or more repurposing work request tickets corresponding to the first subset to progress further, and wherein the removal enables the one or more decommissioning work request tickets corresponding to the second subset to progress further.

4. The automated workflow management system of claim 3 wherein the instructions, when executed by the one or more processors, further cause the automated workflow management system to:
   update the hardware asset info database to reflect a final status of the first and second sub sets.

5. A method comprising:
   receiving, at a decision module, an input representing a decision to initiate a project based, at least in part, on a project impact assessment, wherein the project impact assessment is received from an ROI assessor module based on a costing model and a savings model;
   determining, at a mapping module, based at least in part on information stored in a hardware asset info database, a plurality of hardware assets associated with an application associated with the project;
determining, at the mapping module, a first subset of the plurality of hardware assets to be repurposed and a second subset of the plurality of hardware assets to be decommissioned;
triggering, at the mapping module, a repurpose life cycle tracker module to address the first subset and a decommission life cycle tracker module to address the second subset;
tracking, at the repurpose life cycle tracker module, repurposing of the first subset;
tracking, at the decommission life cycle tracker module, decommissioning of the second subset;
updating the hardware asset info database to reflect a final retired status of the first and second sub sets;
creating, at a create program module of a planning module, a program container associated with the project, wherein the program container includes at least the application;
generating, at an estimate costs module of the planning module, a costing model for the application based, at least in part, on the program container and a plurality of cost assumptions;
generating, at a capture savings module of the planning module, a savings model for the application based, at least in part, on the program container, and a plurality of savings assumptions; and
applying, by the ROI assessor module of the planning module, a service calculation template to the costing model and the savings model to generate a project impact assessment for the application, wherein the project impact assessment includes program level investment costs and program level investment savings.

6. The method of claim 5, further comprising:
identifying, by the estimate costs module, using an application profile matching process, a plurality of past applications, wherein the application profile matching process identifies past applications with at least the same package type as the application in the program container;
categorizing, by the estimate costs module, the plurality of past applications based, at least in part, on overall actual investment costs associated with the plurality of past applications; and
generating, by the estimate costs module, the costing model for the application based on actual cost data associated with the plurality of past applications.

7. The method of claim 5, further comprising:
identifying, by the capture savings module, using an application profile matching process, a plurality of past applications, wherein the application profile matching process identifies past applications with at least the same package type as the application in the program container;
categorizing, by the capture savings module, the plurality of past applications based, at least in part, on overall actual investment savings associated with the plurality of past applications; and
generating, by the capture savings module, the savings model for the application based on actual savings data associated with the plurality of past applications.

8. The method of claim 5, wherein the project impact assessment includes one-time costs, one-time savings, recurring costs, and recurring savings.

9. A method comprising:
providing, by a planning module, a project impact assessment associated with a project of retiring an application;
capturing, by an initiation module, one or more attributes associated with the project;
capturing, by a snapshot module, information describing one or more hardware assets and information describing one or more software assets, wherein the one or more hardware and the one or more software assets are associated with the application;
receiving, by a decision module, an input representing a decision to initiate the project;
determining, by a requirements capture module, a plurality of requirements for the project, wherein the plurality of requirements includes legal requirements;
initiating, by a status tracker module, an implementation of the plurality of requirements;
auditing, by the status tracker module, the implementation of the plurality of requirements;
retiring, by a retirement module, one or more software assets associated with the application;
retiring, by the retirement module, one or more hardware assets associated with the application;
performing, by the requirements capture module, a hold query on a specifications database to identify one or more applications subject to a legal hold request received by the requirements capture module;
receiving, by a get candidate applications module of the requirements capture module, the legal hold request, wherein the legal hold request includes a set of criteria;
determining, by the get candidate applications module, a plurality of impacted applications based, at least in part, on the set of criteria, and place the plurality of impacted applications in a legal hold container, wherein the plurality of impacted applications includes the application;
adding, by the get candidate applications module, the plurality of impacted applications to the legal hold request;
receiving, by a hold sweep module of the requirements capture module, the legal hold request; and
conducting, by the hold sweep module, a hold sweep of the plurality of impacted applications.

10. The method of claim 9, wherein the set of criteria includes a litigation subject of the legal hold request.

11. The method of claim 9, further comprising:
tagging, by the hold sweep module, a first subset of the plurality of impacted applications for project hold;
placing, by the hold sweep module, a first electronic block on the first subset, wherein the first electronic block prevents impacted applications in the first subset from progressing further through a retirement service until the first electronic block is released;
tagging, by the hold sweep module, a second subset of the plurality of impacted applications for archive hold; and
placing a second electronic block on the second subset, wherein the second electronic block prevents impacted applications in the second subset from progressing further through a purging service until the second electronic block is released.

12. The method of claim 11, wherein the first subset of the plurality of impacted applications includes the application.

13. The method of claim 11, wherein the second subset of the plurality of impacted applications includes the application.

14. The method of claim 11, further comprising:
- receiving, by a review request module of the requirements capture module, a legal hold release request, wherein the legal hold release request includes a unique identifier of the legal hold request;
- retrieving, by a hold release module of the requirements capture module, the plurality of impacted applications of the legal hold request based, at least in part, on the unique identifier of the legal hold request; and
- conducting, by the hold release module, a hold release sweep of the plurality of impacted applications.

15. The method of claim 14, further comprising:
- untagging, by the hold release module, the first subset of the plurality of impacted applications;
- removing, by the hold release module, the first electronic block on the first subset, wherein removing the first electronic block enables impacted applications in the first subset to progress further;
- untagging, by the hold release module, the second subset of the plurality of impacted applications; and
- removing, by the hold release module, the second electronic block on the second subset, wherein removing the second electronic block enables impacted applications in the second subset to progress further.

16. The method of claim 15, wherein the first subset of the plurality of impacted applications includes the application.

17. The method of claim 15, wherein the second subset of the plurality of impacted applications includes the application.

\* \* \* \* \*